US010443984B2

(12) United States Patent
Maryfield et al.

(10) Patent No.: US 10,443,984 B2
(45) Date of Patent: Oct. 15, 2019

(54) LOW-COST RIFLE SCOPE DISPLAY ADAPTER

(71) Applicant: Cubic Corporation, San Diego, CA (US)

(72) Inventors: Tony Maryfield, Poway, CA (US); Mahyar Dadkhah, San Diego, CA (US); Christian Cugnetti, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/965,381

(22) Filed: Apr. 27, 2018

(65) Prior Publication Data

US 2018/0252500 A1 Sep. 6, 2018

Related U.S. Application Data

(63) Continuation-in-part of application No. 15/784,673, filed on Oct. 16, 2017, now abandoned, which is a
(Continued)

(51) Int. Cl.
*F16M 11/00* (2006.01)
*F41G 11/00* (2006.01)
(Continued)

(52) U.S. Cl.
CPC ............ *F41G 11/00* (2013.01); *F16M 13/02* (2013.01); *F41G 1/38* (2013.01); *F16M 2200/022* (2013.01)

(58) Field of Classification Search
CPC . F41G 11/003; F41G 1/38; F41G 1/35; F41G 3/06; F41G 1/473; F41G 11/001;
(Continued)

(56) References Cited

U.S. PATENT DOCUMENTS 3,696,516 A * 10/1972 Thompson ................ F41G 1/38
285/89
5,838,489 A 11/1998 Erdmann et al.
(Continued)

FOREIGN PATENT DOCUMENTS

EP 3280969 A1 2/2018
WO 2015/074055 A1 5/2015
(Continued)

OTHER PUBLICATIONS

Office Action dated Oct. 8, 2018 in European Patent Application No. 16720951.9, all pages.
(Continued)

*Primary Examiner* — Steven M Marsh
(74) *Attorney, Agent, or Firm* — Kilpatrick Townsend & Stockton, LLP

(57) ABSTRACT

Embodiments of the invention(s) described herein enable the display of information (e.g., information related to aiming and/or target selection and/or other information) through the use of a rifle scope display adapter (RDA) that can be coupled to and/or placed in proximity to an existing rifle scope. This information, which is viewable through the eyepiece of the rifle scope, can come from a spotter and/or other information source. The RDA may utilize a polarized transmissive-reflective optical element to enable light generated by the RDA to be reflected into the objective of the rifle scope, as well as light from a scene viewable by the rifle scope to be transmitted through the polarized transmissive-reflective optical element to the objective.

20 Claims, 38 Drawing Sheets

Related U.S. Application Data continuation of application No. 15/093,237, filed on Apr. 7, 2016, now Pat. No. 9,791,244, which is a continuation-in-part of application No. 15/079,851, filed on Mar. 24, 2016, now Pat. No. 10,274,286.

(60) Provisional application No. 62/144,218, filed on Apr. 7, 2017, provisional application No. 62/137,585, filed on Mar. 24, 2015, provisional application No. 62/138,893, filed on Mar. 26, 2015.

(51) Int. Cl.
*F16M 13/02* (2006.01)
*F41G 1/38* (2006.01)

(58) Field of Classification Search
CPC .......... F41G 1/345; F41G 3/08; F41G 11/004; F41G 1/01; F41G 1/30; F41G 1/00; F41G 1/02; F41G 3/165; F41G 11/002; F41G 1/54; F41G 1/08
USPC ................ 211/64; 403/7; 248/187.1, 222.14; 42/111, 119, 124
See application file for complete search history.

(56) References Cited

U.S. PATENT DOCUMENTS

| | | | |
|---|---|---|---|
| 6,583,862 | B1 | 6/2003 | Perger et al. |
| 6,813,025 | B2 | 11/2004 | Edwards |
| 6,862,832 | B2 | 3/2005 | Barrett |
| 6,886,287 | B1 | 5/2005 | Bell et al. |
| 7,175,279 | B2 | 2/2007 | O'Donnell et al. |
| 7,280,273 | B2 | 10/2007 | Tejada et al. |
| 7,606,485 | B2 | 10/2009 | Ohashi et al. |
| 7,624,528 | B1 | 12/2009 | Bell et al. |
| 8,083,198 | B2 | 12/2011 | Stabler |
| 8,363,321 | B1 | 1/2013 | Pochapsky |
| 8,468,930 | B1 | 6/2013 | Bell |
| 9,335,124 | B2 | 5/2016 | Maryfield et al. |
| 9,347,742 | B2 | 5/2016 | Varshneya et al. |
| 9,683,813 | B2 | 6/2017 | Beckman |
| 9,791,244 | B2 | 10/2017 | Maryfield et al. |
| 2002/0149691 | A1 | 10/2002 | Pereira et al. |
| 2004/0263612 | A1 | 12/2004 | Harter, Jr. et al. |
| 2005/0039370 | A1 | 2/2005 | Strong et al. |
| 2005/0174651 | A1 | 8/2005 | Spitzer et al. |
| 2007/0081256 | A1 | 4/2007 | Travers et al. |
| 2009/0123144 | A1 | 5/2009 | Maezono et al. |
| 2009/0235570 | A1 | 9/2009 | Sammut et al. |
| 2010/0321477 | A1 | 12/2010 | Iwasaki et al. |
| 2011/0026090 | A1 | 2/2011 | Minor et al. |
| 2012/0030985 | A1 | 2/2012 | Mauricio et al. |
| 2012/0055062 | A1* | 3/2012 | Mironichev ............ F41C 23/02 42/85 |
| 2012/0097741 | A1 | 4/2012 | Karcher |
| 2013/0212922 | A1* | 8/2013 | Thomas .................. F41G 1/065 42/119 |
| 2013/0279013 | A1 | 10/2013 | Edwards et al. |
| 2014/0226214 | A1 | 8/2014 | Edwards et al. |
| 2015/0138633 | A1 | 5/2015 | Theisinger et al. |
| 2015/0176948 | A1 | 6/2015 | Varshneya et al. |
| 2015/0176949 | A1 | 6/2015 | Varshneya et al. |
| 2015/0338191 | A1 | 11/2015 | Maryfield et al. |
| 2016/0048001 | A1* | 2/2016 | McCreight, Jr. ..... G02B 6/0008 362/581 |
| 2016/0202282 | A1 | 7/2016 | Maryfield et al. |
| 2016/0209153 | A1 | 7/2016 | Dueck et al. |
| 2016/0223293 | A1 | 8/2016 | Maryfield et al. |
| 2016/0290765 | A1 | 10/2016 | Maryfield et al. |

FOREIGN PATENT DOCUMENTS

| | | |
|---|---|---|
| WO | 2016/007655 A1 | 1/2016 |
| WO | 2016/154454 A1 | 9/2016 |
| WO | 2016/164618 A1 | 10/2016 |

OTHER PUBLICATIONS

U.S. Appl. No. 14/543,761, "First Action Interview Office Action Summary" dated Oct. 2, 2015, 2 pages.
U.S. Appl. No. 14/543,761, "Notice of Allowance" dated Jan. 13, 2016, 10 pages.
U.S. Appl. No. 14/543,761, "Pre-Interview First Office Action" dated Jul. 10, 2015, 4 pages.
U.S. Appl. No. 15/079,851, "First Action Interview Pilot Program Pre-Interview Communication" dated Mar. 30, 2018, 4 pages.
U.S. Appl. No. 15/093,237, "Notice of Allowance" dated Jun. 16, 2017, 7 pages.
U.S. Appl. No. 15/784,673, "Non-Final Office Action" dated Mar. 8, 2018, 6 pages.
PCT/US2014/066178, "International Preliminary Report on Patentability" dated Jun. 2, 2016, 8 pages.
PCT/US2014/066178, "International Search Report and Written Opinion" dated Feb. 18, 2015, 11 pages.
PCT/US2016/024046, "International Preliminary Report on Patentability" dated Oct. 5, 2017, 7 pages.
PCT/US2016/024046, "International Search Report and Written Opinion" dated Jun. 14, 2016, 11 pages.
PCT/US2016/026497, "International Preliminary Report on Patentability" dated Oct. 19, 2017, 7 pages.
PCT/US2016/026497, "International Search Report and Written Opinion" dated Jun. 14, 2016, 11 pages.
Non-Final Office Action dated Aug. 10, 2018 in U.S. Appl. No. 15/079,851, all pages.

\* cited by examiner

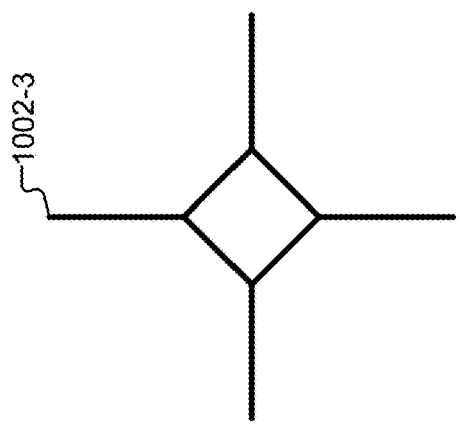
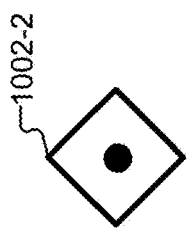
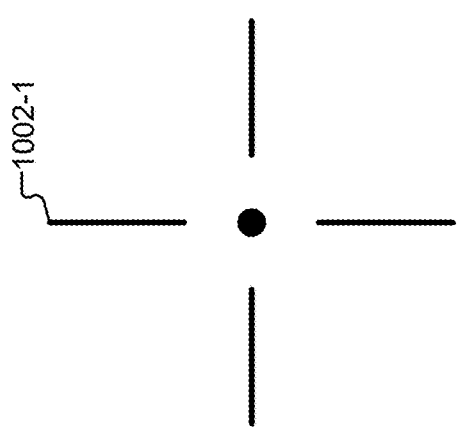
FIG. 10

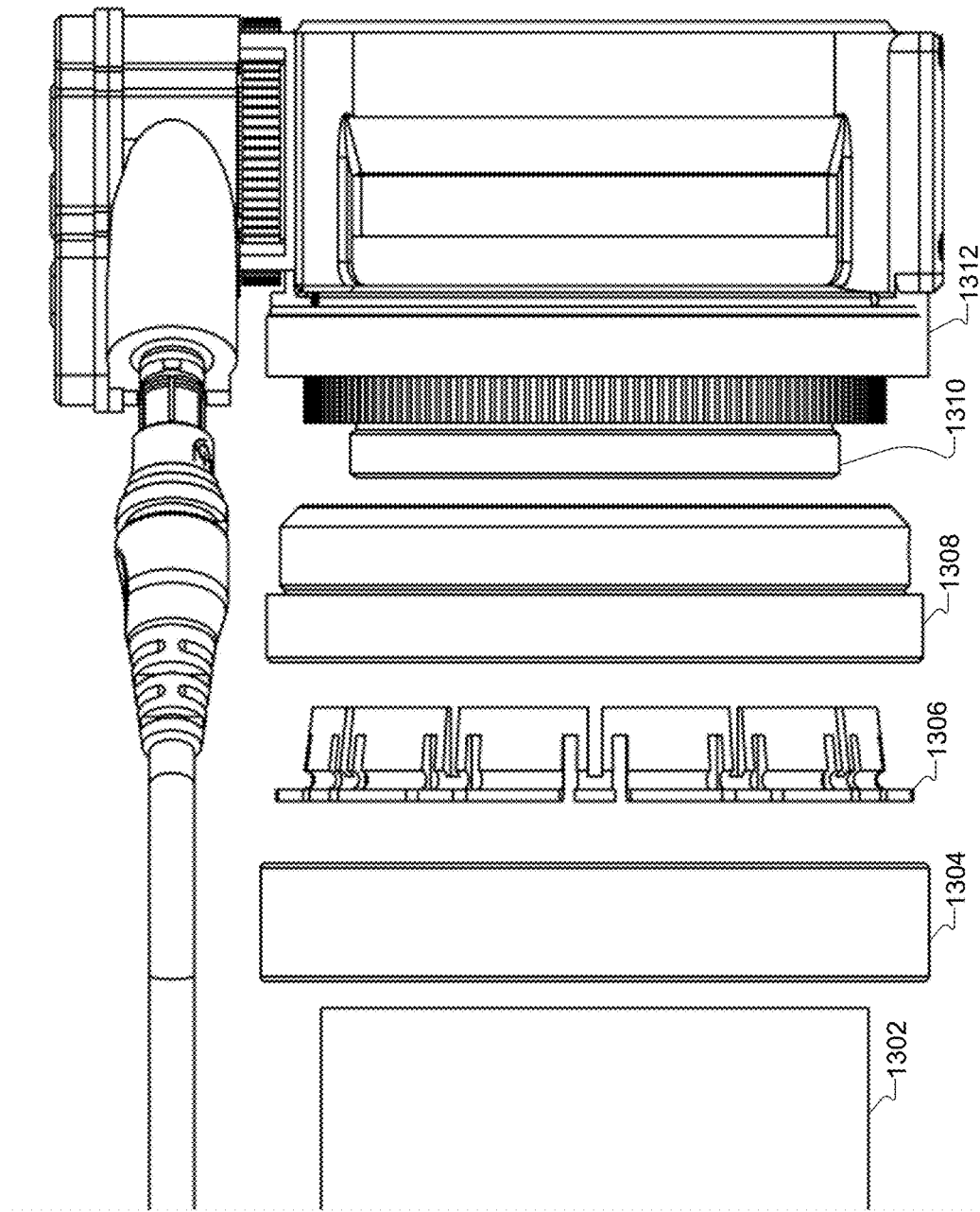

LOW-COST RIFLE SCOPE DISPLAY ADAPTER

CROSS-REFERENCES TO RELATED APPLICATIONS

The present application is a continuation-in-part of U.S. patent application Ser. No. 15/784,673, filed Oct. 16, 2017, entitled "RIFLE SCOPE TARGETING DISPLAY ADAPTER MOUNT," which is a continuation of U.S. patent application Ser. No. 15/093,237, filed on Apr. 7, 2016, (which issued Oct. 17, 2017, as U.S. Pat. No. 9,791,244), entitled "RIFLE SCOPE TARGETING DISPLAY ADAPTER MOUNT," which claims the benefit under 35 USC 119(e) of U.S. Provisional Application No. 62/144,218, filed on Apr. 7, 2015, entitled "MULTI-USE RIFLE SCOPE PROJECTED DISPLAY MOUNTING TECHNIQUE," which is incorporated herein by reference. U.S. patent application Ser. No. 15/093,237 is also a continuation-in-part of U.S. patent application Ser. No. 15/079,851, filed on Mar. 24, 2016, entitled "RIFLE SCOPE TARGETING DISPLAY ADAPTER," which is incorporated herein by reference.

U.S. patent application Ser. No. 15/079,851 claims the benefit under 35 USC 119(e) of the following U.S. Provisional Applications: U.S. Provisional Application No. 62/137,585, filed on Mar. 24, 2015, entitled "SMART COMPACT RIFLE SCOPE DISPLAY ADAPTER (RDA)"; U.S. Provisional Application No. 62/138,893, filed on Mar. 26, 2015, entitled "RIFLE SCOPE WITH INTEGRATED TARGETING DISPLAY"; and U.S. Provisional Application No. 62/144,218, filed on Apr. 7, 2015, entitled "MULTI-USE RIFLE SCOPE PROJECTED DISPLAY MOUNTING TECHNIQUE." Each of these U.S. Provisional Applications listed above is incorporated herein by reference.

U.S. patent application Ser. No. 15/079,851 is also a continuation-in-part of U.S. patent application Ser. No. 14/543,761, filed on Nov. 17, 2014, (which issued May 10, 2016 as U.S. Pat. No. 9,335,124), which is incorporated herein by reference.

BACKGROUND

Aspects of the disclosure relate in general to the display of aiming, target selection and/or other information through a rifle scope.

Current military tactics call for combat snipers to work in close coordination with a spotter as part of a sniper team. The spotter provides protection and situational awareness for the sniper, since the sniper must devote substantial energy and attention to positioning the sniper rifle for an effective shot. Oftentimes, the spotter uses a targeting computer that is designed to provide aiming information appropriate for the sniper rifle being used. Some targeting computers provide the observer with a video feed of the target environment and compute aim point adjustments based on the wind, distance to target, target movement and the ballistic characteristics of the rifle being used.

When utilizing such a targeting computer, the spotter typically provides the sniper with a verbal description of the intended target as well as a vertical and horizontal adjustment factor. The sniper then manually moves the scope of the sniper rifle to reflect the vertical and horizontal adjustment factor. Once the scope is adjusted, the sniper can sight the target with the scope reticle for an accurate shot. However, this process requires the sniper to remove his/her hands from the firing position, which may cause the rifle to shift on the rifle support. This process may also require the sniper to momentarily take their eyes off the target in order to make manual adjustments. Communicating targeting information verbally between the spotter and the sniper can also generate noise and distractions that can give away the sniper's position.

BRIEF SUMMARY

Embodiments of the invention(s) described herein enable the display of information (e.g., information related to aiming and/or target selection and/or other information) through the use of a rifle scope display adapter (RDA) that can be coupled to and/or placed in proximity to an existing rifle scope. This information, which is viewable through the eyepiece of the rifle scope, can come from a spotter and/or other information source. The RDA may utilize a polarized transmissive-reflective optical element to enable light generated by the RDA to be reflected into the objective of the rifle scope, as well as light from a scene viewable by the rifle scope to be transmitted through the polarized transmissive-reflective optical element to the objective.

An example rifle scope display adapter, according to the description, comprises a body coupleable with a rifle scope and having a display unit disposed in a casing and an optical subassembly disposed in the casing that includes a lens and a reflective element. The optical subassembly is configured to direct light from the display unit toward a polarized transmissive-reflective optical element. The polarized transmissive-reflective optical element is coupled with the casing such that, when the body of the rifle scope display adapter is coupled with the rifle scope, the polarized transmissive-reflective optical element is disposed in front of an objective lens of the rifle scope in a manner to reflect the light from the display unit toward the objective lens of the rifle scope, and transmit other light incident to the polarized transmissive-reflective optical element and traveling toward the objective lens of the rifle scope.

Embodiments of the rifle scope display adapter may comprise one or more of the following features. The polarized transmissive-reflective optical element may comprise a polarized window. The polarized transmissive-reflective optical element may be configured to, when the body of the rifle scope display adapter is coupled with the rifle scope, occupy substantially all of the field of view of the rifle scope. The display unit may comprise a liquid crystal on silicon (LCOS). The optical subassembly may further comprise a light-emitting element, a polarizing element configured to polarize light emitted by the light-emitting element, and a polarized beam splitter, where the polarized beam splitter is configured to reflect the polarized light towards the LCOS and transmit light reflected by the LCOS toward the reflective element, the light reflected by the LCOS comprising the light from the display unit. The rifle scope display adapter may further comprise a diffuser disposed between a light-emitting element and the polarized beam splitter, where the diffuser is operable to diffuse light emitted by the light-emitting element. The lens of the optical subassembly may comprise a movable telephoto lens. The rifle scope display adapter may further comprise a polarized coating on only a portion of a surface of the polarized transmissive-reflective optical element. An area of the portion of the surface comprises less than 20% of the total area of the surface.

An example method of directing light from a display unit toward an objective lens of a rifle scope, according to the description, comprises causing the display unit to display an image, and using an optical subassembly to direct light from the display unit toward a polarized transmissive-reflective optical element, where the optical subassembly includes a lens and a reflective element. The method further comprises positioning the polarized transmissive-reflective optical element such that the polarized transmissive-reflective optical element is disposed in front of the objective lens of the rifle scope in a manner to reflect the light from the display toward the objective lens of the rifle scope, and transmit other light incident on the polarized transmissive-reflective optical element traveling toward the objective lens of the rifle scope.

Embodiments of the method may comprise one or more the following features. The polarized transmissive-reflective optical element may comprise a polarized window. The polarized transmissive-reflective optical element may be configured to, when the rifle scope display adapter is coupled with the rifle scope, occupy substantially all of the field of view of the rifle scope. The display unit may comprise a liquid crystal on silicon (LCOS). The method may further comprise causing a light-emitting element to emit light, polarizing the light emitted by the light-emitting element, and using a polarized beam splitter configured to reflect the polarized light towards the LCOS, and transmit light reflected by the LCOS toward the reflective element, where the light reflected by the LCOS comprises the light from the display unit. The method may further comprise diffusing light emitted by the light-emitting element. The lens of the optical subassembly may comprise a movable telephoto lens. The polarized transmissive-reflective optical element may be configured to reflect the light from the display unit using a polarized coating on only a portion of a surface of the polarized transmissive-reflective optical element. An area of the portion of the surface may comprise less than 20% of the total area of the surface.

Another example rifle scope display adapter, according to the description, comprises a display unit disposed in a casing and an optical subassembly disposed in the casing and including an adjustable lens and a reflective element. The optical subassembly is configured to direct light from the display unit toward a polarized transmissive-reflective optical element. The polarized transmissive-reflective optical element is coupled with the casing such that, when the rifle scope display adapter is positioned for use, the polarized transmissive-reflective optical element is disposed in front of an objective lens of the rifle scope in a manner to reflect the light from the display unit toward the objective lens of the rifle scope and transmit other light incident to the polarized transmissive-reflective optical element traveling toward the objective lens of the rifle scope. In some embodiments of the rifle scope display adapter, the polarized transmissive-reflective optical element may comprise a polarized window.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein:

FIG. 10 illustrates a plurality of different targeting reticles that can be selected by the shooter during the configuration phase for the RDA, according to some embodiments.

FIGS. 13A-13D illustrate various views of one embodiment of an RDA assembly, according to some embodiments.

Figure 1A:
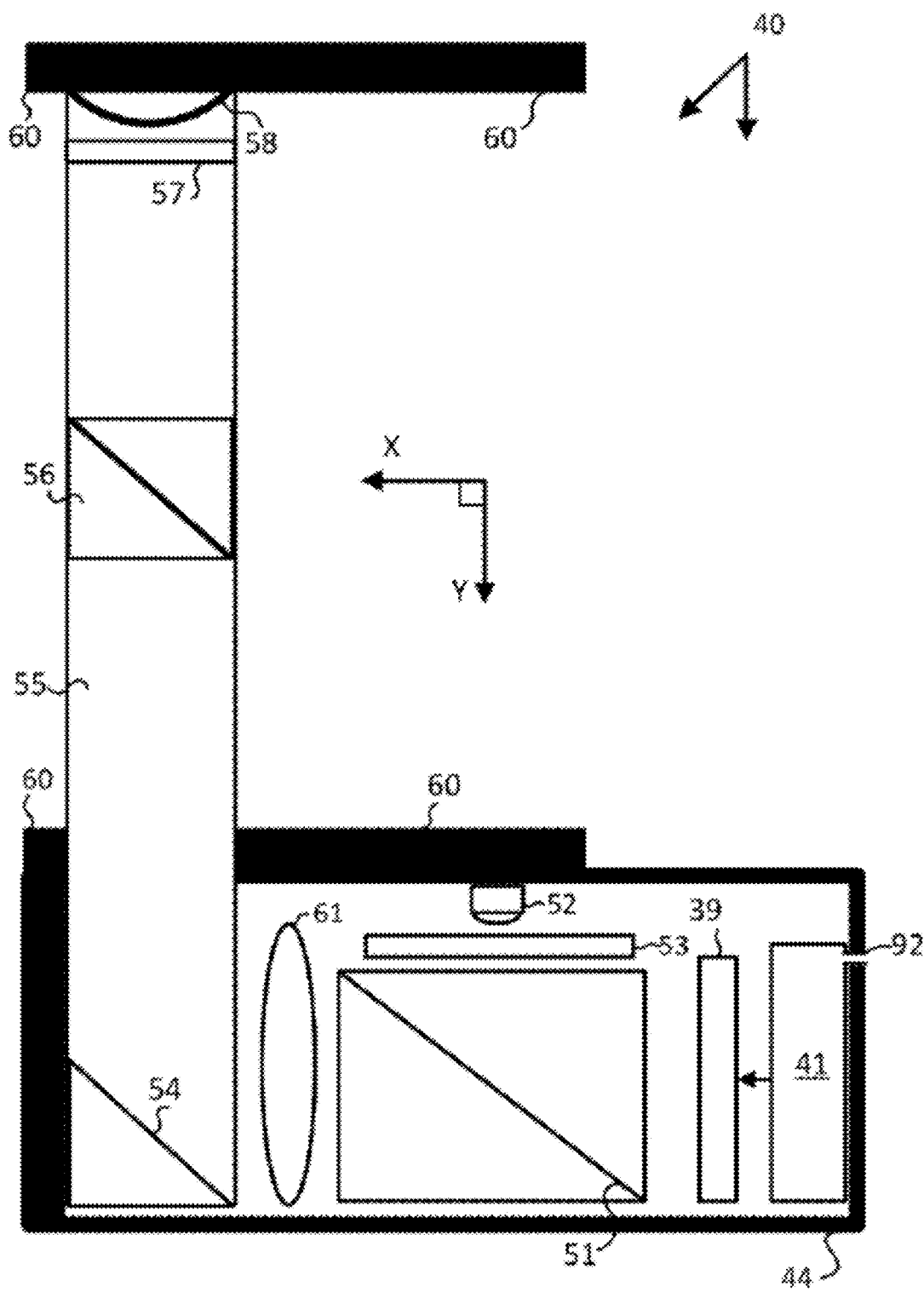
FIG. 1A is a block diagram of an example rifle scope display adapter.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

Several illustrative embodiments of a rifle scope display adapter will now be described with respect to the accompanying drawings, which form a part of this disclosure. While particular rifle scope display adapter implementations and embodiments are described below, other embodiments and alternative designs may be made without departing from the scope of the disclosure or the spirit of the appended claims.

As used herein, the term "transmissive-reflective optical element" refers to an optical element that is capable of both reflecting light and transmitting light. This includes the transmissive light bar and polarized window described in the embodiments provided herein. A person of ordinary skill in the art will recognize that other optical elements, therefore, may be considered "transmissive-reflective optical elements". Such elements may further be polarized to enable, for example, more effective reflection of polarized light. The use of polarized coatings, for example, may enable such elements to be polarized.

According to some embodiments, a lightweight, compact rifle scope display adapter can be configured to be securely affixed to a rifle scope in front of the scope's objective lens. When attached to a rifle scope, the "rifle scope display adapter" (hereinafter also referred to interchangeably as a "display adapter" and/or an "adapter") can be operated to supplement the rifle scope view of the target by displaying aim point and/or trajectory information computed by a ballistic computer for a selected target. Specifically, the rifle scope display adapter can provide aim point information in the form of illuminated symbology that overlays the target view seen through the eyepiece of the scope. The adapter provides the symbology in such a way that it overlays the view provided by the rifle scope optics, without impeding a sniper's view of the target environment. In a simple form, the adapter enables a conventional scope to be operated as a "red dot" scope without any modification other than attachment of the adapter to the scope to the end of the rifle scope.

The rifle scope display adapter can be configured as a small and lightweight unit that can be tightly fastened to the front end of conventional magnifying rifle scopes without requiring any scope modification. A mechanical mounting fixture coupled to the adapter allows the adapter to be quickly attached to and removed from the rifle scope without equipment such as wrenches or screwdrivers. Additionally or alternatively, the rifle scope display adapter may include components for mounting the adapter immediately in front of a rifle scope objective lens in such a way that the adapter is coupled to and supported by the rifle itself, without being affixed to the scope. This disclosure primarily describes and illustrates embodiments of the rifle scope display adapter that include components for affixing the adapter directly to a rifle scope. However, in view of these descriptions and drawings, the design of alternative rifle scope adapter embodiments that facilitate direct mounting to a rifle would be readily apparent to one of ordinary skill in the art, and are therefore within the scope of this disclosure.

The rifle scope display adapter may include optical elements, processing circuitry, mounting hardware, electrical connectors, and cabling. The rifle scope display adapter may also include light emitting circuitry. The illumination source of the symbology that overlays the image viewed through the rifle scope may be considered light emitting circuitry, according to some embodiments. The light emitting circuitry provides front lighting of a liquid crystal on silicon element that includes numerous reflective pixels, each of which can reflect incident light in a manner that can be varied by an electrical control signal. Within the rifle scope display adapter, the location, intensity, color and shape of aim point symbology and/or video images is controlled by electric signals that vary the reflection provided by individual liquid crystal on silicon (LCOS) reflective elements. By activating a particular combination of reflective elements while other reflective elements are inactive, the adapter projects and directionally controls light for illuminating a symbol or video image viewable through the scope. The rifle scope optics focus this projected light in such a way that it appears as overlaying the image of the target or other scene viewed through the scope.

While mounted in front of or attached to the rifle scope, the display adapter can be communicatively coupled to a targeting or ballistic computer wirelessly or by way of a connecting cable. The display adapter can be coupled to the computer regardless of whether the computer is also mounted on the rifle or detached and independently manipulated by a spotter or working in cooperation with a sniper.

The communicative coupling enables the display adapter to receive aim point and trajectory information computed by a ballistic computer. The aim point information may include an aim point displacement relative to the rifle scope reticle. In this case, processing circuitry within the adapter controls a combination of LCOS optical reflective elements so that light reflected from the LCOS, when focused at the rifle scope eyepiece, will be seen to reflect the specified offset relative to the reticle.

Alternatively or additionally, the optical system may receive raw image data through the connecting cable. The image data may consist of raw or compressed pixilation data for the display of symbology, video, or still images. The processing circuitry then sets control signals for the LCOS reflective elements so that each signal reflects the corresponding pixel value in the data.

The rifle scope display adapter may project an aim point indicator symbol so that it is observed as a small illuminated dot that overlays the natural image of the target. In this way, the shooter can move the rifle to place the projected aim point indicator on the target instead of the aim point of the rifle scope. By moving the rifle in this way, the shooter can compensate for the computed effect of windage and/or bullet drop without adjusting the scope, looking away from the scope image, changing his/her grip on the rifle, and/or manipulating a ballistic computer.

Figure 1B:
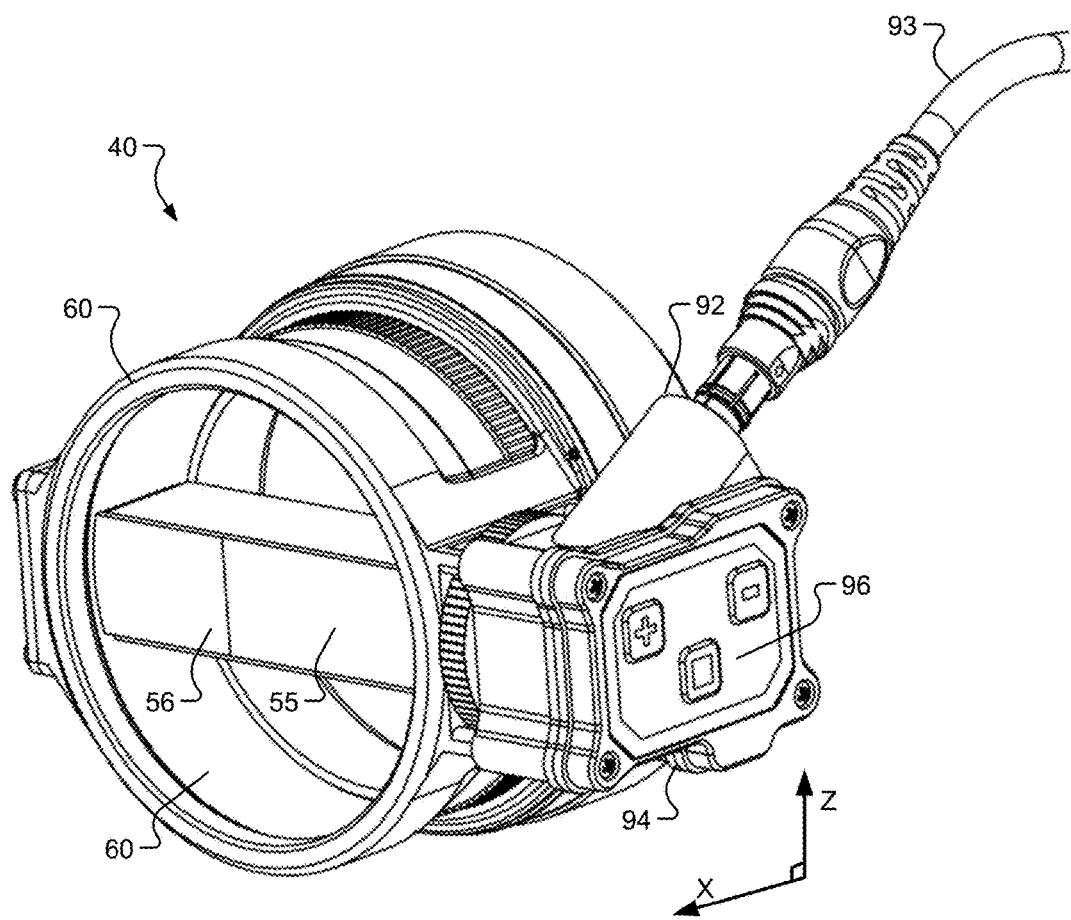
FIG. 1B is a perspective diagram of an example rifle scope display adapter.
Figure 1C:
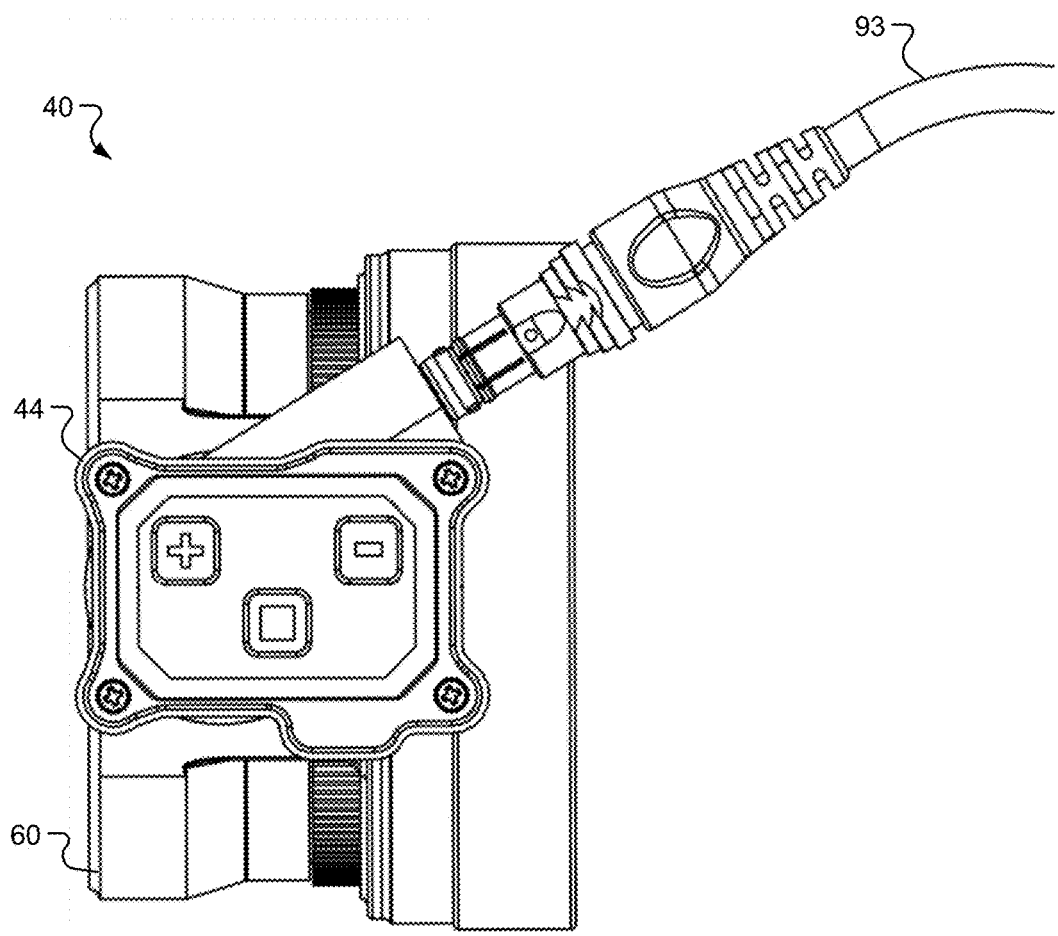
FIG. 1C is an oblique, left-side view of an example rifle scope display adapter.
Figure 1D:
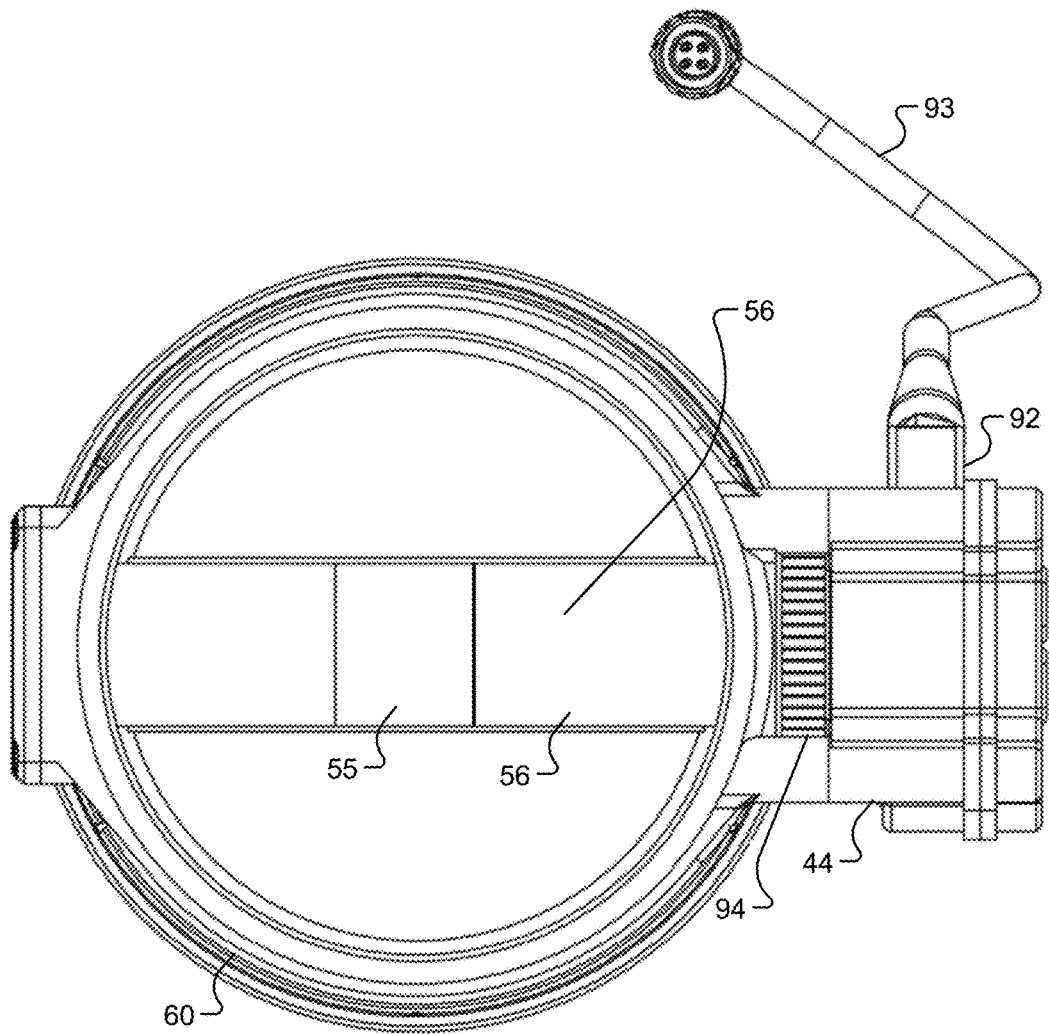
FIG. 1D is a frontal view of an example rifle scope display adapter.

FIG. 1A is a generalized block diagram showing an examplary configuration of certain light emitting components, optical components, and circuitry in the rifle scope display adapter 40, according to some embodiments. FIG. 1A is intended to be viewed in conjunction with FIGS. 1B-1D, which will be described together with FIG. 1A. FIG. 1B is a perspective diagram of the rifle scope display adapter 40 from a vantage point to the front and left of the adapter. FIG. 1C is an oblique view of the rifle scope adapter 40 as seen from the left side of the adapter. FIG. 1D is a frontal view of the adapter 40. FIGS. 1A-1D depict the rifle scope display adapter 40 in a standalone condition in which it is not attached to a rifle scope or other rifle mounting point.

In FIG. 1A, certain components are depicted within a casing 44. The casing 44, which is also visible in FIGS. 1B-1D, may surround and enclose these components on all sides, thereby providing protection from the elements, as well as some degree of protection from optical noise and peripheral light that could otherwise interfere with the quality of the images and symbols projected when the display adapter is affixed to a rifle scope.

The components depicted within the casing 44 (which are explicitly shown in FIG. 1A) include processing circuitry 41, an LED 52, LCOS 39, diffuser (not shown in FIG. 1A), polarizer 53, polarized beam splitter 51 (referred to hereinafter as a "first polarized beam splitter" to differentiate it from another similar component), moving telephoto lens 61 and reflective element 54. The moving telephoto lens 61 provides parallax adjustment. Through movement of a knob 94 mounted external to the casing 44 and visible in FIGS. 1B-1D, a shooter can position the telephoto lens 61 as needed to prevent parallax from affecting the view of the target seen through a rifle scope. A button interface 96 explicitly depicted in FIGS. 1B and 1C provides an interface to the processing circuitry 41 so that display brightness, display mode, and other display settings can be adjusted.

The image processing circuitry 41 is also used to control, amongst other things, the light emitted by a light emitting diode (LED) 52. The LED 52 emits white light that is the source of the illumination used to project aim point symbology and video images when the display adapter 40 is attached to a rifle scope. Light emitted by the LED 52 is reflected by the (LCOS) 39. The LCOS 39 includes several thousand reflective crystal elements, each of which is controlled by way of an electrical signal generated by the processing circuitry 41. The processing circuitry 41 controls the display of symbology or video images by using these electrical signals to cause reflections to occur at the LCOS in such a way that the reflected light is focused by the rifle scope optics, causing the desired to appear.

In FIG. 1A, these electrical signals are represented by the solid arrow between the processing circuitry 41 and the LCOS 39. The processing circuitry 41 includes a connection port 92 at which a cable can be attached to connect the processing circuitry 41 to an external ballistic computer, targeting, and/or video generating device. The processing circuitry 41 processes aim point and trajectory information, video data, and/or image data received through a cable attached to connection port 92.

In FIGS. 1B-1D an intermediate cable 93 is depicted as being connected to the processing circuitry 41 at the connection port 92. The intermediate cable 93 includes a female connecting port through which an electrical connection between a ballistic computer and the processing circuitry 41 of the display adapter 40 may be established. Other embodiments may additionally or alternatively include wireless communication means, such as a radio frequency (RF) transceiver, antenna, and/or the like.

The processing circuitry 41 may be designed to access aim point and trajectory information in the form of raw data representative of an aim point symbol display location. The display location may be specified as an offset from a rifle scope reticle. For the purposes of this disclosure, the rifle scope "reticle" refers to fixed crosshairs that are positioned at the center of a rifle scope image, or, more generally, to the center of the image seen through a scope. The reticle of the rifle scope may be permanently etched into a glass element of the rifle scope, and may be contrasted with the projected targeting image displayed by the rifle scope display adapter. The aim point and trajectory information may alternatively be in the form of pixel data representing an image having an aim point symbol positioned to compensate for computed windage and bullet drop.

FIG. 1A also depicts other optical components external to the casing 44, several of which are also depicted in FIGS. 1B-1D. These components include a transmissive light bar 55, an additional polarized beam splitter 56 (hereinafter "second polarized beam splitter"), a spherical mirror 58 and a quarter-wave plate 57. As can be seen in FIG. 1B, the light bar 55 diametrically traverses an annulus 60 on which the casing 44 is mounted. As will be illustrated in other drawings provided herein, the annulus 60 is configured to extend forward of a rifle scope's objective lens when the display adapter 40 is affixed to the scope. When the display adapter 40 is attached to a rifle scope, an aperture in the annulus 60 allows light from the scene to pass unimpeded to the objective lens of the scope. In this way, the optics of the scope can focus an image of the target at the eyepiece.

A series of arrows in three dimensions is also shown in FIG. 1A. This series of arrows is intended to provide a directional reference system that is consistent across multiple different viewing angles manifested in the drawings provided herein. These arrows (X, Y, and Z) are presented throughout the drawings in a manner that is consistent with respect to the components of the rifle scope display adapter, despite the difference in viewing angles from one drawing to the next.

Figure 2A:
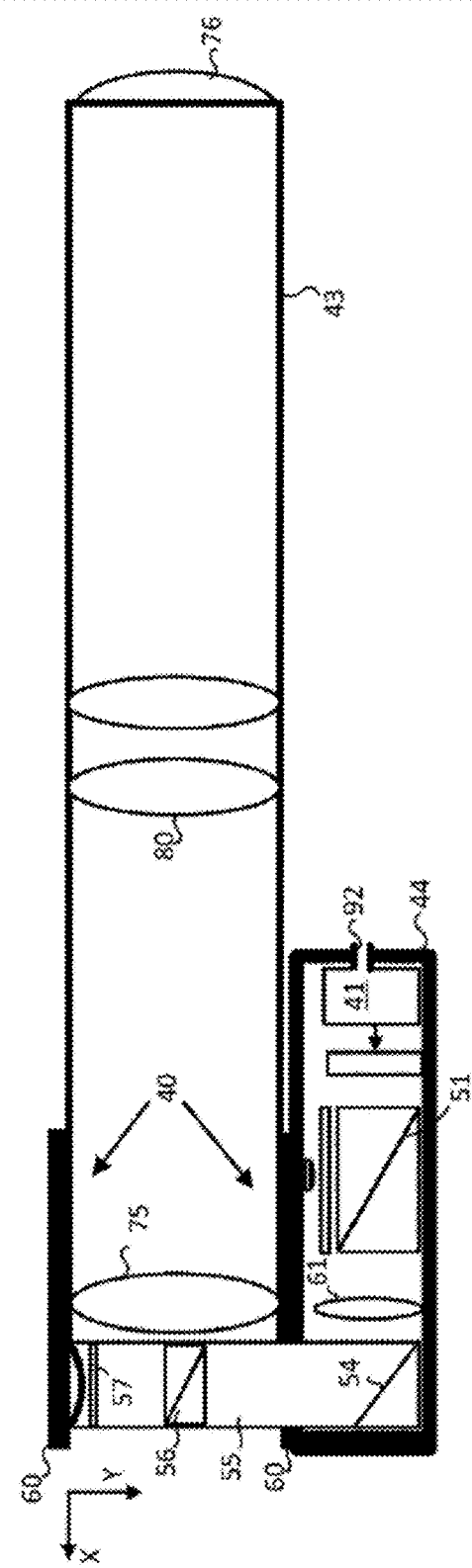
FIG. 2A is a block diagram of an example rifle scope display adapter depicted relative to components of a rifle scope to which the adapter is affixed.
Figure 2B:
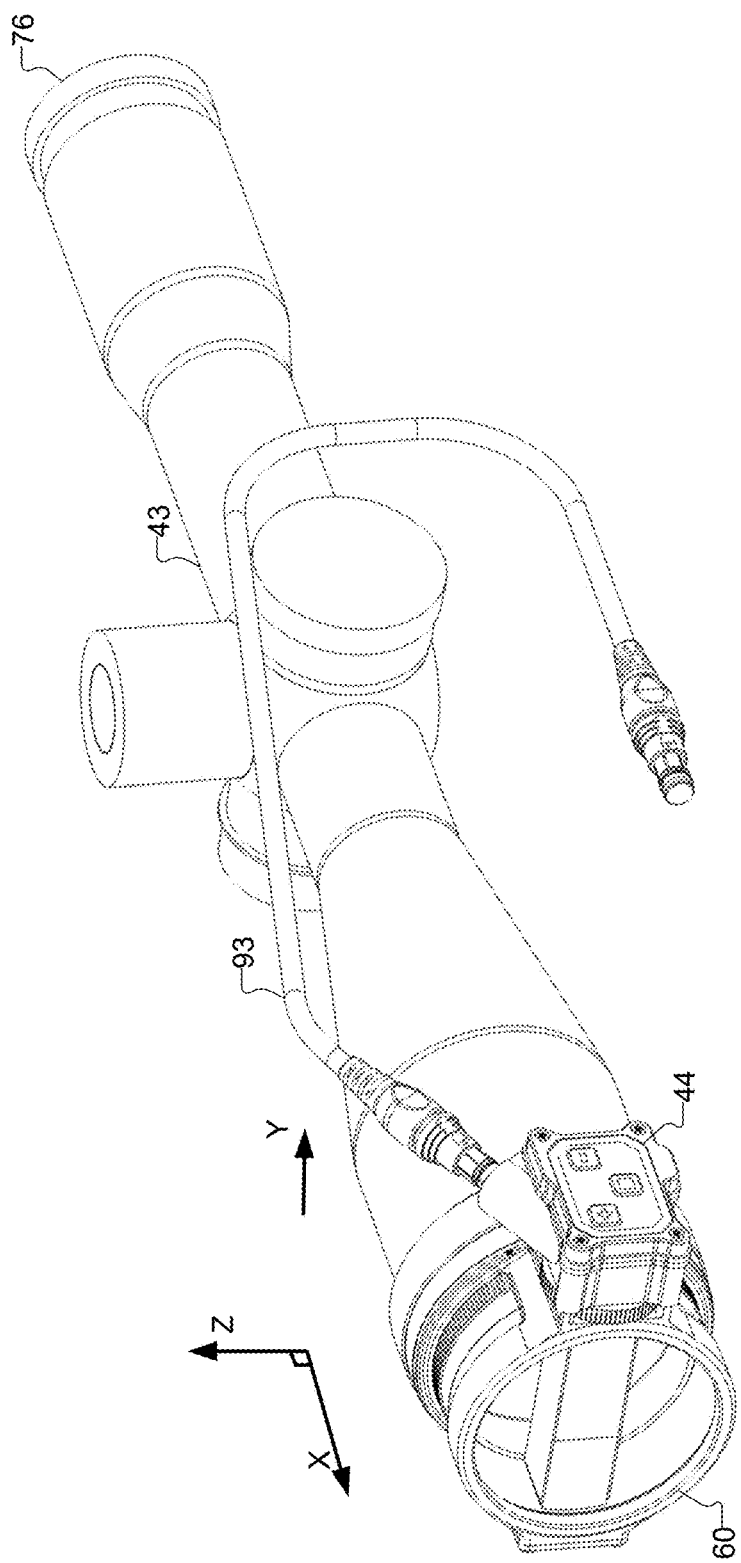
FIG. 2B is a perspective diagram depicting a rifle scope to which an example rifle scope display adapter is affixed.

FIG. 2A is a block diagram that shows the rifle scope display adapter 40 in a condition in which it is affixed to a rifle scope 43. Other than for the fact that FIG. 2A shows the adapter 40 components relative to components of the rifle scope 43 to which the adapter 40 is affixed, the diagram of the display adapter 40 in FIG. 2A is similar to the display adapter in FIG. 1A. FIG. 2B, which is meant to be viewed in conjunction with FIG. 2A, is a perspective diagram of the display adapter 40 of FIG. 2A and the rifle scope 43 to which it is affixed. FIG. 2B represents a view of display adapter 40 and rifle scope 43 as seen from slightly to the front and left of the rifle scope 43.

As shown in FIGS. 2A and 2B, the rifle scope 43 includes an objective lens 75 and additional magnifying lenses 80. The rifle scope 43 also includes an eyepiece 76 through which an image of a target or scene can be viewed. Moreover, symbols, images and video can be projected by the display adapter 40 and focused by the rifle scope 43 optics so as to be visible at the eyepiece 76. The display adapter 40 can provide these projections so that they overlay the view of the target or occupy the entire eyepiece 76.

The rifle scope display adapter 40 shown in FIGS. 2A and 2B is affixed to the rifle scope 43 with the annulus 60 of the adapter 40 surrounding the sides of the rifle scope 43 at the target end of the rifle scope 43. A portion of the annulus 60 extends slightly forward of the objective lens 75, in the direction of the target (x-direction, as shown by the dashed arrow). Also, the lightbar 55 traversers the aperture of the annulus 60 at a point slightly forward of the objective lens 75. It is important to note that several display adapter components previously depicted in FIG. 1A are also shown in FIG. 2A, but are too small to be labeled.

Figure 2C:
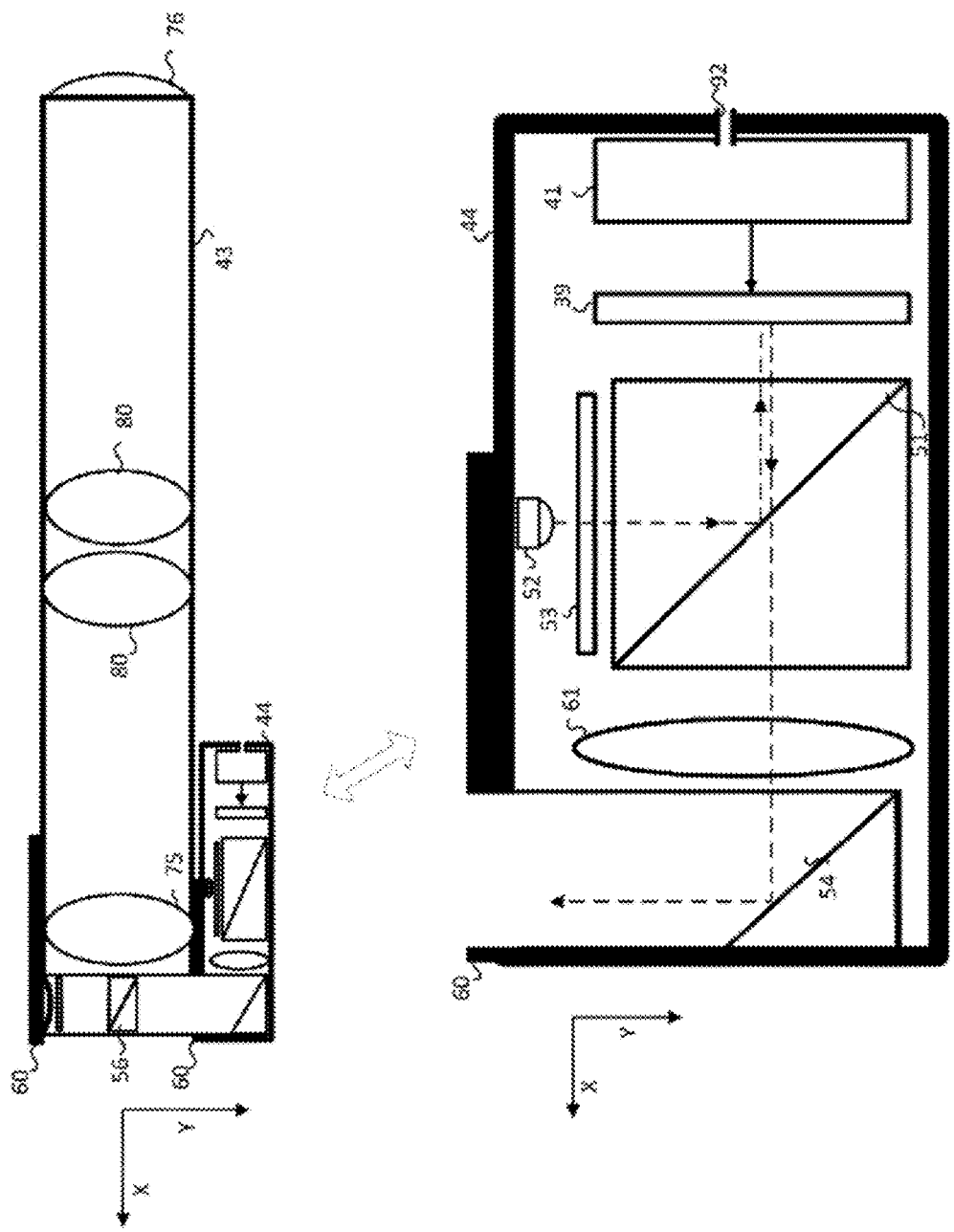
FIG. 2C is block diagram of a rifle scope display adapter that shows a magnified view of certain adapter components, and depicts a path of light relative to these components.

FIG. 2C includes the depiction of the rifle scope display adapter 40 affixed to a rifle scope 43, as previously seen in FIGS. 2A and 2B. FIG. 2C also shows a magnified view of the rifle scope display adapter 40 components enclosed by the casing 44, as well as a first portion of a path of light emitted by the LED 52 during illumination of an aim point symbol projected by the adapter 40 and focused at the rifle scope eyepiece 76. A second part of this path will be shown in FIG. 2D.

Figure 2D:
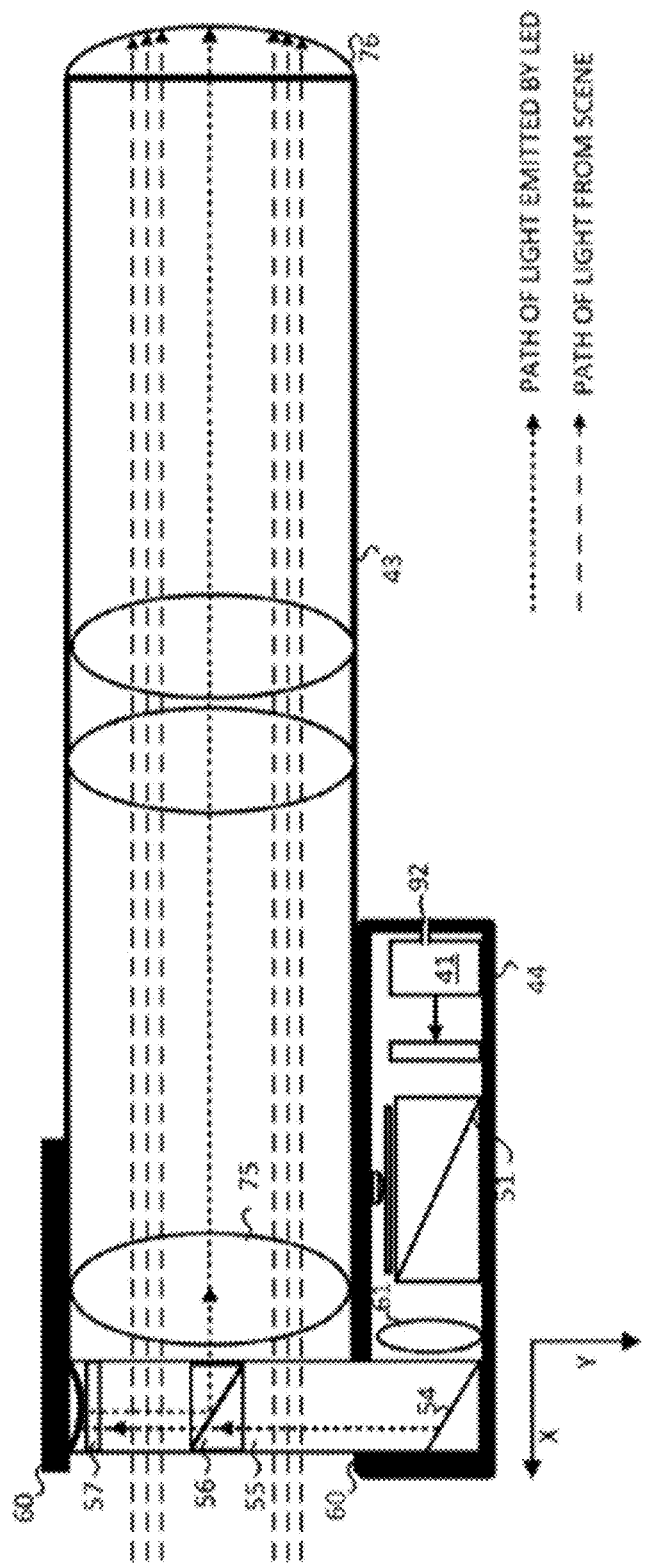
FIG. 2D is a block diagram that shows an example light path relative to components of a rifle scope display adapter and components of a rifle scope to which the adapter is affixed.

The depiction of the path of light in FIGS. 2C and 2D is highly generalized and is not intended to show angles of incidence, reflection and refraction. As such, these drawings should be understood as exhibiting only an approximate path of light relative to the various components of the rifle scope display adapter 40, as well as depicting certain adapter components that reflect the light within the casing 44 and certain components that transmit the light.

For example, FIG. 2C depicts that after light is emitted by the LED 52, it is transmitted and polarized by the polarizer 53. As a result of the polarization of the light that occurs at the polarizer 53, the light is reflected towards the LCOS 39 at the first polarized beam splitter 51. While the processing circuitry 41 controls the reflective pixel elements of the LCOS 39, various active pixel elements reflect the light back in the direction of the first polarized beam splitter 51.

After being reflected at the LCOS 39, the light is transmitted by both the first polarized beam splitter 51 and the moving telephoto lens 61. The reflective element 54 then reflects the light into the light bar 55.

FIG. 2D provides a generalized illustration of a second portion of the path of light illustrated in FIG. 2C. The second portion of the path of light begins at reflective element 54, at which point the light enters the light bar 55. Thus FIG. 2D is intended to be viewed in combination with FIG. 2C, which depicts the path of the light ray prior to its exit from the casing 44 of the display adapter 40. As shown in FIG. 2D, the light enters the light bar 55 after being reflected at reflective element 54, is transmitted at the second polarizing beam splitter 56 and is reflected by the spherical mirror 58.

The light undergoes a polarity reversal imparted by the quarter-wave plate 57 and is then incident on the second polarizing beam splitter 56. The second polarizing beam splitter 56 reflects the light towards the objective lens 75 of the rifle scope. The light is incident on the objective lens 75 near the center of the lens, while light from the scene is incident on the objective lens 75 between the center and periphery of the lens. The magnifying 80 lenses of the rifle scope then refract and focus the light projected by the display adapter 40, as well as the light emanating from the scene. In this way, the light projected by the display adapter 40 is brought into focus as a symbol or image visible at the eyepiece 76 of the rifle scope. Simultaneously, the light emanating from the scene is brought into focus at the eyepiece 76. In this way, a shooter is able to see a magnified view of the target with an overlaid aim point symbol or other image while looking through the rifle scope 43.

Figure 3:
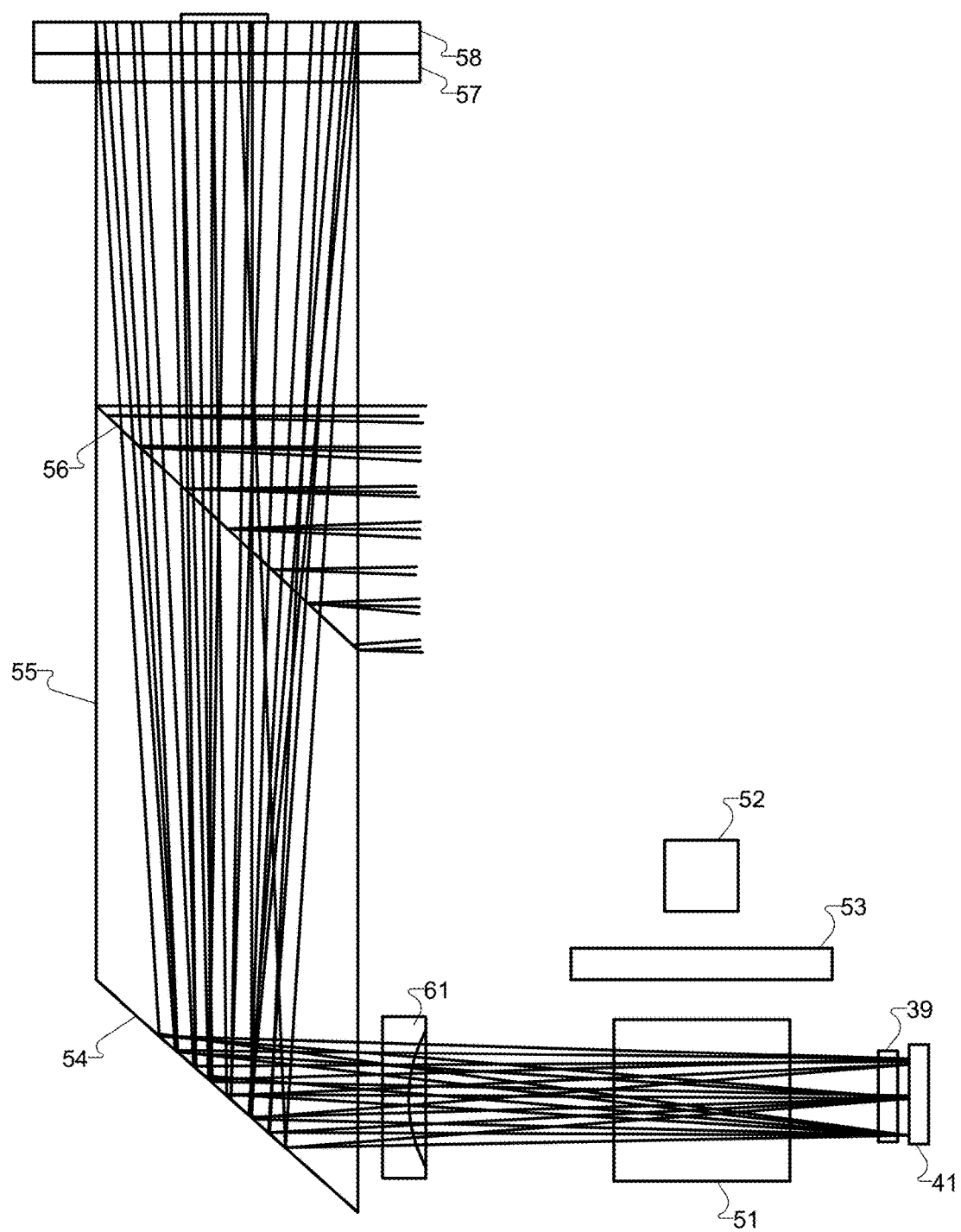
FIG. 3 is a diagram showing example paths of light rays within a rifle scope display adapter.

FIG. 3 is a schematic diagram showing the path of light rays in the rifle scope display adapter 40 during projection of a symbol or image visible through a rifle scope. In FIG. 3, depiction of the light emitted by the LED and the reflection of this light towards the LCOS 39 is omitted in order to avoid unnecessary complication of the drawing. Rather, the rays shown in the drawing are intended to illustrate the path of light only after its reflection at the LCOS 39. Additionally, the light path through the rifle scope is omitted in FIG. 3.

Although not shown, the LED 52 emits light towards a polarizing beam splitter 51 that is angled 45 degrees relative to the path of the light. Prior to reaching the first polarizing beam splitter 51, the light can be polarized by the polarizer 53. Optionally, the light may be diffused by a diffuser prior to reaching the first polarizing beam splitter 51 (e.g., the diffuser is disposed between the LED 52 and the polarizing beam splitter 51), before or after the polarizer 53. In some embodiments the polarizer 53 may also act as a diffuser.

Also, a wire grid polarizer (not shown) is used to polarize the light in such a way that it will be reflected at the first polarizing beam splitter 51. Because of the polarity of the light incident on the first polarizing beam splitter 51, the beam splitter reflects the light towards the LCOS 39 (leftwards, as viewed in FIG. 3).

The processing circuitry 41 generates electrical control signals that cause a combination of LCOS reflective pixel elements to reflect the incident light. The LCOS 39 also reverses the polarity of the light that it reflects. The light reflected by the LCOS 39 is reflected back towards the first polarizing beam splitter 51, where it is transmitted as a result of the polarity reversal imparted by the LCOS 39.

After being transmitted by the first polarized beam splitter 51, the light propagates towards a moving telephoto lens 61 that provides parallax adjustment. The light is divergently refracted by the telephoto lens 61 in a manner that provides compensation sufficient to prevent parallax from affecting the rifle scope view.

Subsequent to being transmitted by the telephoto lens 61, the light is incident on a reflective element 54 that is disposed at an angle that is approximately 45 degrees from parallel to the path of the light. The reflection of the light by the reflective element 54 causes an approximately 90 degree change in direction of the light. Following reflection, the light propagates through light bar 55. The light bar 55 may be shaped as a rectangular prism formed of a transmissive material that surrounds a second polarized beam splitter 56.

The second polarized beam splitter 56 is disposed within the light bar 55, and is approximately centered with respect to the circular aperture (not shown in FIG. 3) of the annulus. By being centered with respect to the circular aperture, the second polarizing beam splitter 56 is disposed so that it will coincide with an extended optical axis (not explicitly labeled) of the rifle scope 43 to which the adapter 40 is affixed. That is, the second polarizing beam splitter 56 will be disposed directly in front of the center of the rifle scope objective lens (not shown in FIG. 3).

As a result of the polarity of the light when reflected at reflective element 54, the light is transmitted by the second polarizing beam splitter 56 and is incident on the spherical mirror 58 disposed at the end of the light bar 55 opposite the reflective element 54. The spherical mirror 58 reflects the light towards the second polarizing beam splitter 56 and reverses the polarity of the light. Also, a quarter-wave plate 57 is disposed between the second polarizing beam splitter 56 and the spherical mirror 58. The quarter-wave plate reverses the polarity of the light.

As a result of the polarity reversal imparted by the quarter-wave plate 57, the second polarizing beam splitter 56 reflects the light, causing a 90 degree change in direction. As can be seen in FIG. 3, the light rays are effectively collimated by the reflection that occurs at the spherical mirror 58 and second polarizing beam splitter 56. These collimated light rays are then incident at the objective lens of the rifle scope (not shown), which transmits and refracts the rays towards the optical eyepiece in the manner depicted in FIG. 2D.

Rifle Scope Display

Figure 4:
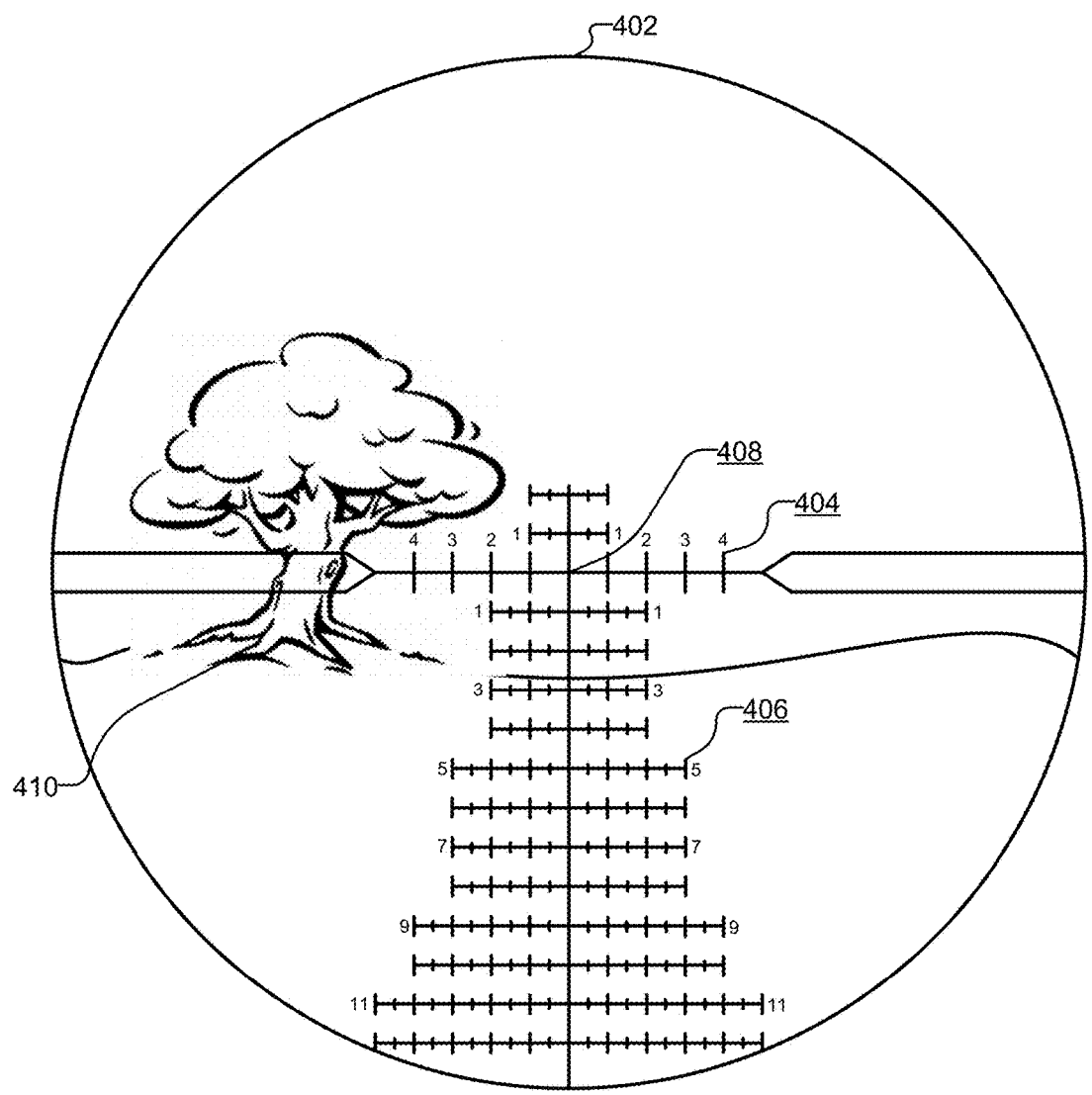
FIG. 4 illustrates one example of a view provided by a traditional rifle scope.

FIG. 4 illustrates one example of a view 402 provided by a traditional rifle scope. The view 402 shows a view of a long range target area 410 as seen through the eyepiece of a standalone magnifying rifle scope prior to installation of the rifle scope display adapter described herein. Shooting accurately at long ranges is not as simple as lining up a crosshair 408 with a target in the target area 410. For example, the environment between the rifle scope and the target area 410 may include strong crosswinds. Additionally, long-range shots need to take the effect of gravity into account, which causes a shot to drop between the rifle and the target area 410. A magnetic heading of the rifle may also affect long-range shots. A shot taken under these circumstances would drop and move to the right because of the strong left crosswind and effect of gravity over the lengthy distance to the target area 410.

Thus, to accurately hit targets in the target area 410 when using the standalone rifle scope shown in FIG. 4, a shooter would need to approximate an aimpoint above and to the left of the target. The shooter could approximate the aimpoint based on an estimation of the strength of the left cross-wind and the distance to the target area 410. The shooter could then use the aimpoint by manually aligning the crosshair above and to the left of the target. However, this methodology is very imprecise. The shooter could achieve better results by mechanically adjusting the rifle scope downwards and to the right using manual windage and elevation knobs that are included in most modern rifle scopes. However, making these mechanical adjustments can delay the shot and complicate the aiming process because the shooter's hands must be removed from the weapon, and may require the shooter to remove their eyes from the rifle scope, thus taking their eyes off the target. Also, the mechanical adjustment can only be as precise as the shooter's mental estimation of the necessary wind and elevation compensation.

Alternatively, the shooter or an assisting spotter could use a ballistic computer in conjunction with a laser rangefinder to compute a compensatory scope adjustment. The shooter would then mechanically adjust the rifle scope downwards and to the right by an amount equivalent to the computed adjustment. The adjustment to the scope would cause the rifle to actually be pointed above and to the left of the target, while the crosshair is seen as visually aligned with the target to the shooter's eye. Although this methodology is precise, it still requires that the shooter's hands be removed from the weapon and the shooter's eyes to be removed from the target prior to the shot being taken.

In addition to illustrating the view 402 of the target area 410 provided by the traditional rifle scope, FIG. 4 also illustrates markings that may be included as part of a rifle scope. For example, a crosshair 408 may be provided at the center of the rifle scope to indicate a bore-sighted aimpoint. Windage tick marks 404 may be used to help the shooter adjust for windage calculations/estimations. Elevation tick marks 406 may be provided to help the shooter adjust for bullet drop due to gravity. The crosshair 408, the windage tick marks 404, and/or the elevation tick marks 406 may be permanently etched into a glass element of the rifle scope, or alternatively may be implemented using visible wire elements inside the rifle scope. In either case, the crosshair 408, the windage tick marks 404, and/or the elevation tick marks 406 of the rifle scope may be permanently affixed to the rifle scope, and may be adjusted by windage and/or elevation knobs coupled to the outside frame of the rifle scope. These permanent markings in the rifle scope may be referred to herein as "visual rifle scope elements."

In order to provide a more integrated and accurate method for compensating for long-range effects of a rifle shot, the embodiments described herein for a rifle scope display adapter (RDA) may project information and/or symbols onto the optical elements of the RDA such that the information and/or symbols are clearly and immediately visible to the shooter through the rifle scope. As will be described below, windage, elevation, azimuth angles, tilt angles, and/or rotation ("cant") angles can be automatically measured in real time and displayed through the RDA to the shooter. A ballistic computer can use each of these measurements as inputs to generate a targeting solution that moves a virtual targeting reticle to a compensated location. The shooter can align the compensated location of the virtual targeting reticle through the rifle scope with the target in the target area for an accurate shot without removing his/her eyes from the target and without manually adjusting the windage/elevation knobs of the rifle scope.

In some embodiments, the RDA can be mechanically attached to the end of the rifle scope opposite the shooter's eyepiece. As described in detail above, the optical components of the RDA can display text and/or symbology through the optics of the rifle scope such that they are visible to the shooter. However, in order to ensure that the displayed symbology is properly scaled and aligned with the visual rifle scope elements, a calibration procedure can first be performed on the RDA as follows.

Figure 5A:
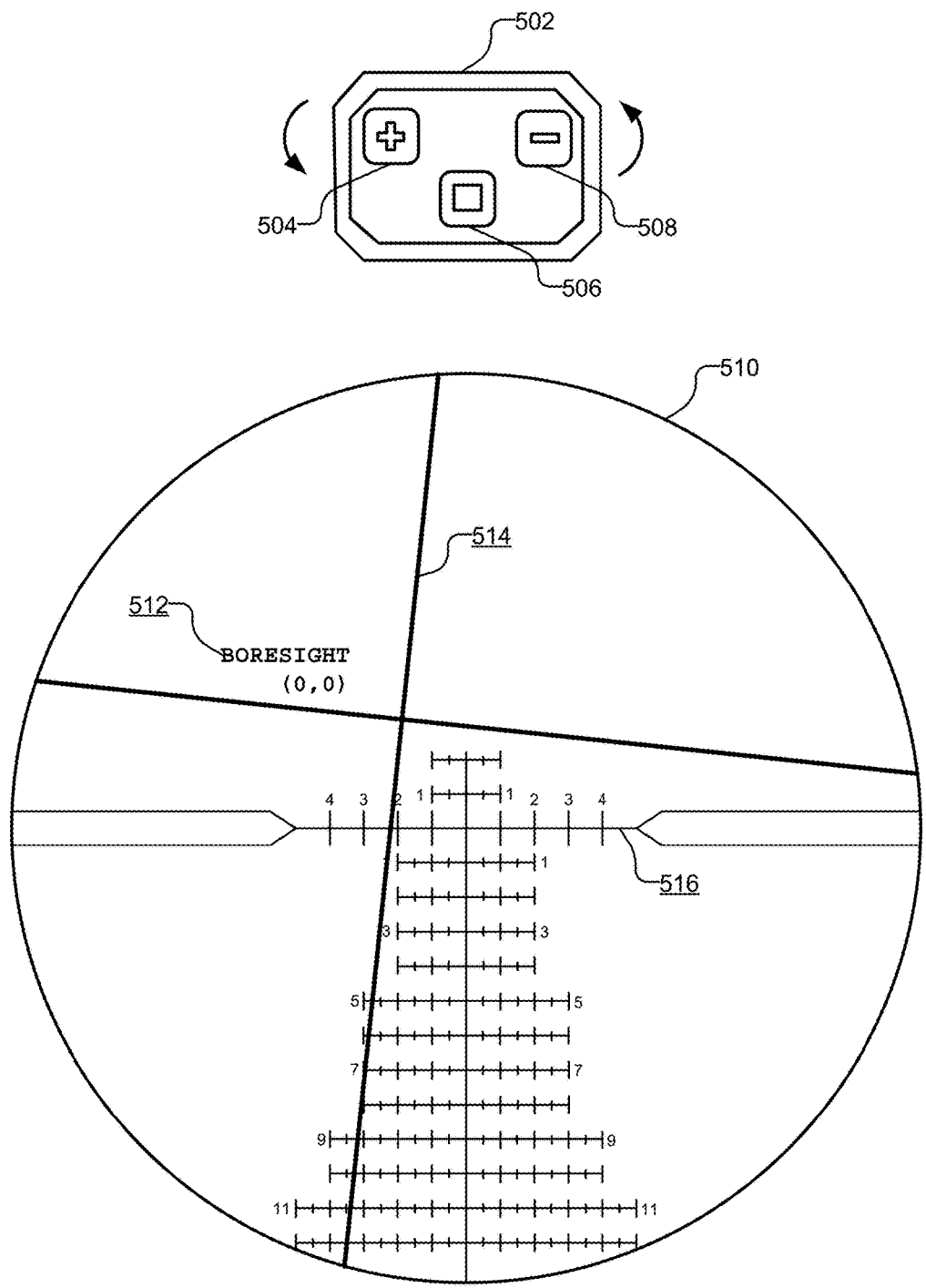
FIG. 5A illustrates an RDA control and a view through a rifle scope with an uncalibrated RDA, according to some embodiments.

FIG. 5A illustrates an RDA control 502 and a view 510 through a rifle scope with an uncalibrated RDA, according to some embodiments. The RDA control 502 may be physically positioned on the side of the RDA as depicted in FIG. 1B (96). The RDA control 502 may include a button 504 with a plus symbol, a button 508 with a minus symbol, and a button 506 with a square symbol. Each of these buttons 504, 506, 508 can be used to adjust the text and/or symbols projected by the RDA during the calibration procedure. As used herein, visual elements projected by the RDA through the rifle scope may be referred to as "virtual" elements or symbols as opposed to the visual rifle scope elements that are also visible to the shooter through the rifle scope.

Because the RDA connects to the cylindrical end of the rifle scope, it is likely that a virtual crosshairs 514 will need to be rotated in order to align rotationally, horizontally, and/or vertically with the crosshairs 516 of the rifle scope. Instead of requiring the shooter to physically rotate the RDA on the end of the scope to align the virtual crosshairs 514, the rotational alignment can be performed electronically using the RDA control 502. For example, pressing button 504 can rotate the virtual crosshairs 514 counterclockwise, while pressing button 508 can rotate the visual crosshairs 514 clockwise. Button 506 can be pressed when the rotational alignment of the virtual crosshairs 514 is complete. Graphically, the RDA can display a set of coordinates 512 that shows a position of the virtual crosshairs during the calibration procedure.

It will be understood that the buttons of the RDA control 502 are merely exemplary and not meant to be limiting. Other embodiments may use alternative types of controls, such as alpha-numeric keypads, touch screens, wireless controls, and/or the like.

Figure 5B:
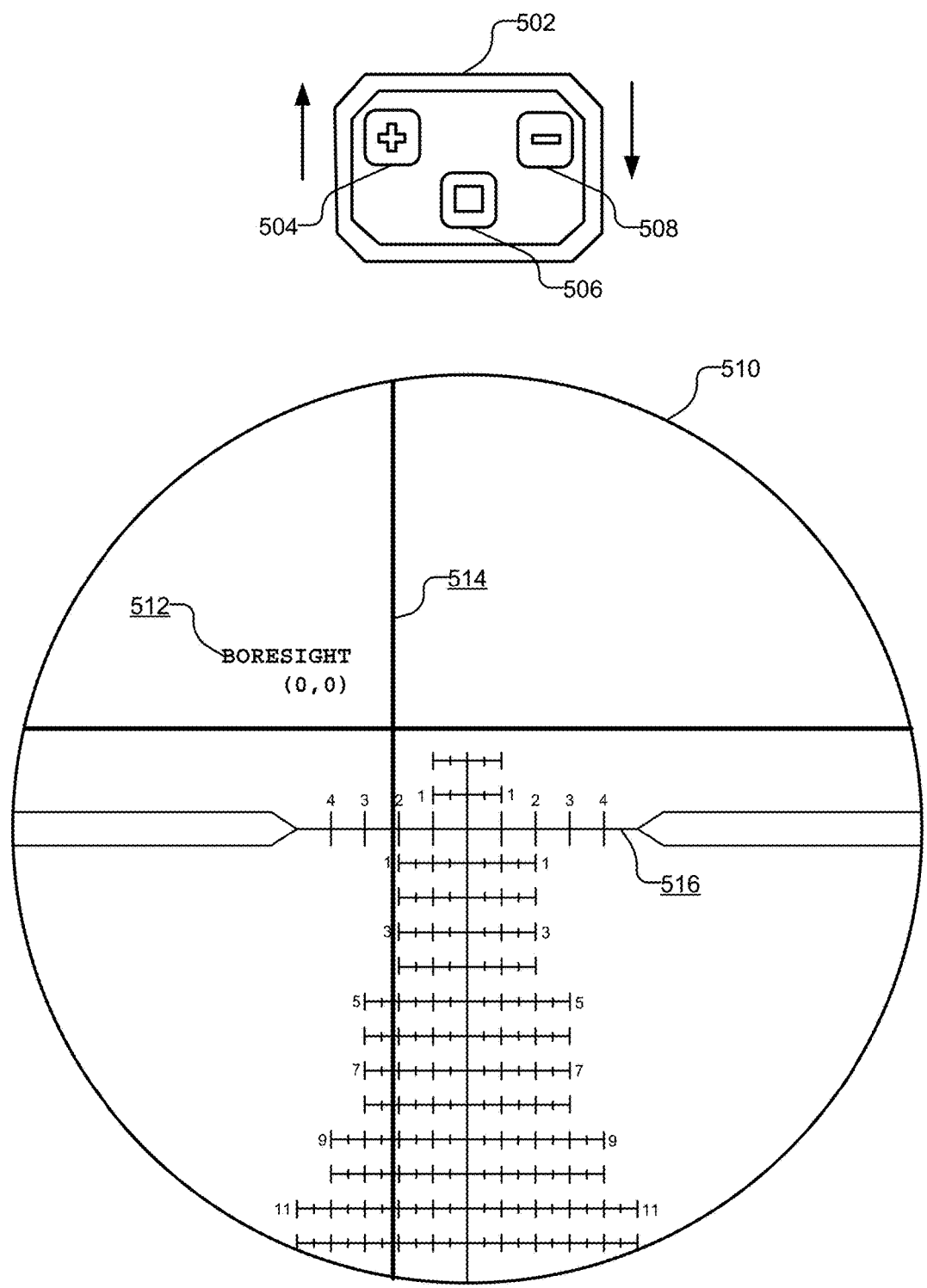
FIG. 5B illustrates a rotationally aligned virtual crosshairs that needs to be vertically and/or horizontally aligned, according to some embodiments.
Figure 5C:
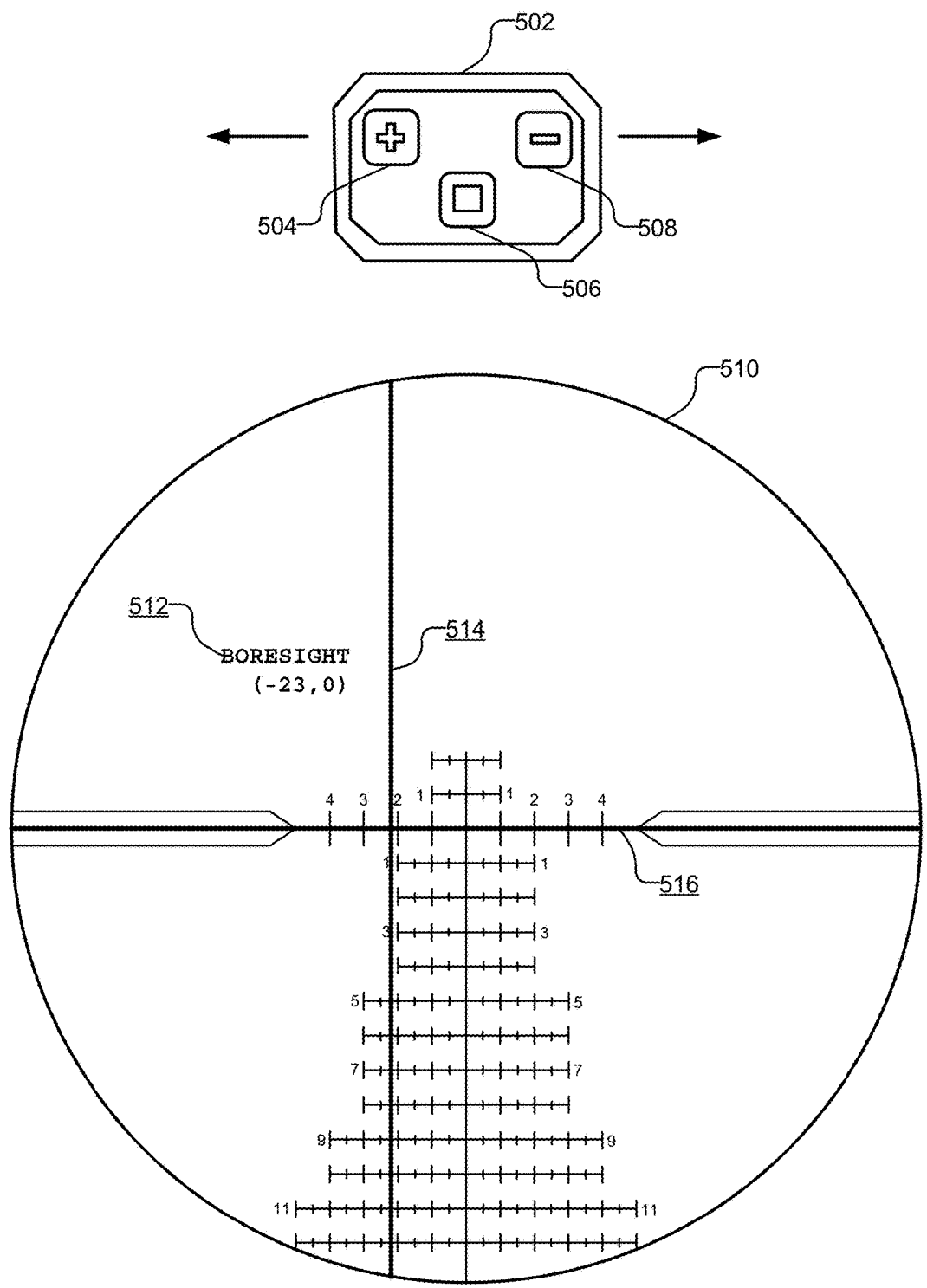
FIG. 5C illustrates a rotationally and vertically aligned virtual crosshairs that needs to be horizontally aligned, according to some embodiments.
Figure 5D:
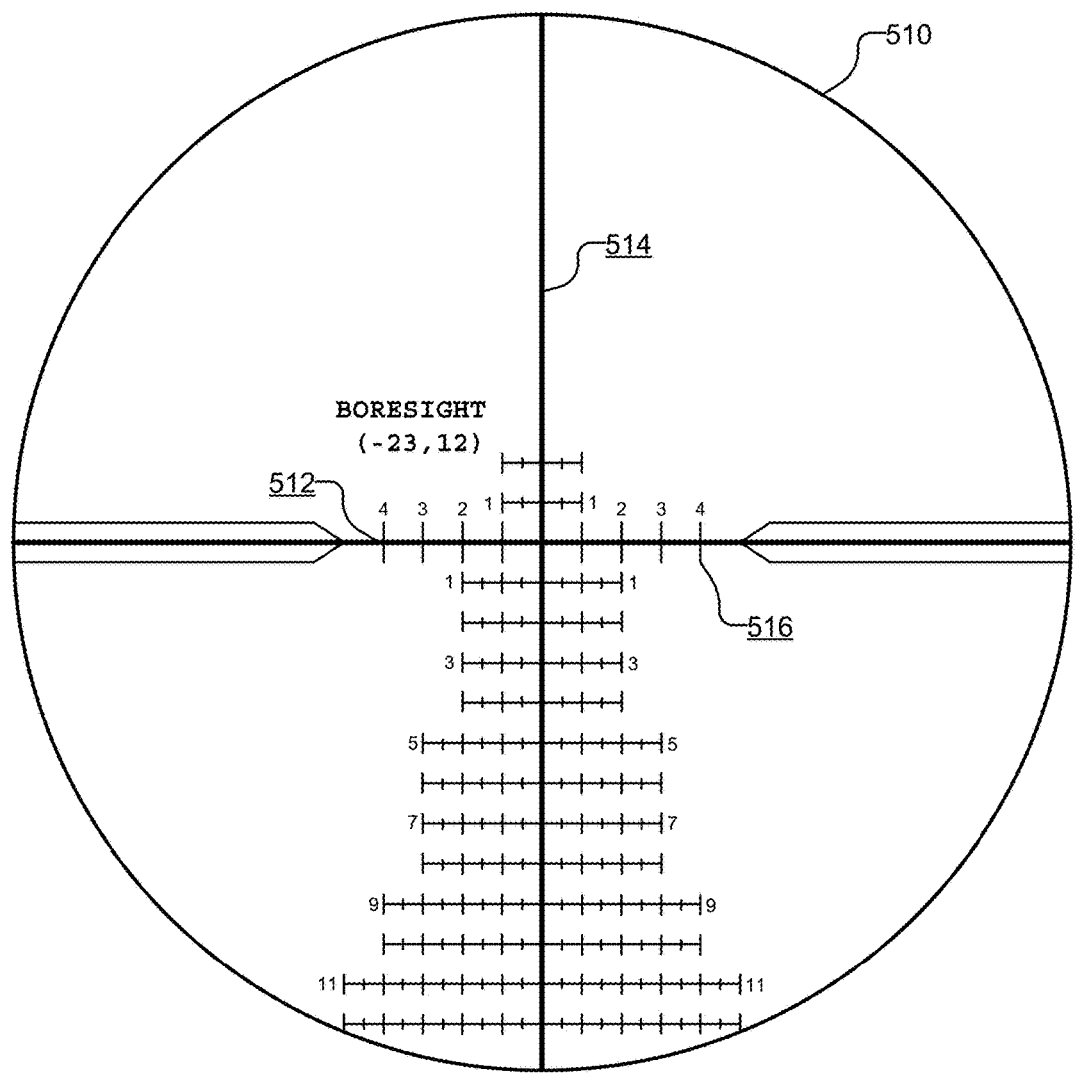
FIG. 5D illustrates a set of virtual crosshairs that are rotationally, vertically, and horizontally aligned with the crosshairs of the rifle scope, according to some embodiments.

FIG. 5B illustrates a rotationally aligned virtual crosshairs 514 that need to be vertically and/or horizontally aligned, according to some embodiments. By pressing button 506, the calibration procedure can next move to a vertical alignment phase. The functions of button 504 and button 508 can change from rotating the virtual crosshairs 514 clockwise/counterclockwise, and instead can shift the virtual crosshairs 514 vertically up/down. By pressing button 506, the shooter can indicate that the vertical alignment is complete. FIG. 5C illustrates rotationally and vertically aligned virtual crosshairs 514 that need to be horizontally aligned, according to some embodiments. Similar to the process described above, pressing 504 and button 508 can horizontally shift the virtual crosshairs 514 to the left/right. FIG. 5D illustrates a set of virtual crosshairs 514 that are rotationally, vertically, and horizontally aligned with the crosshairs 516 of the rifle scope.

The entire calibration procedure can be performed by visually aligning the virtual crosshair hairs 514 with the permanent crosshairs 516 of the rifle scope. Thus, the RDA can be quickly attached to the end of the rifle scope without complicated or precise installation procedures. Instead, the positioning of the RDA can be performed electronically without special tooling and without extensive training. Furthermore, this calibration procedure allows the RDA to be used on a wide variety of rifle scopes without requiring specific software and/or hardware to accommodate each type of crosshair that may be available.

Figure 6A:
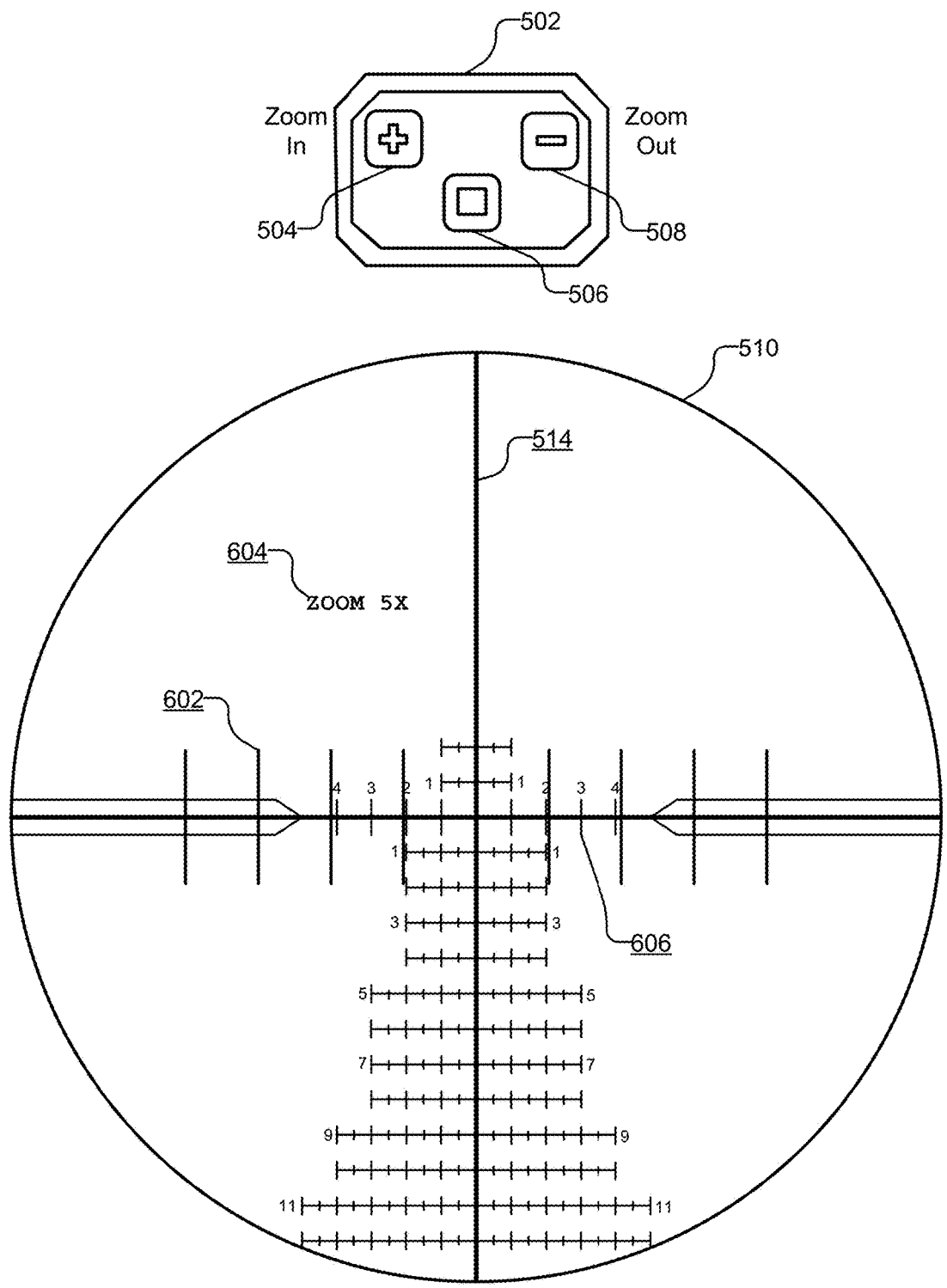
FIG. 6A illustrates an RDA control and a view through a rifle scope for calibrating the zoom function of an RDA, according to some embodiments.
Figure 6B:
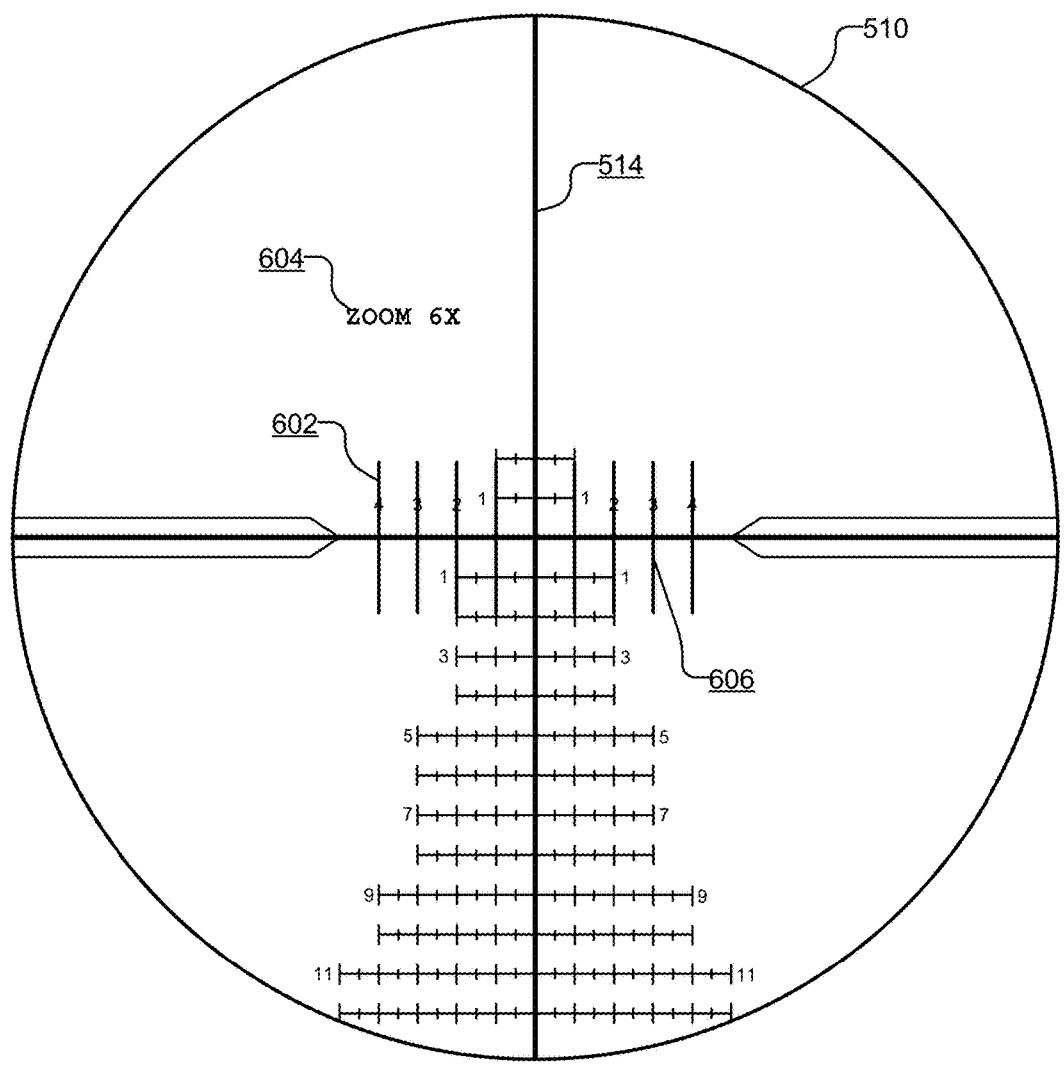
FIG. 6B illustrates an example of a fully calibrated RDA, according to some embodiments.

FIG. 6A illustrates an RDA control 502 and a view 510 through a rifle scope for calibrating the zoom function of an RDA, according to some embodiments. In order to accurately display adjustments to windage and elevation, the zoom factor of the rifle scope must be aligned with the zoom factor of the symbols and text displayed by the RDA. After aligning the virtual crosshairs 514 using the process described above, the zoom factor may be calibrated by aligning the tick marks 602 of the RDA with the tick marks 606 of the rifle scope. During this procedure, button 504 may be used to magnify the RDA display, while button 508 may be used to zoom out the RDA display. Again, the tick marks 602 of the RDA can be aligned with the tick marks 606 of the rifle scope visually without the need of special equipment. When the tick marks are aligned, the shooter can press button 506 to end this phase of the calibration procedure. FIG. 6B illustrates an example of a fully calibrated RDA, where the virtual crosshairs 514 are aligned with the crosshairs of the rifle scope, and the zoom factor of the RDA is aligned with the zoom factor of the rifle scope.

Once the RDA is calibrated with a properly bore-sighted rifle scope, the virtual crosshairs of the RDA can later be used to calibrate the crosshairs of the rifle scope. There is some drift or hysteresis in the windage and elevation adjustment knobs of many rifle scopes. The physical shock of each rifle shot may cause some physical movement of the crosshairs due to this inaccuracy inherent in mechanical adjustment knobs. Normally, shooters would have to re-bore sight their rifle after every 10 to 20 shots. Instead, the shooter can follow the reverse procedure described above, and align the crosshairs of the rifle scope with the displayed virtual crosshairs of the RDA through manual adjustment.

Figure 7A:
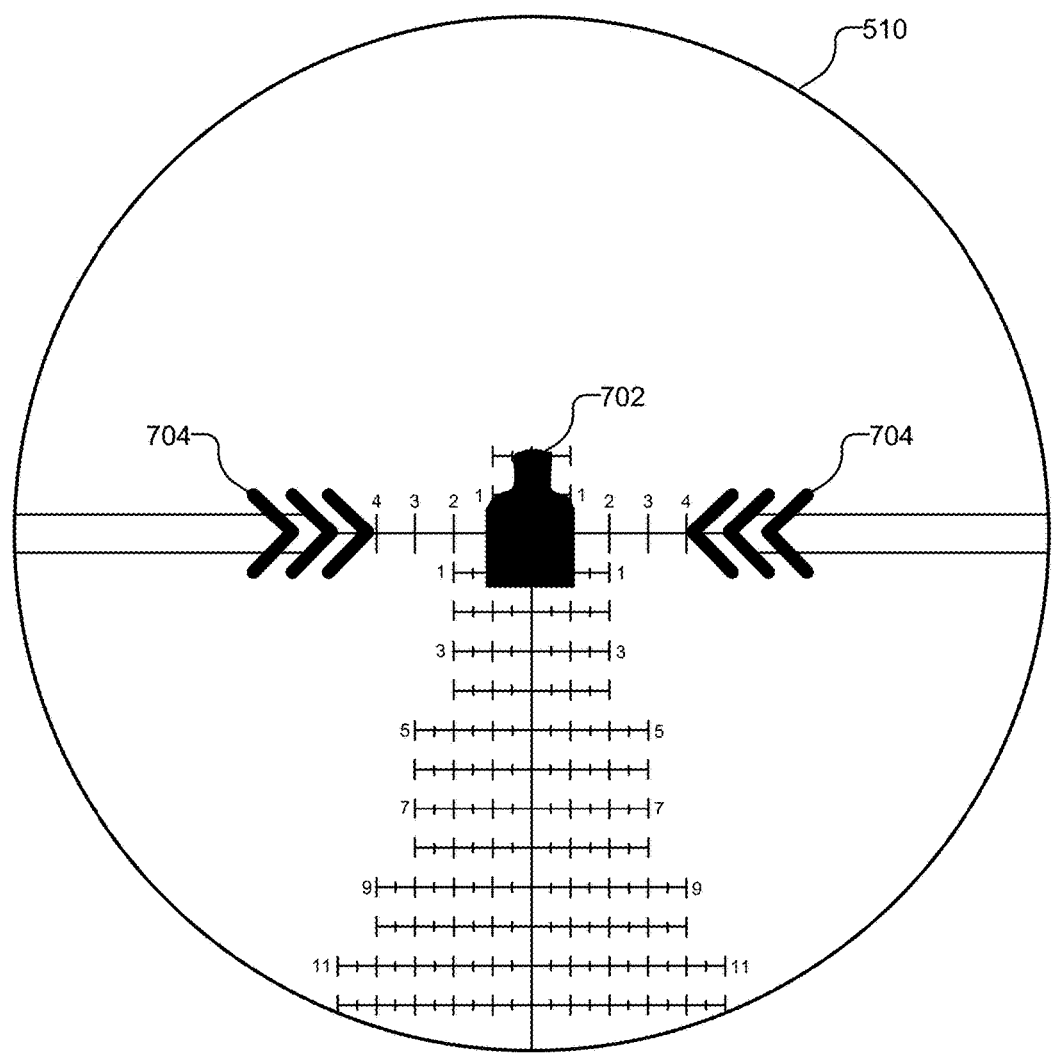
FIG. 7A illustrates virtual symbols for gauging the precision of a windage calculation relative to a target, according to some embodiments.

FIG. 7A illustrates virtual symbols for gauging the precision of a windage calculation relative to a target, according to some embodiments. A silhouette 702 can be displayed to illustrate the approximate dimensions of a target at a particular distance. The silhouette 702 can be scaled based on the zoom factor of the RDA as well as the distance to the target. For example, at longer distances, the silhouette 702 can be rendered smaller in order to approximate the size of the target at the greater distance when viewed through the rifle scope.

A set of visual elements 704 can be used to graphically indicate a precision with which a windage calculation has been determined. Various electronic devices are commercially available that can be used to statistically estimate a windage calculation. Light can be transmitted from the device at the target and reflected back to a precision camera to detect scattering of the reflected light. As the scattered light is statistically sampled over time, algorithms for estimating a direction and velocity of wind between the measurement device and the target can converge to a precise value. Typically, the statistical convergence of these algorithms takes between 2 s and 10 s.

Figure 7B:
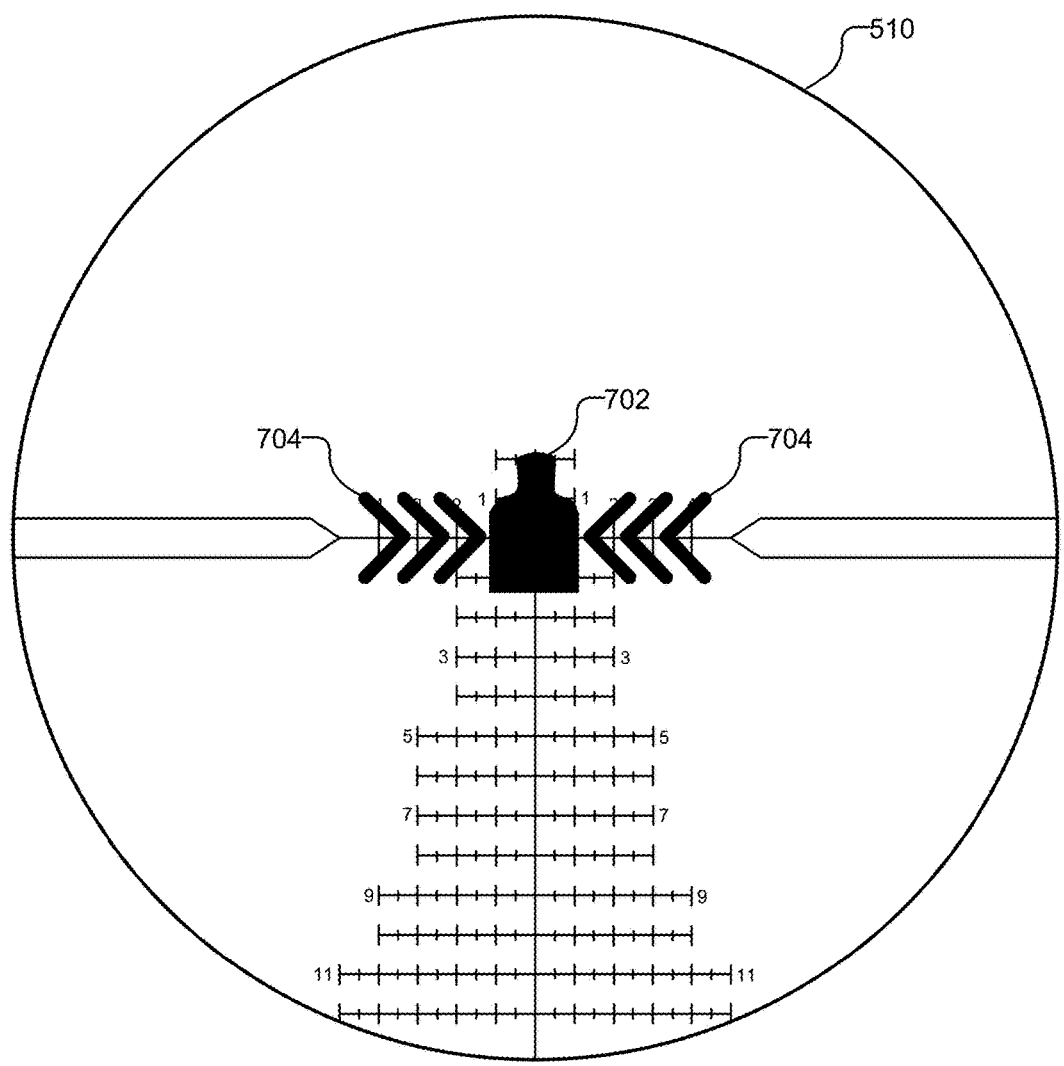
FIG. 7B illustrates the visual elements of FIG. 7A after they have graphically converged, according to some embodiments.

The visual elements 704 can be used to graphically indicate to the shooter the degree to which the windage measurement has converged. In the example of FIG. 7A, the visual elements 704 include opposing chevrons that move towards the silhouette 702 as the windage calculation converges. When the calculation begins, the visual elements 704 may be spread relatively wide, leaving the silhouette 702 alone in the middle of the RDA view. As the windage calculation converges, the visual elements 704 will gradually move inwards until they close in on the silhouette 702. FIG. 7B illustrates the visual elements 704 of FIG. 7A after they have graphically converged on the silhouette 702, indicating that the windage measurement has also converged.

Figure 8A:
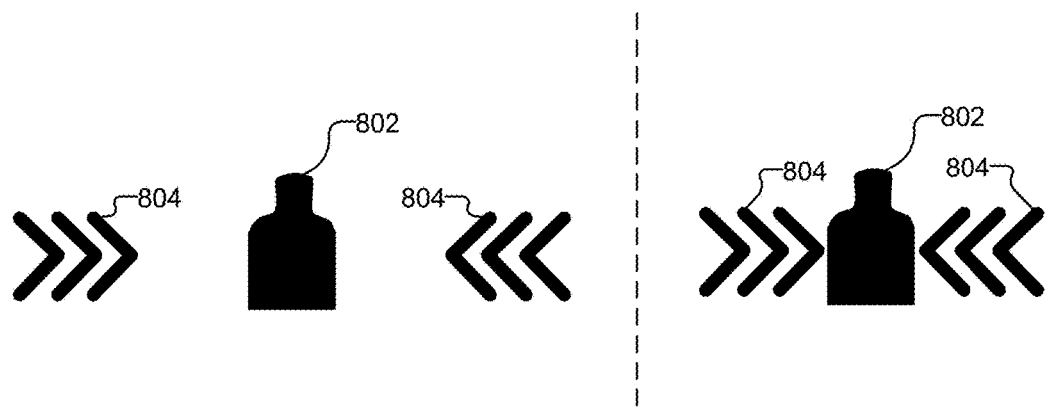
FIG. 8A illustrates the chevron-style visual elements relative to the silhouette in FIGS. 7A-7B, according to some embodiments.
Figure 8B:
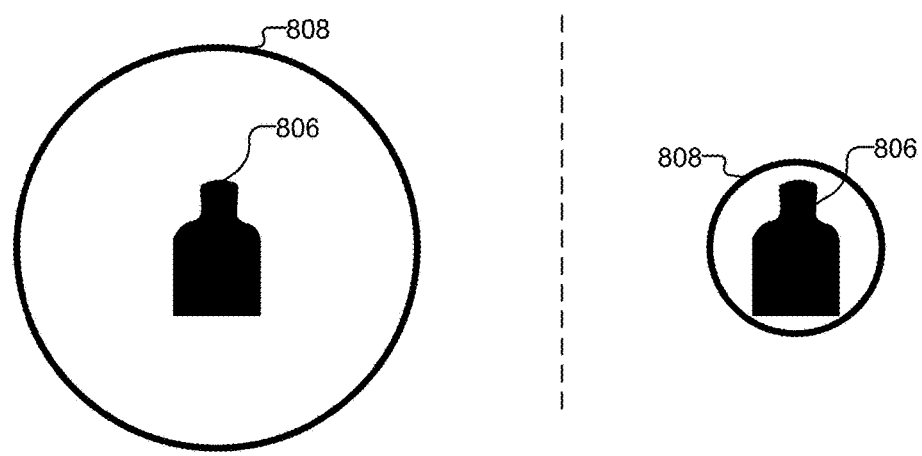
FIG. 8B illustrates a visual element in the form of a circle surrounding the silhouette, according to some embodiments.

The visual elements 704 of FIGS. 7A-7B are merely exemplary and not meant to be limiting. Any other type of graphical elements may be used to illustrate convergence of a windage calculation. FIG. 8A illustrates the chevron-style visual elements 804 relative to the silhouette 802 described above in FIGS. 7A-7B. In another example, FIG. 8B illustrates a visual element 808 in the form of a circle surrounding the silhouette 806. As the windage calculation converges, the visual element 808 can shrink until it is relatively close to the silhouette 806.

Figure 9:
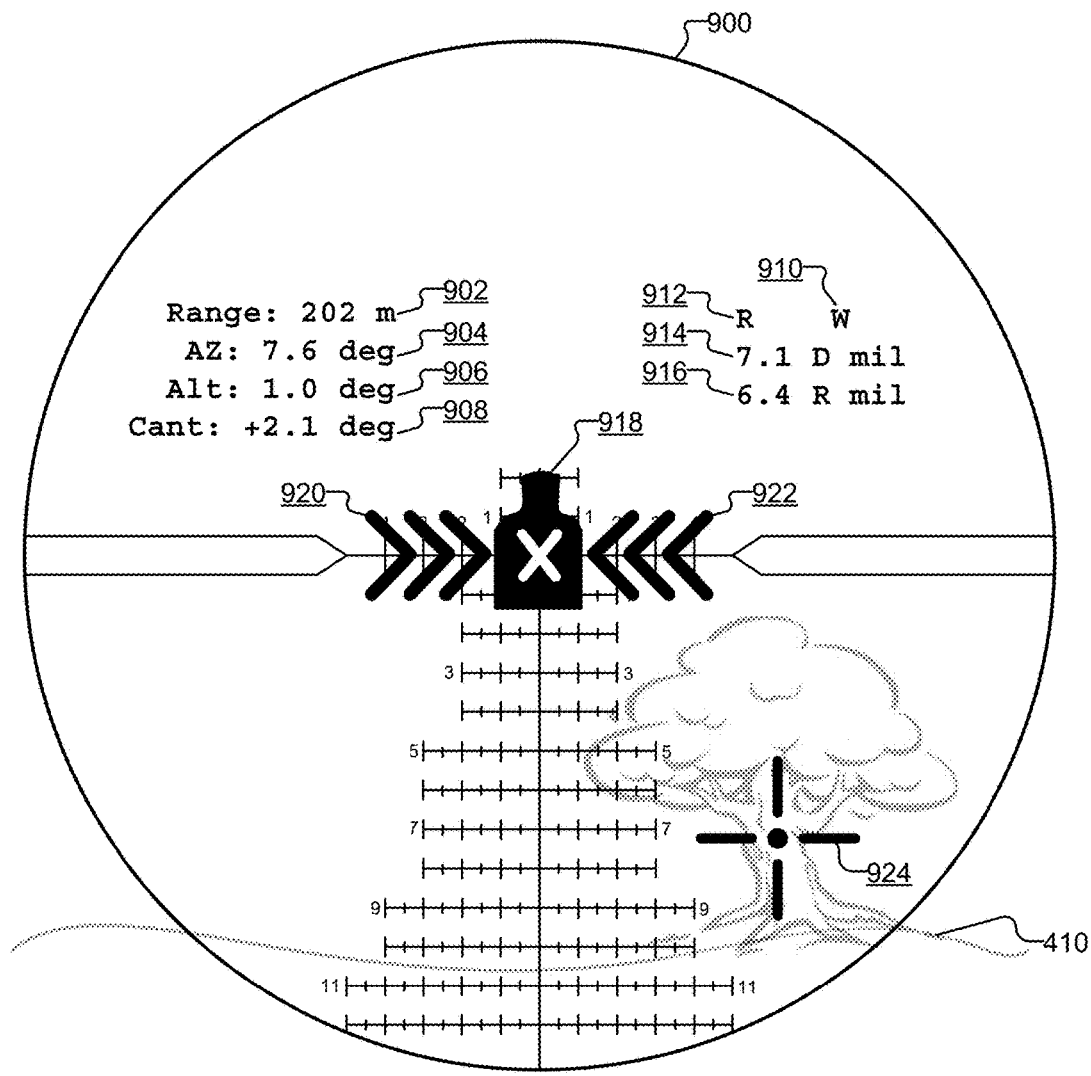
FIG. 9 illustrates a view of the target area through an RDA, according to some embodiments.

FIG. 9 illustrates a view of the target area 410 through an RDA, according to some embodiments. As shown in FIG. 9, the RDA may be operated by a shooter in an aimpoint assistance mode. Although not depicted in FIG. 9, the RDA may be communicatively connected to a ballistic computer (e.g., via wired and/or wireless communication). The ballistic computer may be operated by a spotter working in the shooter's vicinity, or maybe integrated into a system on the rifle scope itself. In some embodiments, a ballistic computer may also operate on the processor of the RDA locally.

In one configuration, the ballistic computer can receive inputs for environmental sensors and compute a firing solution. Inputs to the ballistic computer may include a target range as determined by laser rangefinder, a magnetic bearing or azimuth angle (e.g., X° Northwest, Y° South, etc.), a tilt angle of the rifle, a cant angle of the rifle, and/or a wind measurement. Each of these inputs may be provided by external systems, or may be provided by sensors integrated onto the RDA itself. Regardless of whether these measurements are provided by the RDA itself or by an external system, the measurement results can be displayed in real time on the RDA for the shooter. For example, FIG. 9 illustrates a range measurement 902, an azimuth angle measurement 904 (to be used to compensate for the Coriolis effect of the Earth's rotation), an altitude angle measurement 906, and/or a cant angle measurement 908 that are displayed in real time for the shooter. As the shooter moves or rotates the rifle, the measurements 902, 904, 906, and 908 can be dynamically updated on the RDA such that the change is immediately visible to the shooter.

In some embodiments, the altitude angle measurement 906 and the cant angle measurement 908 can be provided from the RDA as inputs to the ballistic computer to calculate a targeting solution. In other embodiments, the display of altitude angle measurement 906 and the cant angle measurement 908 can be merely informational for the shooter. In response, the shooter can rotate or adjust the altitude angle of the rifle until they are close to 0.0 as shown in real-time on the RDA display.

The ballistic algorithms used to calculate a firing solution are beyond the scope of this disclosure. Algorithms capable of calculating firing solutions may be commercially available from companies such as Applied Ballistics® and/or Kestrel®. A wind measurement sensor is described in the commonly assigned U.S. patent application Ser. No. 14/696,004 filed on Apr. 24, 2015, which is incorporated herein by reference.

The output of the firing solution may be comprised of a windage adjustment and an elevation adjustment to be applied by the shooter to the rifle scope. Like the input measurements 902, 904, 906, and 908, the firing solution can also be displayed in real time as it is calculated through the RDA. For example, an elevation adjustment 914 can be displayed, as well as a windage adjustment 916. The units for the elevation adjustment 914 and the windage adjustment 916 can be set during the calibration phase according to the units used by the rifle scope itself. For example, the rifle scope in FIG. 9 uses "mils" (MRADS, or milliradians), while other rifle scopes may instead use Minutes of Angle (MOA).

The range and windage measurements may be calculated using algorithms based on a laser being reflected from a target. Because there is some calculation time involved, visual indicators may be provided by the RDA to indicate to the shooter when those calculations are complete. For example, an "R" symbol 912 may be dynamically displayed to indicate that the range calculation has been completed. Similarly, a "W" symbol 910 may be dynamically displayed to indicate that the windage calculation has been completed. Before these calculations are completed, the R symbol 912 and/or the W symbol 910 may be absent from the display. These measurements may be displayed in addition to the chevron symbols 922 and/or the silhouette 918 described above to indicate the degree to which the displayed windage measurement has been able to converge.

In traditional rifle scopes, the shooter would be required to manually adjust the windage and/or elevation knobs on the rifle scope in order to reposition the permanent crosshairs of the rifle scope. Alternatively, the shooter could reposition the rifle using the tick-mark scale on the rifle scope in order to estimate a correct shot. Either of these solutions led to inaccuracy or forced the shooter to take his/her hands off the rifle in order to make manual adjustments.

In contrast, the embodiments described herein can use the firing solution calculated by the ballistic computer and automatically display a targeting reticle 924 that is correctly positioned according to the calculated windage and elevation adjustments. For example, if the tree in the target area 410 is the desired target, the shooter can aim the rifle such that targeting reticle 924 is in line with the target. This can be done without making any manual adjustments and without taking eyes off the target. Furthermore, instead of estimating how far the rifle needs to be raised or shifted horizontally, the shooter can simply position the targeting reticle 924 over the target. The targeting reticle 924 can be repositioned each time a new windage/range calculation is completed. Therefore, by using the targeting reticle 924 to target the rifle, the shooter can automatically incorporate all targeting solution calculations into the targeting reticle 924 for an accurate shot.

In some embodiments, the wind sensor and/or the laser rangefinder may be incorporated into the RDA or into a unit attached to the rifle or rifle scope. In these embodiments, the center of the rifle scope crosshairs (e.g., the silhouette 918) would first need to be pointed at the at the target so that a range/windage measurement to be taken. Once the range/windage calculations are completed, the targeting reticle 924 will appear, and the shooter can reposition the rifle such that the targeting reticle 924 is on the target.

As was the case with the graphical elements for indicating convergence of the windage calculation algorithm, the actual visual representation of the targeting reticle can include a number of different embodiments. FIG. 10 illustrates a plurality of different targeting reticles 1002 that can be selected by the shooter during the configuration phase for the RDA.

Figure 11A:
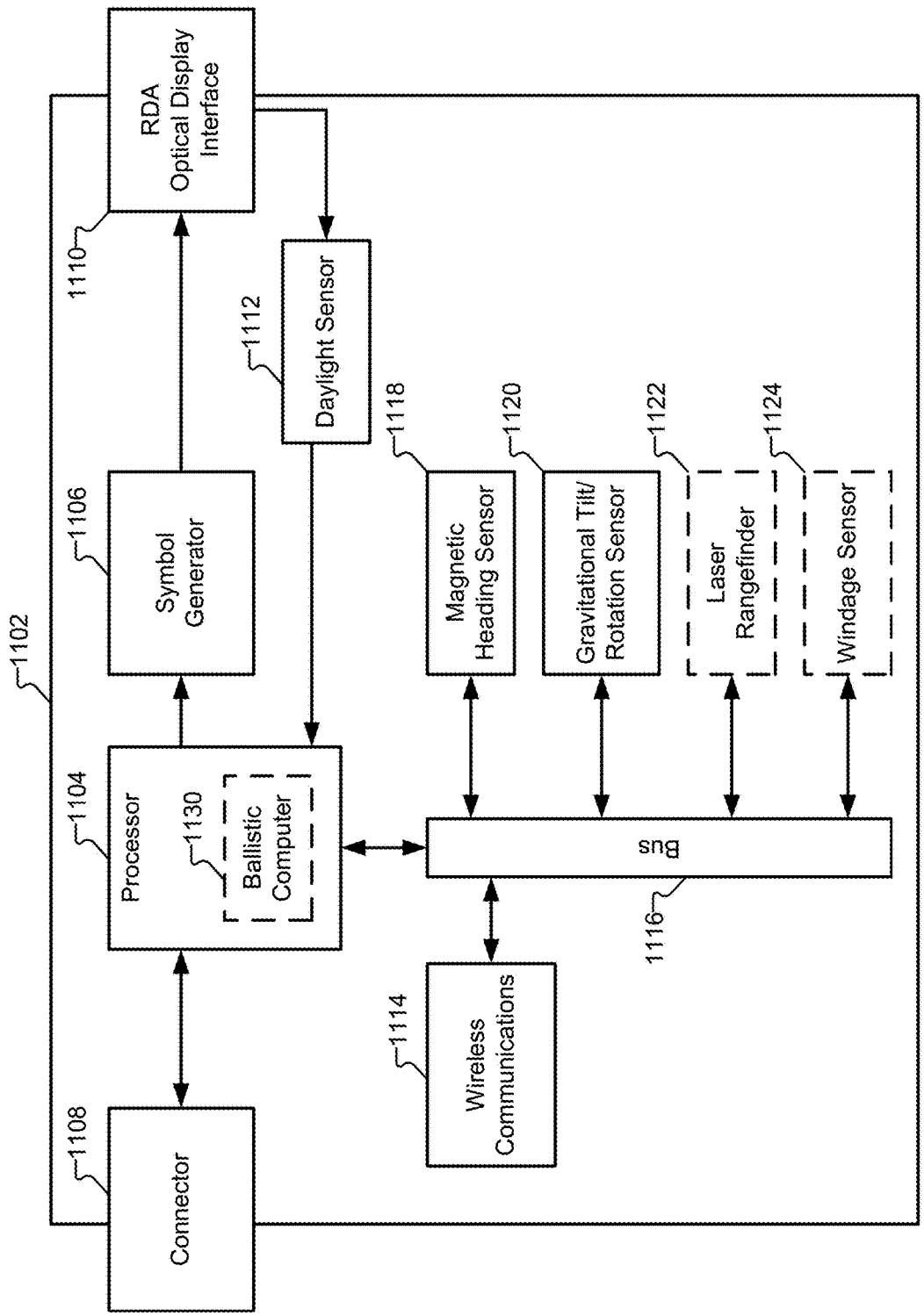
FIG. 11A illustrates a block diagram of an electrical system for an RDA, according to some embodiments.

FIG. 11A illustrates a block diagram of an electrical system for an RDA 1102, according to some embodiments. The RDA 1102 may include one or more processors 1104. The processor(s) 1104 may include—or may be communicatively coupled to—a memory device that stores a set of instructions that causes the processor(s) 1104 to perform operations that collect sensor data, communicate with a ballistic computer, and/or display text and/or symbols on the optical components of the RDA 1102. In some embodiments, the RDA 1102 may include a ballistic computer 1130 as part of the processor(s) 1104, or as a separate processor (not shown). In other embodiments, a ballistic computer may be provided by an external device, such as a Kestrel® device. Communication with the external ballistic computer may be transmitted through a physical connector 1108 and/or through a wireless communications module 1114. The wireless communications module 1114 may include a Wi-Fi transmitter/receiver, a Bluetooth transmitter/receiver, and/or a transmitter/receiver operating at another radio frequency.

The processor(s) 1104 may receive commands as well as a firing solution from the ballistic computer 1130. The RDA 1102 may also include a symbol generator 1106 that can accept a set of commands to generate vector graphics on the RDA optical display interface 1110. As described above, a beam splitter may be included as one of the optical components of the RDA optical display interface 1110. A portion of the light received through the beam splitter may be directed into a daylight sensor 1112. Measurements from the daylight sensor 1112 can be fed into the processor(s) 1104 in order to dynamically adjust the brightness of the graphics displayed through the rifle scope on the RDA. For example, against a white background in daylight, the brightness of the display can be dynamically and automatically adjusted to be brighter. In contrast, against a dark background or at night, the brightness of the display can be dynamically and automatically adjusted to be dimmer.

The RDA 1102 may include one or more sensors that are communicatively coupled to the processor(s) 1104 through a communication bus 1116. In some embodiments, the communication bus 1116 may comprise an I²C bus. In some embodiments, the RDA 1102 may include a magnetic heading sensor 1118 to measure an azimuth angle of the rifle. In some embodiments, the RDA 1102 may include a gravitational tilt sensor 1120 to measure the tilt and/or rotation angle of the rifle with respect to a gravitational vector. In some embodiments, the RDA 1102 may also include a laser rangefinder 1122. The laser rangefinder may be an integrated part of the RDA optical display interface 1110. Alternatively, the laser rangefinder 1122 can be an external sensor rather than an integrated part of the RDA 1102. Similarly, a windage sensor 1124 may be an integrated part of the RDA 1102 and/or may be externally provided. Sensors that are externally provided may communicate directly with an external ballistic computer, and/or may communicate with the processor(s) 1104 through the connector 1108.

Figure 11B:
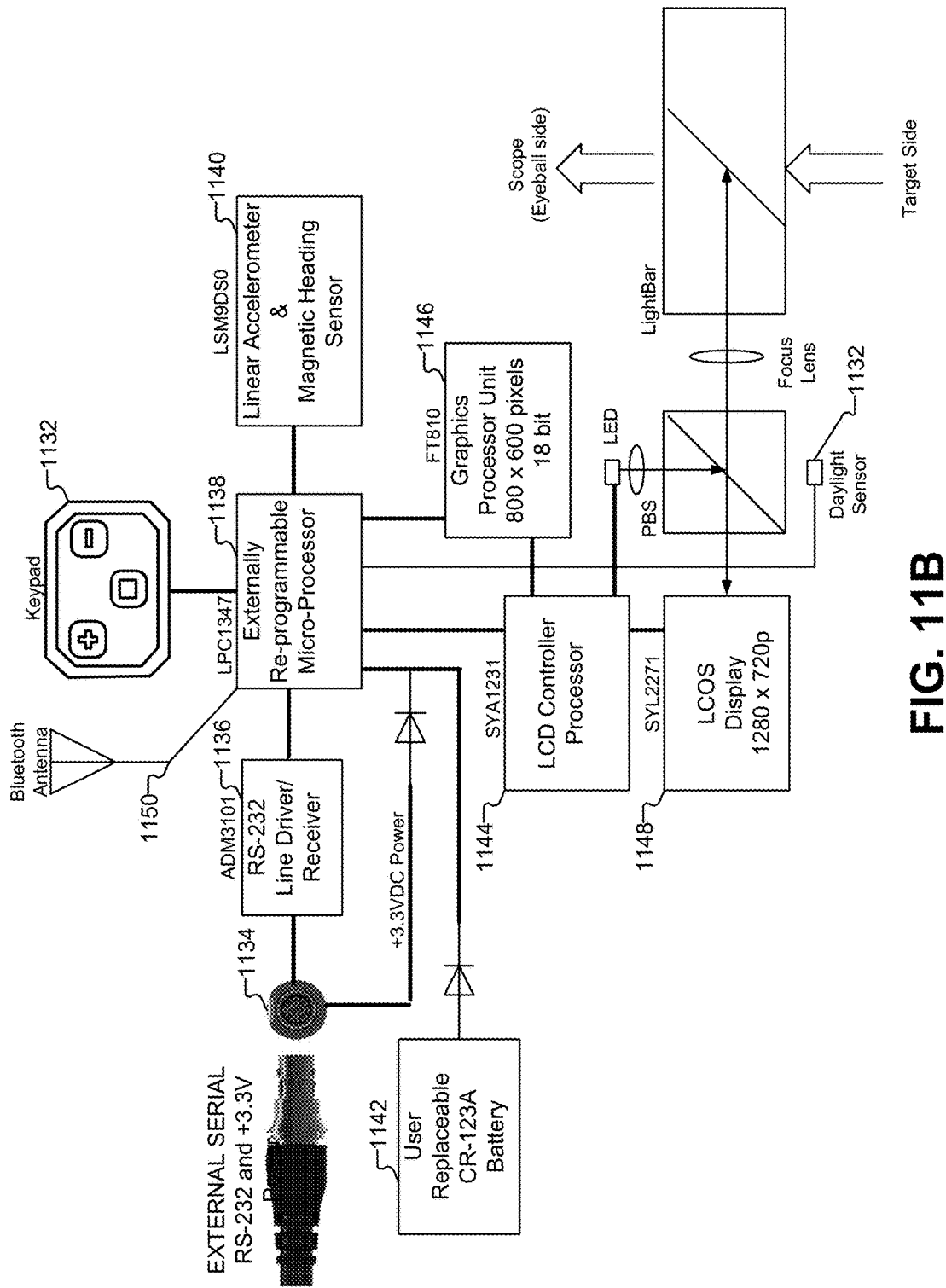
FIG. 11B illustrates a block diagram of a second electrical system for an RDA, according to some embodiments.

FIG. 11B illustrates a block diagram of a second electrical system for an RDA, according to some embodiments. The electrical system of FIG. 11B may be considered a specific implementation of the more generic electrical system of FIG. 11A. In order to provide an enabling disclosure, specific part numbers may be provided for the major components in FIG. 11B. However, these part numbers are merely exemplary and not meant to be limiting. One having skill in the art would readily understand that many other specific parts may be used that provide the same or similar functionality.

A keypad 1132 may function as the RDA control described above for calibrating and operating the user interface of the RDA. An external connector 1134 can receive serial communications (e.g., RS-232) from external components, such as a ballistic computer, a windage sensor, a laser rangefinder, and/or the like. The external connector 1134 can also receive instructions to program a microprocessor 1138 (e.g., LPC1347) through a serial line driver/receiver 1136 (e.g., ADM3101). Power may be provided externally through the external connector 1134 and/or through a user-replaceable battery 1142 (e.g., CR-123A). In addition to receiving communications through the external connector 1134, the RDA can receive communications through a wireless connection, such as a Bluetooth® antenna 1150.

Sensors integrated into the RDA may include a linear accelerometer for measuring the tilt of the RDA with respect to a gravity vector and/or a magnetic heading sensor 1140. In some embodiments, these two sensors can be integrated into the same package (e.g., LSM9DS0). The RDA may also include a daylight sensor 1132 that is configured to receive light from a beam splitter in the optical components of the RDA. For example, the daylight sensor 1132 may include a photodiode that generates a response that is proportional to the amount of light received through the optics of the RDA to automatically adjust the brightness of the display. In order to generate the text and/or symbols displayed by the RDA, an LCOS Display 1148 (e.g., SYL2271), an LCD controller processor 1144 (e.g., SYA1231), and a Graphics Processing Unit (e.g., FT810) may also be included.

Figure 12:
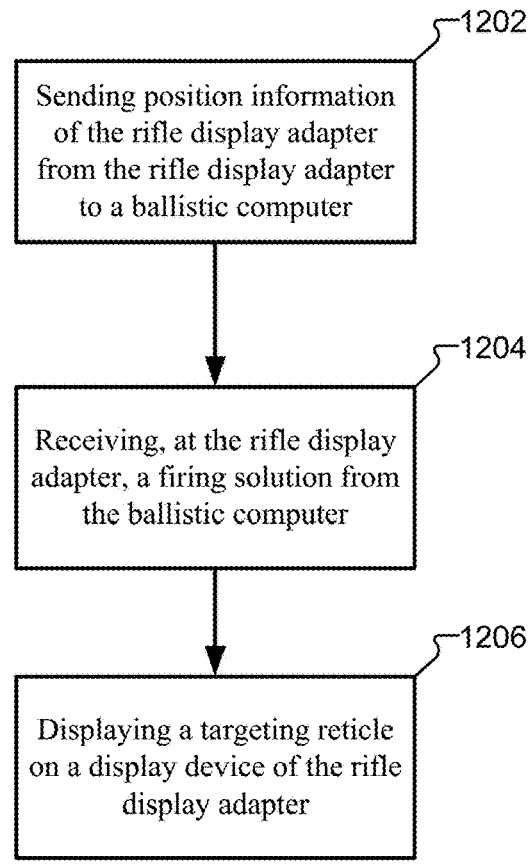
FIG. 12 illustrates a flowchart of a method for displaying firing solutions using a display adapter that is configured to mount to a frame of a rifle scope, according to some embodiments.

FIG. 12 illustrates a flowchart of a method for displaying firing solutions using a display adapter that is configured to mount to a frame of a rifle scope, according to some embodiments. The method may include sending position information of the RDA from the RDA to a ballistic computer (1202). In some embodiments, the position information may include a tilt angle of the RDA as measured by a linear accelerometer or other gravitational tilt sensor. The position information may also include a magnetic heading.

The method may also include receiving, at the RDA, a firing solution from the ballistic computer (1204). The firing solution may include a windage adjustment and/or an elevation adjustment. The method may further include displaying a targeting reticle on a display device of the RDA (1206). In some embodiments, the targeting reticle may be displayed relative to a crosshair of the rifle scope according to the firing solution as described in detail above. Some embodiments may also display a calculated windage measurement and/or a calculated range to a target. A graphic may also be displayed that visually indicates a convergence of a windage calculation algorithm. The graphic may include graphical elements that visually converge on a center point as the windage calculation algorithm converges (e.g., FIGS. 8A-8B). The targeting reticle may be displayed such that the targeting reticle overlays an image visible through the eyepiece of the rifle scope. Thus, a shooter looking through the rifle scope may see the normal image of the targeting area along with the text in symbols projected by the RDA through the rifle scope.

In order to calibrate the RDA, a control pad may be provided through which inputs can be received. Inputs received through the control can be used to visually align the crosshair of the rifle scope with a crosshair projected by the RDA. For example, such inputs can rotate, horizontally shift and/or vertically shift the crosshair projected by the RDA relative to the crosshair of the rifle scope.

It should be appreciated that the specific steps illustrated in FIG. 12 provide particular methods of displaying information through an RDA according to various embodiments of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Rifle Scope Display Mount

The rifle scope display adapter (RDA) described above is designed to provide an accurate targeting solution on a display through a rifle scope to a shooter such that the shooter can keep their eyes on the target at all times. In order to guarantee the accuracy of the virtual targeting reticle of the firing solution, the RDA must be securely affixed to the rifle scope such that the RDA does not shift, rotate, or move between shots. However, the RDA should not be permanently secured to the rifle scope because the rifle scope itself is a modular unit, one that may be replaced, calibrated, and/or damaged. Thus, not only must the RDA be securely affixed to the rifle scope, it also should be removable. Finally, hundreds of different long-range rifle scopes are available, each having different ranges, precision manufacturing requirements, and uses. Therefore, a mount assembly used to secure the RDA to the scope should be able to accommodate all of the available different scope diameters.

Prior to this disclosure, accessories mounted in front of the rifle scope on a rifle could be attached using one of two methods. First, many rifle scopes include a threaded section on the interior of the scope body in front of the front lens. Accessories can be screwed into the front of the scope using these interior threads. For example, a lightweight accessory known as a "flash kill" can be screwed into the front of a rifle scope in order to block light reflections off the front of the scope lens that could give away the position of the shooter. While these threads may be used to secure lightweight accessories, heavier accessories, such as the RDA described above, are too heavy to be secured using these threads alone. Furthermore, the shock generated by high-powered rifles is often sufficient to gradually loosen an accessory from these threads. Even a few millimeters of rotation of the RDA would skew the calibrated targeting image and result in an inaccurate virtual targeting reticle. Second, some rifle accessories may be mounted in front of the scope on a "Picatinny" or other rail system. While affixing an accessory to the rail may be secure, small amounts of play in the rail assembly, the mounting fixture, the scope mount, and the accessory, may add up to an unacceptable amount of movement between the accessory and the scope between shots.

In order to solve these and many other problems, the embodiments described herein present a method of mounting the RDA directly to the front of the scope in a secure and removable manner. These embodiments guarantee that the RDA does not move, rotate, or shift between shots of high-powered rifles. These embodiments also allow a common RDA projector display to be mounted to differently sized rifle scopes having variable diameters. These embodiments also make certain that the RDA is seated properly against the scope so that the projected image is not skewed through the scope lens.

A first aspect of these embodiments provides a threaded ring that can be screwed into the interior threads of the existing scope body. The threaded ring ensures that the RDA projector display is seated perpendicular to the optical path of the scope by pulling the RDA flush against the front of the scope body. A second aspect of these embodiments keeps the threaded ring on the interior of the scope body from loosening by providing radial pressure directed inwards towards the body of the scope via a second ring around the exterior of the scope. This radial pressure is exerted using the second ring on the outside of the scope body.

FIGS. 13A-13D illustrate various views of one embodiment of an RDA assembly, according to some embodiments. The assembly may be comprised of a plurality of individual components used to mate the RDA common display projector ("display projector") 1312 to a scope body 1302. The display projector 1312 may be provided in a single size, and the remaining components of the assembly can include interchangeable members of variable sizes to accommodate scope bodies with different diameters. Therefore, only a single display projector 1312—which includes the optical components, electrical components and connectors, controllers, sensors, and processors described in detail above—needs to be designed and manufactured, and the remaining components in the assembly can be used to secure the display projector 1312 to virtually any size of rifle scope.

It will be understood that the specific components in the assembly depicted in FIGS. 13A-13D are merely exemplary and not meant to be limiting. Functionally, these components provide the two aspects described above: (1) a first ring that mates with the threads on the interior of the scope body 1302 and secures the display projector 1312 flush with the front of the scope body 1302; and (2) a second ring that exerts radial compressive force against the exterior of the scope body 1302. In light of this disclosure and these two aspects, one having skill in the art could alter the assembly components described below into alternate geometries in order to provide the same functionality. Such modifications are within the scope of this invention.

In some embodiments, the assembly is comprised of an outer tightening ring ("outer ring") 1304, a collet 1306, a spacer adapter ("spacer") 1308, and an inner fingertip grip filter thread tightening ring ("inner ring") 1310. To describe the functionality of each of these individual components, FIGS. 14-17 each depict a single component apart from the assembly. In the accompanying description below, reference will be made back to FIGS. 13A-13D to illustrate how the components are assembled to attach the display projector 1312 to the scope body 1302.

Figure 14:
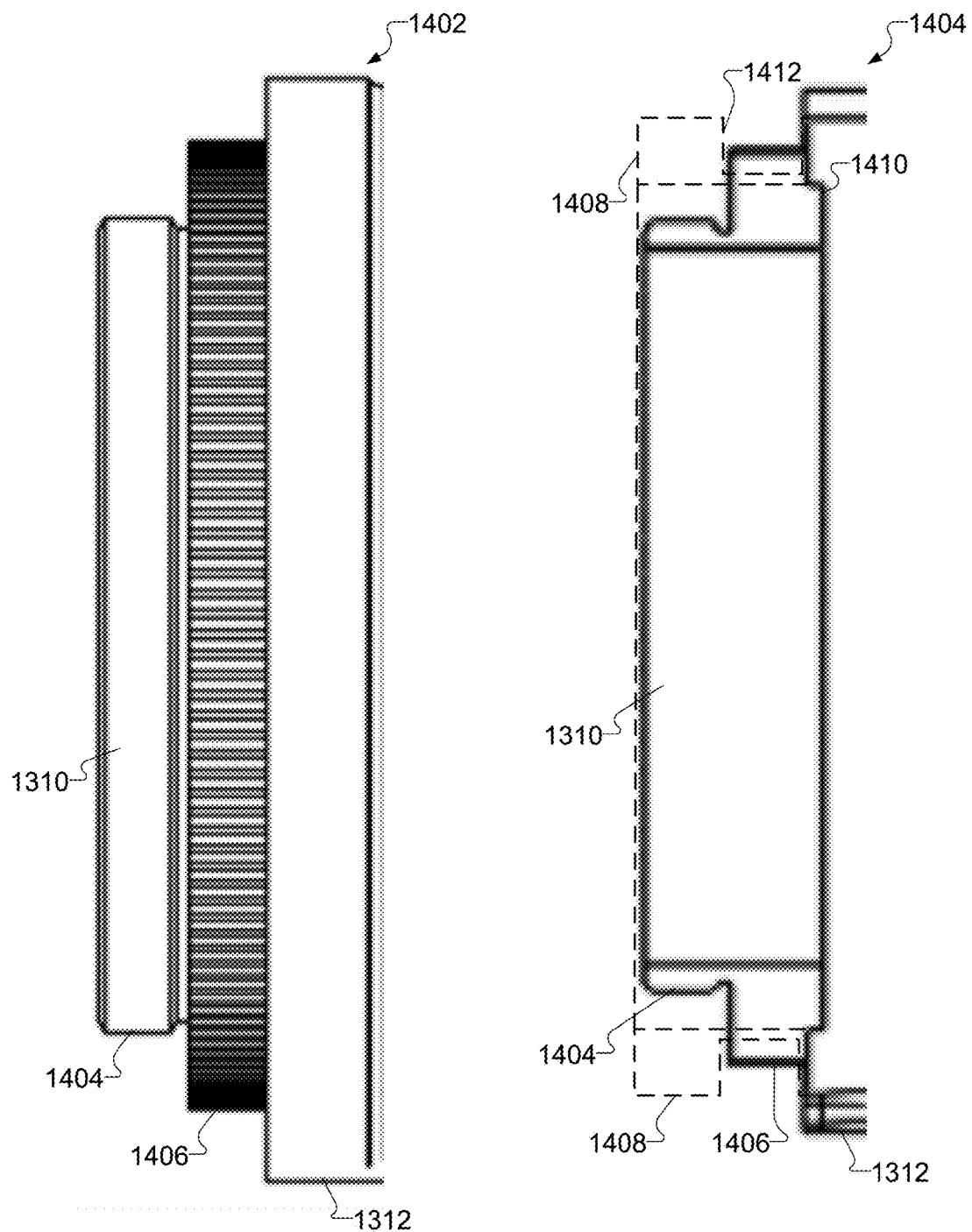
FIG. 14 illustrates an outside view and an inside view of the inner ring, according to some embodiments.

Beginning with the inner ring 1310, FIG. 14 illustrates an outside view 1402 and an inside view 1404 of the inner ring 1310, according to some embodiments. A portion of the display projector 1312 is also illustrated in order to show how the inner ring 1310 seats within the display projector 1312. The inner ring 1310 may be comprised of two rings of different diameters. A threaded ring 1404 may include screw threads (not shown for clarity) on the outside surface of the threaded ring 1404. A grip ring 1406 may include a grippable surface on the outside surface of the grip ring 1406. The grip surface may include a diamond pattern, small ridges and/or valleys, a scored surface, a sandpaper-like surface, and so forth. The grip ring 1406 and the threaded ring 1404 may be manufactured from a single block of material (e.g., machined from a single piece of aluminum), or they may be manufactured separately and joined together. In either case, the grip ring 1406 and the threaded ring 1404 will turn in unison as the grip ring 1406 is rotated.

The grip ring 1406 may be a constant diameter regardless of the scope diameter. The grip ring 1406 may include a flange 1410 that is sized to mate with a corresponding groove or recess in the display projector 1312. During assembly, the flange 1410 of the grip ring 1406 may be seated within the corresponding groove or recess in the display projector 1312 such that the grip ring 1406 can rotate freely radially around its center diameter. However, the corresponding groove or recess in the display projector 1312 prevents the inner ring 1310 from shifting or moving perpendicular to the center diameter of the inner ring 1310.

The threaded ring 1404 may be manufactured in varying diameters to accommodate the varying diameters of different scope bodies. For example, some embodiments of the threaded ring 1404 may be sized to accommodate the interior diameter and threads of a scope body of a Leupold® MK4 ER/T 50 mm 6.5-20×50 mm Army M2010 scope. Other embodiments of the threaded ring 1404 may be sized to accommodate a Leupold® USSOCOM ECOS-O MK6 3-18×44 mm scope, or a Schmidt & Bender® 5-25×56 mm PMII USSOCOM PSR scope. In addition to these exemplary scope models, and in light of this disclosure, one having skill in the art would be able to measure the internal diameter and thread spacing of any scope and design a threaded ring 1404 accordingly.

After the inner ring 1310 is seated in the display projector 1312, the grip ring 1406 is accessible to a user through an opening 1412 in the body of the display projector 1312. Although not shown in the outside view 1402 or in FIGS. 13A-13C, the dashed lines of the inside view 1404 show a ring 1408 of the display projector 1312 that extends over the inner ring 1310. The user is able to rotate the inner ring 1310 by gripping the grip ring 1406 through the opening 1412, which extends around at least a portion of the ring 1408. Thus, the inner ring can be rotated through the opening 1412 of the display projector 1312 in order to mate the threads of the threaded ring 1404 with the threads of the inside of the scope body 1302. The ring 1408 of the display projector 1312 may include threads on the interior (not shown for clarity) of the ring 1408 in order to mate with the spacer 1308 as described in greater detail below.

Figure 18:
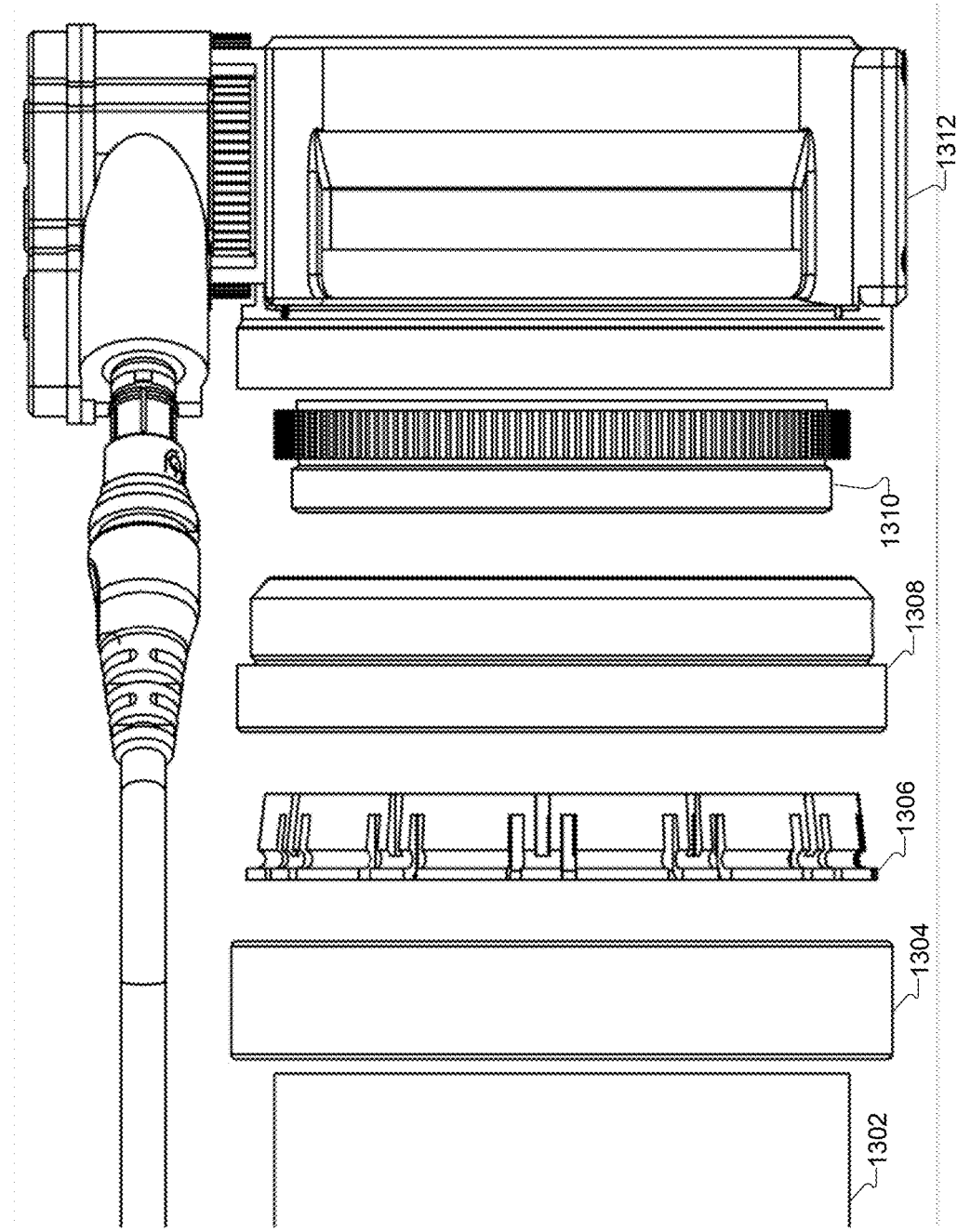
FIG. 18 illustrates an RDA mount assembly for a large scope body, according to some embodiments.
Figure 19:
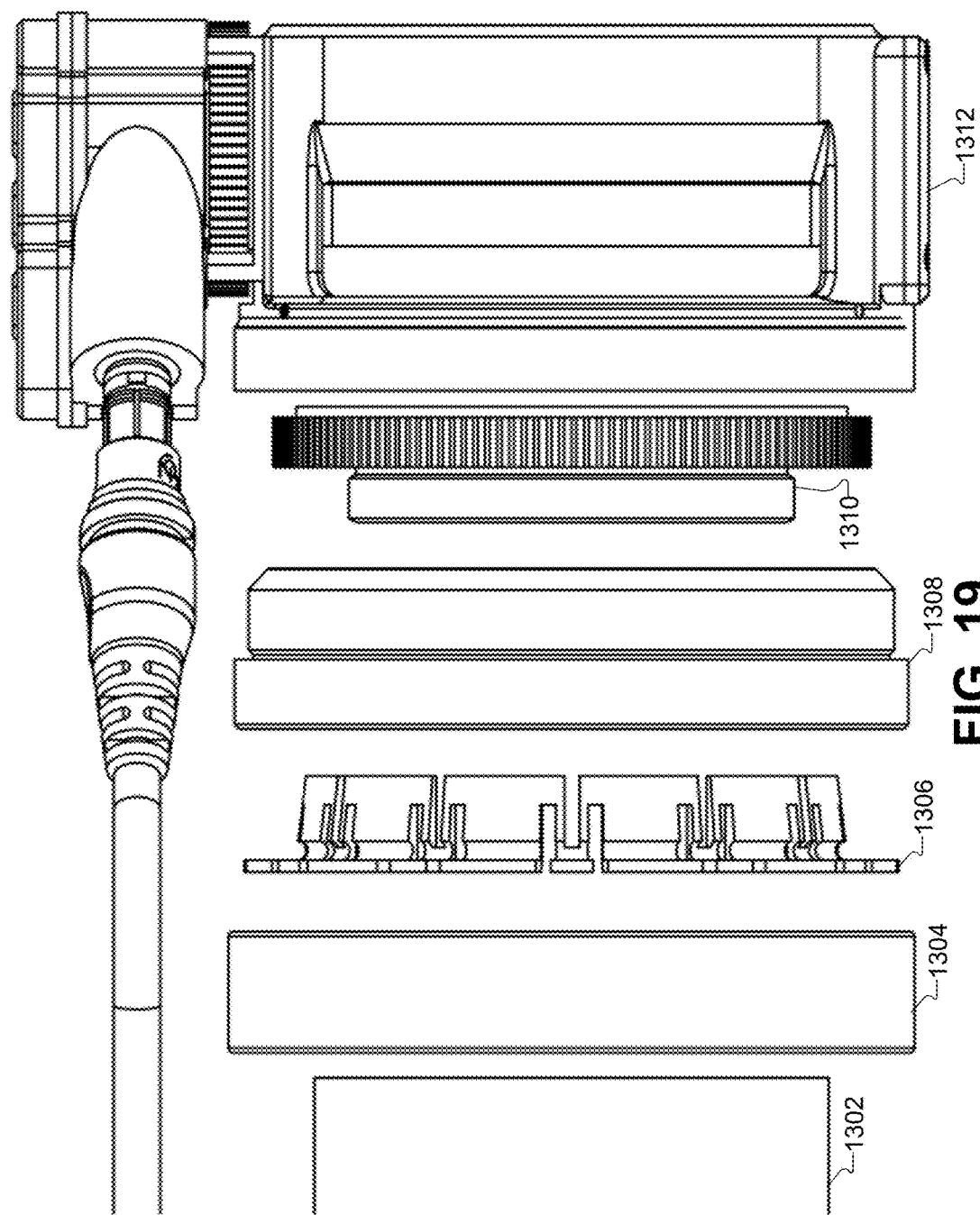
FIG. 19 illustrates an RDA mount assembly for a smaller scope body, according to some embodiments.

FIGS. 13A-D and FIGS. 14-17 illustrate components sized for a 50 mm scope body. To illustrate how the size of the assembly components can change in order to accommodate both larger and smaller sizes, FIG. 18 illustrates a 56 mm scope body, and FIG. 19 illustrates a 44 mm scope body. Note that the threaded ring of the inner ring 1310 in FIG. 18 is larger to accommodate the 56 mm scope, and the threaded ring of the inner ring 1310 in FIG. 19 is smaller to accommodate the 44 mm scope. In contrast, the grip ring for all three scope sizes can remain the same.

Figure 15:
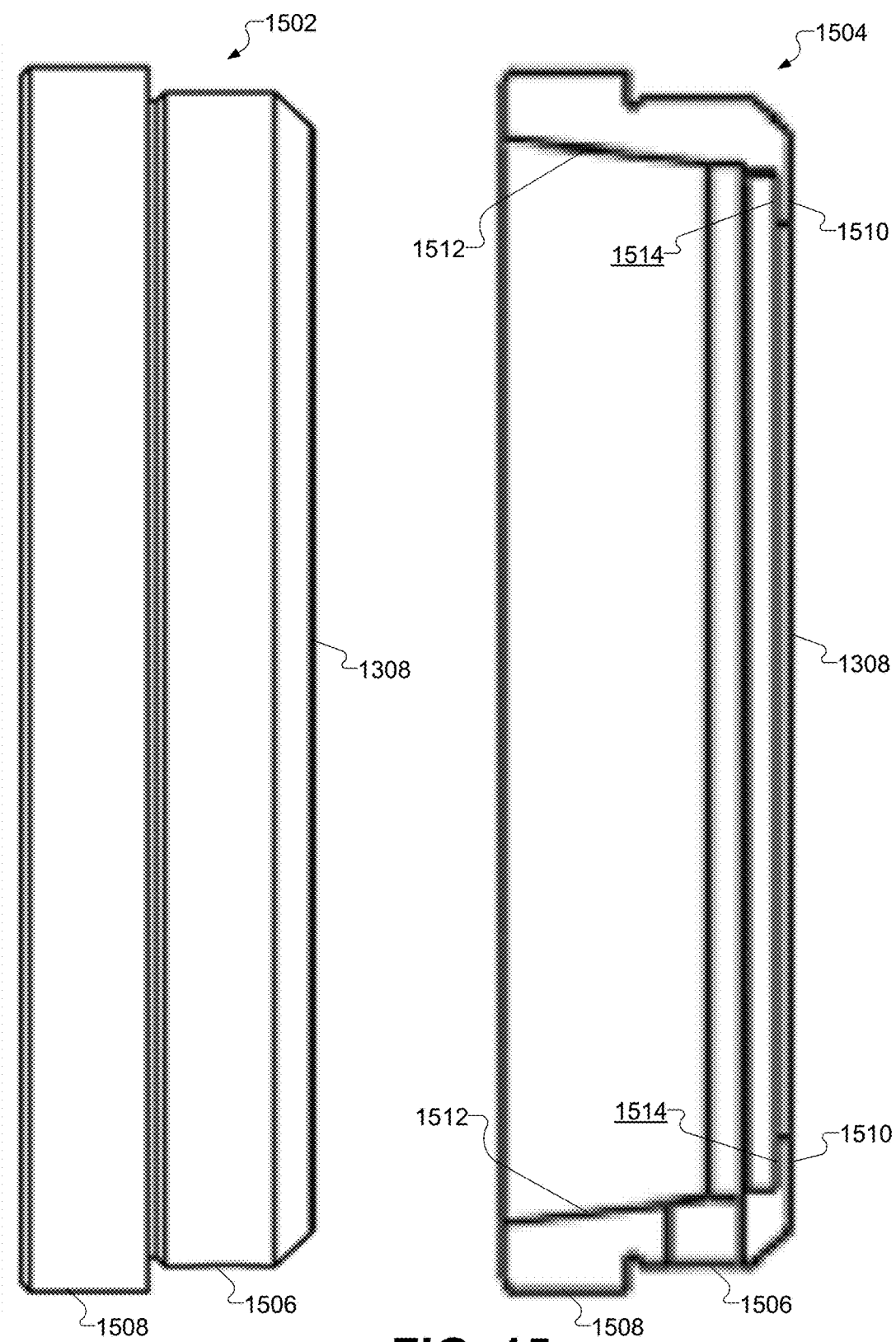
FIG. 15 illustrates an outside view and an inside view of the spacer, according to some embodiments.

FIG. 15 illustrates an outside view 1502 and an inside view 1504 of the spacer 1308, according to some embodiments. After seating the inner ring 1310 in the display projector 1312, the spacer 1308 can be screwed into the display projector 1312 to hold the inner ring 1310 in place. Like the inner ring 1310, the spacer can be functionally divided into two different external diameters, namely a large ring 1508 disposed closer to the scope body 1302, and a small ring 1506 disposed closer to the display projector 1312. The small ring 1506 may include threads (not shown for clarity) on the external surface of the small ring 1506 in order to mate with the corresponding threads on the inner surface of the ring 1408 of the display projector 1312. Similarly, the large ring 1508 may include threads (not shown for clarity) on the external surface of the large ring 1508 for mating with corresponding threads on the outer ring 1304 as described in greater detail below.

Figure 13B:
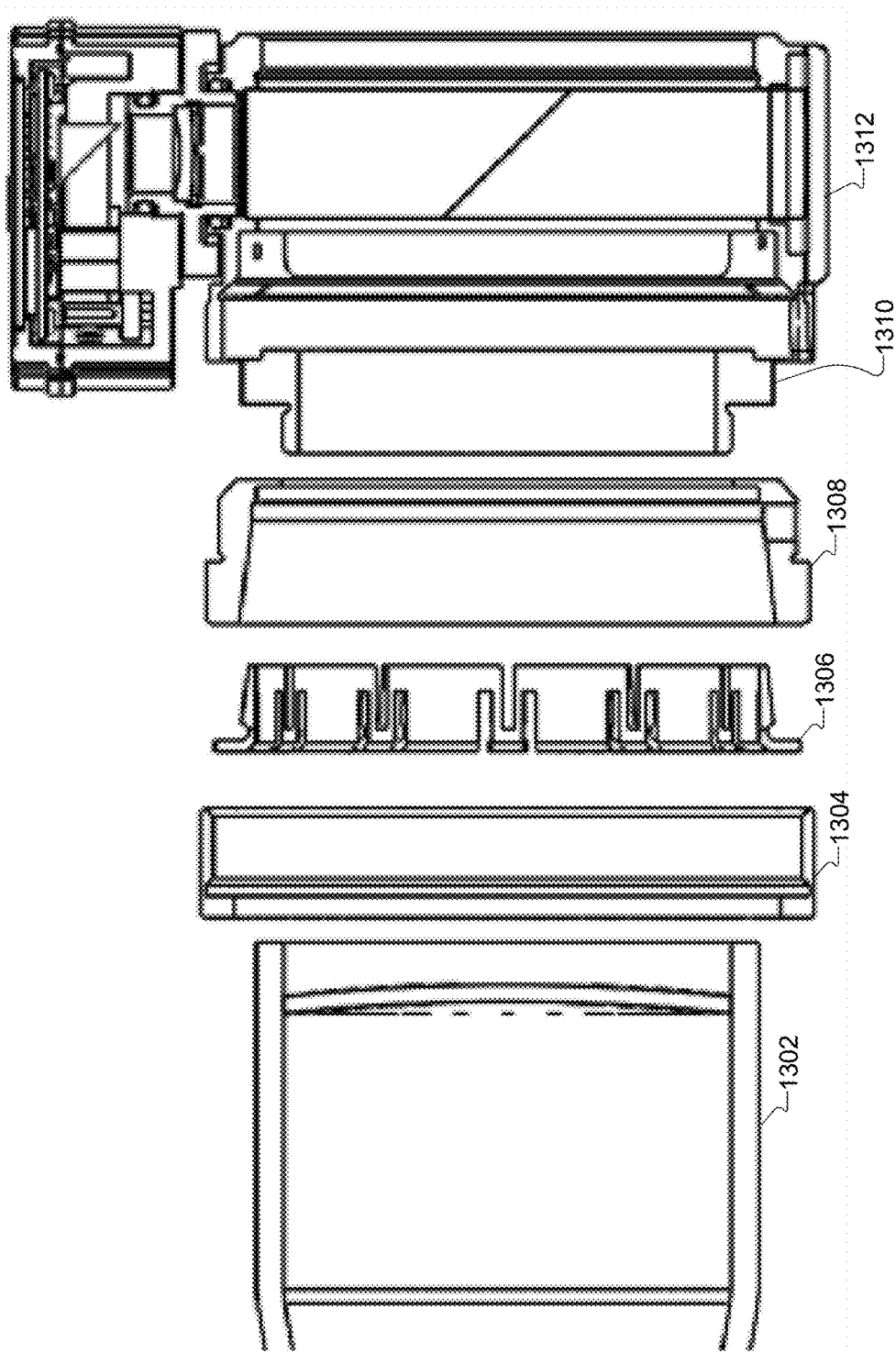
Figure 13C:
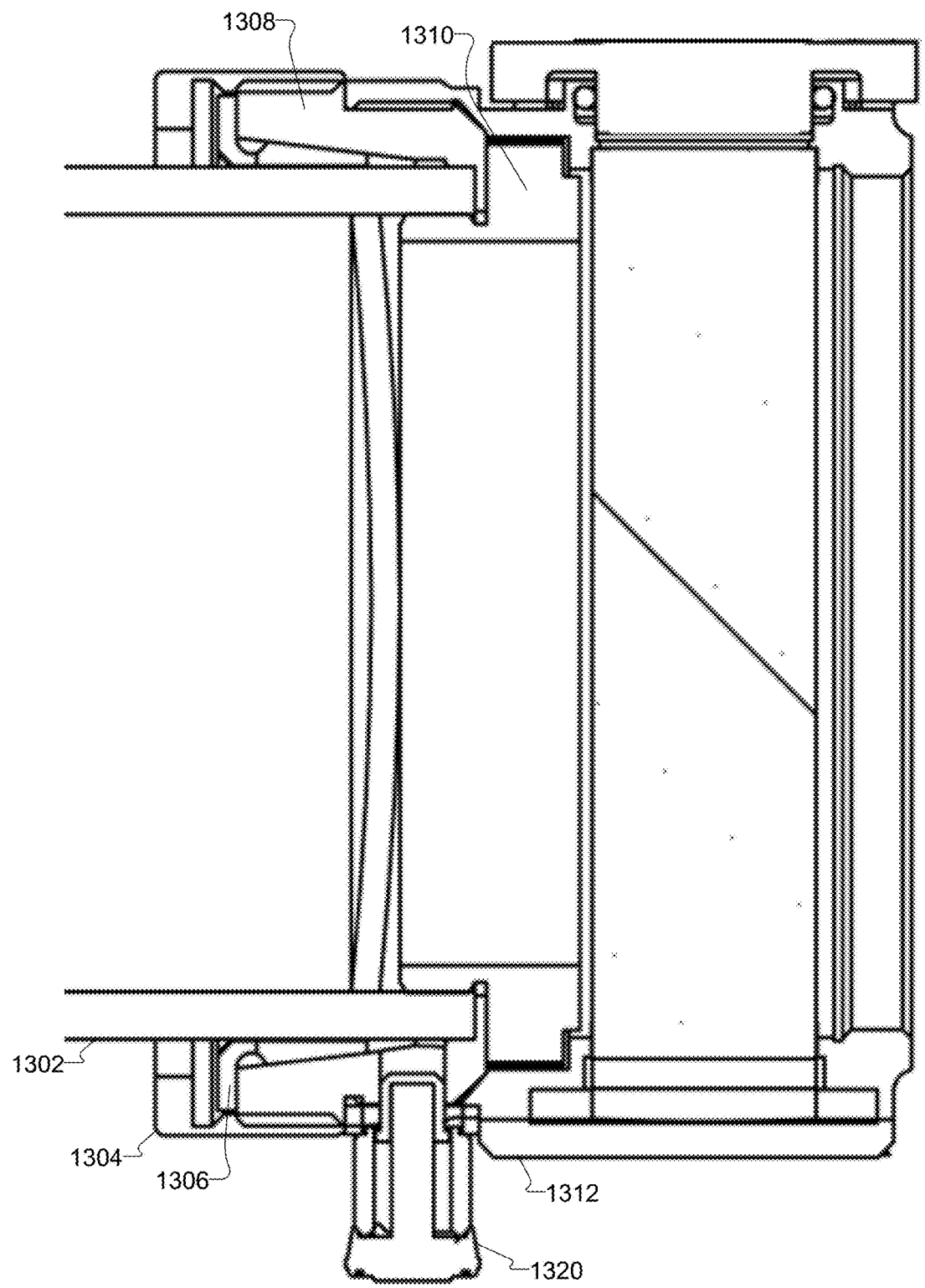
Figure 13D:
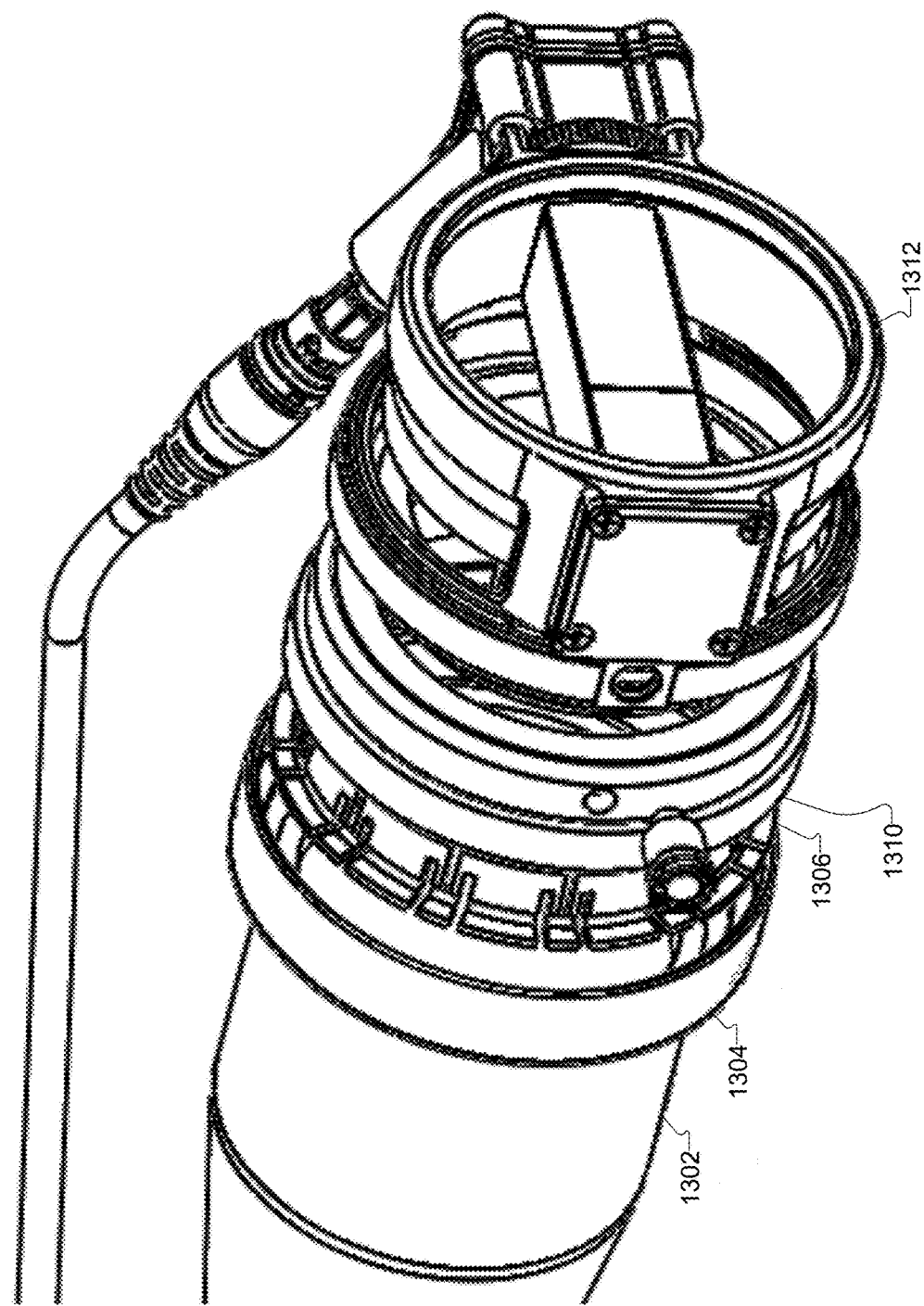

After screwing the spacer 1308 into the display projector 1312, the inner ring 1310 will be held in place such that it can rotate around its center axis, but cannot shift off that center axis or along the center axis. As illustrated in FIG. 13C, a surface 1510 of the small ring 1506 will seat against the side of the grip ring 1406 of the inner ring 1310, holding the inner ring 1310 in place. The threaded ring 1404 of the inner ring 1310 will extend through the opening inside the surface 1510 of the small ring 1506 to screw into the inside threads of the scope body. An opposite surface 1514 of the small ring 1506 will seat against the front of the scope body 1302. Therefore, when the spacer 1308 and the inner ring 1310 are assembled with the display projector 1312, the inner ring 1310 can be screwed into the inside threads of the scope body 1302 until the opposite surface 1514 of the spacer 1308 is flush with the front of the scope body 1302. This ensures that the optical display elements of the display projector 1312 are parallel with the scope lens, or perpendicular to the center axis of the scope. Thus, the inner ring 1310 and the spacer 1308 provide for the first aspect described above for mounting the RDA to the scope body 1302 by providing a threaded attachment that can be screwed into the front of the scope body 1302 to ensure that the optical components of the display projector 1312 are not skewed in relation to the scope lens.

In some embodiments, the spacer 1308 may also help provide for the second aspect described above for mounting the RDA to the scope body 1302 by translating radial pressure against the external surface of the scope body 1302. As will be described in greater detail below, the interior of the spacer 1308 includes a sloped surface 1512 that will cause a compressible ring, such as the collet 1306, to be compressed against the scope body 1302 as the compressible ring and the spacer 1308 move towards each other. The outside diameters of the large ring 1508 and the small ring 1506 for the spacer 1308 may be the same for different sized scopes. However, because the outside diameter of each scope will change, the diameter of the compressible ring will also need to change to match the outside diameter of each scope body 1302. Therefore, the interior radius of the spacer 1308 with the sloped surface 1512 will grow or shrink based on the diameter of the scope and the compressible ring. The angle of the sloped surface 1512 need not change.

Figure 16:
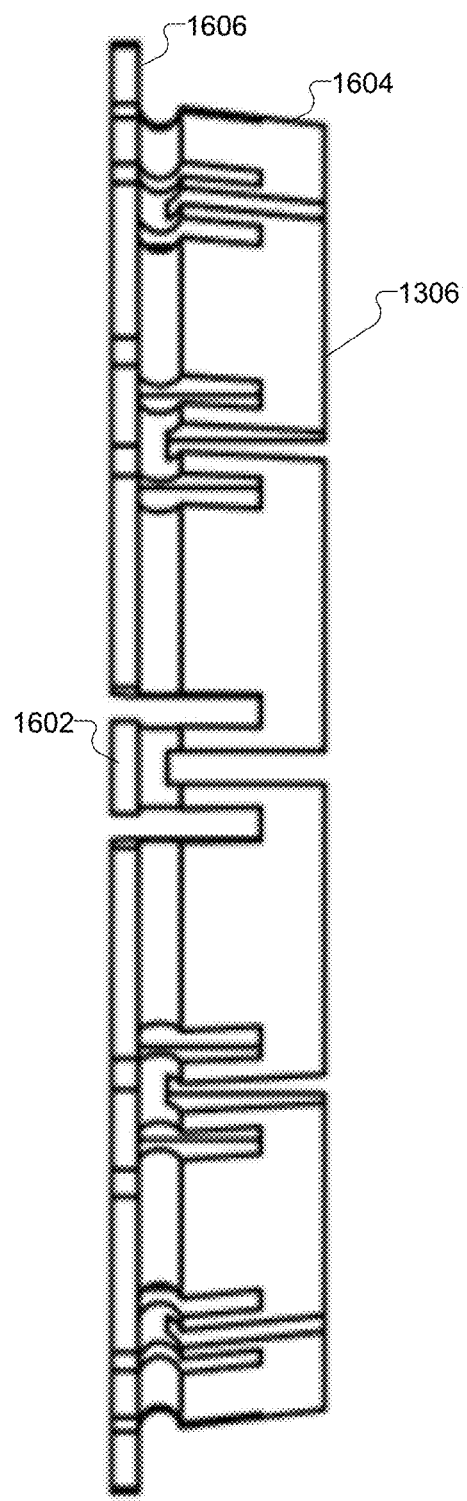
FIG. 16 illustrates a collet, according to some embodiments.

FIG. 16 illustrates a collet 1306, according to some embodiments. As described above, a compressible ring can be used to provide radial pressure against the external surface of the scope body 1302. In some embodiments, the collet 1306 can be used to translate a horizontal motion of the collet 1306 being pressed against the sloped surface 1512 of the spacer 1308 into a radial compression. By compressing the collet 1306 against the outside surface of the scope body 1302, the RDA will be held securely in position, even in the high-shock environment of a high-powered rifle. The collet 1306 effectively prevents rotation of the RDA (i.e., unscrewing from the threads on the interior of the scope body 1302) that would otherwise occur.

The collet 1306 may include a series of interdigitated fingers 1602 spaced evenly around its circumference. The interdigitated fingers 1602 allow the collet 1306 to be compressed radially, such that an internal diameter of the collet 1306 is reduced. As the sloped surface 1604 is pressed into the spacer 1308, the collet 1306 is radially compressed. Specifically, the sloped surface 1502 of the spacer 1308 presses against the sloped surface 1604 of the collet 1306 in order to compress the collet 1306 against the outside surface of the scope body 1302.

In order to accommodate scopes of varying sizes, the diameter of the portion of the collet 1306 that includes the sloped surface 1604 can grow or shrink. The collet 1306 also includes a flange 1606 on the left-hand side in FIG. 16. The flange 1606 is seated against the outer ring 1304 as described in greater detail below. The outer ring 1304 presses against the flange 1606 in order to press the collet 1306 into the spacer 1308. As the diameter of the portion of the collet that includes the sloped surface 1604 grows or shrinks, the length of the flange 1608 can strength or grow respectively. The outer diameter of the flange 1606 may remain constant while the length of the flange 1606 (and the inner diameter) grows or shrinks to accommodate the changing radius of the portion of the collet 1306 that includes the sloped surface 1604. FIG. 18 illustrates a collet 1306 for a larger scope body with a larger diameter for the portion with the sloped surface 1604, where the flange 1606 is shorter. In contrast, FIG. 19 illustrates a collet 1306 for a smaller scope body with a smaller diameter for the portion with the sloped surface 1604, where the flange 1606 is longer. The angle of the sloped surface 1604 need not change.

Figure 17:
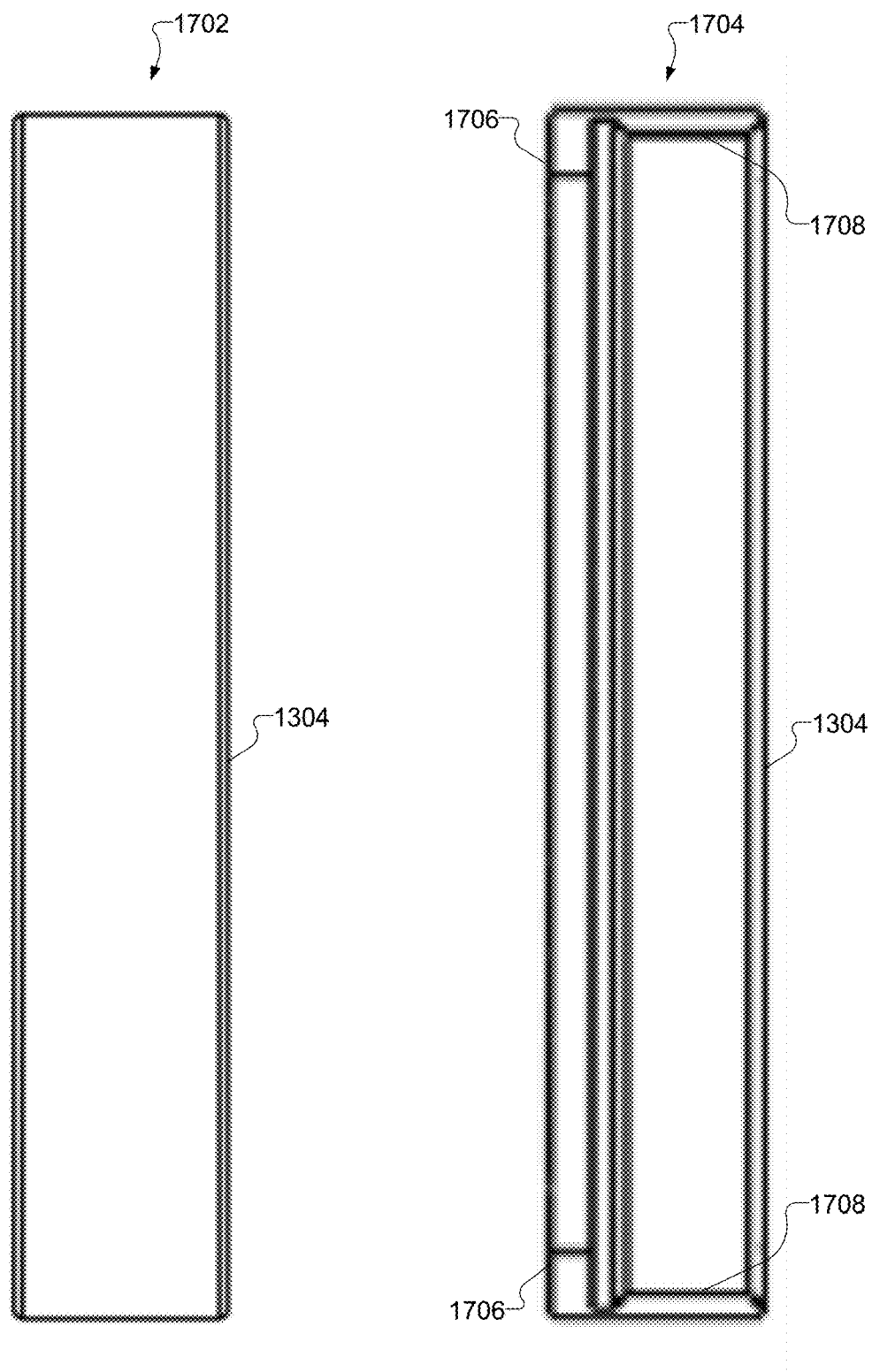
FIG. 17 illustrates an outside view and an inside view of an outer ring, according to some embodiments.

FIG. 17 illustrates an outside view 1702 and an inside view 1704 of an outer ring 1304, according to some embodiments. The outer ring 1304 may have a constant outside diameter regardless of the diameter of the scope body 1302. Similarly, an interior diameter of the outer ring 1304 may also have a constant value in order to mate with the outer diameter of the spacer 1308. The surface 1708 of the interior diameter of the outer ring 1308 may include threads (not shown for clarity) such that outer ring 1308 can be screwed onto the threads on the outer surface of the large ring 1508 of the spacer 1308.

In order to adjust for different-sized scope bodies, a flange 1706 on the left-hand side of the outer ring 1304 can be manufactured longer or shorter depending on the diameter of the scope body. The flange 1706 can be sized such that the internal opening created by the flange is substantially the same as the outside diameter of the scope body 1302, such that there is no gap between the scope body 1302 and the flange 1706. The internal surface of the flange 1706 may be approximately the same length as the flange 1606 on the collet 1306. The flange 1606 of the collet 1306 will be flush with the internal surface of the flange 1706 of the outer ring 1304.

In order to attach the spacer 1308, inner ring 1310, and display projector 1312 assembly to the front of the scope body 1302, the outer ring 1304 can be slipped over the scope body 1302. Next, the collet 1306 can be similarly slipped over the scope body 1302. The spacer 1308 can then be placed against the scope body 1302, and the inner ring 1310 can be rotated such that the threads of the inner ring 1310 engage with the threads on the internal surface of the scope body 1302. The inner ring 1310 can be rotated until the spacer 1308 is flush with the front of the scope body 1302. Next, the collet 1306 can be moved forward on the scope body 1302 into the spacer 1308. The outer ring 1304 can then be similarly moved forward, and the outer ring 1304 can be rotated such that the threads on the internal surface of the outer ring 1304 engage with the corresponding threads on the spacer 1308. As the outer ring 1304 is screwed onto the spacer 1308, the flange 1706 of the outer ring 1304 will gradually press the collet 1306 further into the spacer. The sloped surfaces of the spacer 1306 and the collet 1308 will press against each other and cause the collet 1306 to compress against the scope body 1302. The outer ring 1304 can be rotated until it is tight, indicating that the collet 1306 is compressed as much as possible against the scope body 1302, and therefore providing a maximum amount of radial pressure against the scope body 1302 to prevent the display projector 1312 from moving relative to the scope body 1302.

Figure 20:
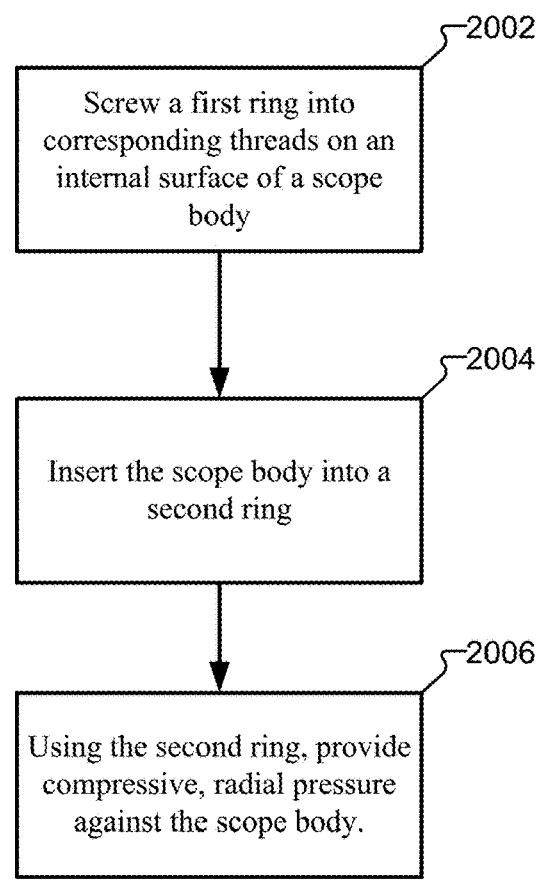
FIG. 20 illustrates a flowchart of a method for securing an RDA to a scope body, according to some embodiments.

FIG. 20 illustrates a flowchart of a method for securing an RDA to a scope body, according to some embodiments. The method may include screwing a first ring into corresponding threads on an internal surface of the scope body (2002). For example, the inner ring 1310 described above may be screwed into the threads of the inner surface of the scope body 1302. This may provide a first attachment mechanism. The method may also include inserting the scope body into a second ring (2004). For example, the scope body may be inserted into the outer ring 1304 and/or the collet 1306 as described above. The method may also include, using the second ring, providing compressive, radial pressure against the scope body (2006). For example, the outer ring 1304 and/or the collet 1306 may be used to compress the collet 1306 to provide compressive, radial pressure against the scope body. This may provide a second attachment mechanism, thereby holding the RDA securely in place relative to the scope body.

As described above, the inner ring 1310 and the spacer 1308 are secured to the display projector 1312. These three components can be held together by a thread pin inserted through the body of the display projector 1312 into the body of the spacer 1308. Turning back to FIG. 13C, a thread pin 1320 can be inserted such that the spacer 1308 is not allowed to rotate relative to the display projector 1312. Thus, in order to remove the RDA from the scope body 1302, the outer ring 1304 can simply be unscrewed from the spacer 1308. The outer ring 1304 can then be moved backwards off the spacer 1308, and thereby relieve the forward pressure on the collet 1306. As forward pressure is relieved from the collet 1306, the collet will expand and move backwards towards the outer ring 1304, thereby releasing the radial pressure on the external surface of the scope body 1302. The inner ring 1310 can then be rotated to unscrew the spacer 1308, inner ring 1310, and display projector 1312 assembly from the front of the scope body 1302. When the thread pin 1320 is inserted, the spacer 1308, inner ring 1310, and display projector 1312 assembly can act as a single unit that does not need to be assembled/disassembled every time the RDA is removed from the scope body 1302.

It can be noted that the above, embodiments of the RDA may be modified to address manufacturing and/or other concerns. For example, sniper shooters may require extremely high image quality from rifle scope's to identify targets and spot their shots. Furthermore, it may be difficult to manufacture a transmissive light bar that meets both image quality and cost requirements. For example, in reference to FIG. 1B, due to the difference in the index of refraction of the transmissive light bar 55 and the open air surrounding it, it may produce an optical blur to a user looking through the eyepiece of the rifle scope. The transmissive light bar 55 may further have to meet a critical angle requirement between front and back surfaces (surfaces through which light traveling toward the objective lens of the rifle scope is transmitted) to minimize refractive optical distortions. Meeting these requirements can often increase the cost of manufacture for the transmissive light bar. As such, embodiments of the RDA may be modified to include a polarized window to reduce costs and increase image quality.

Figure 21:
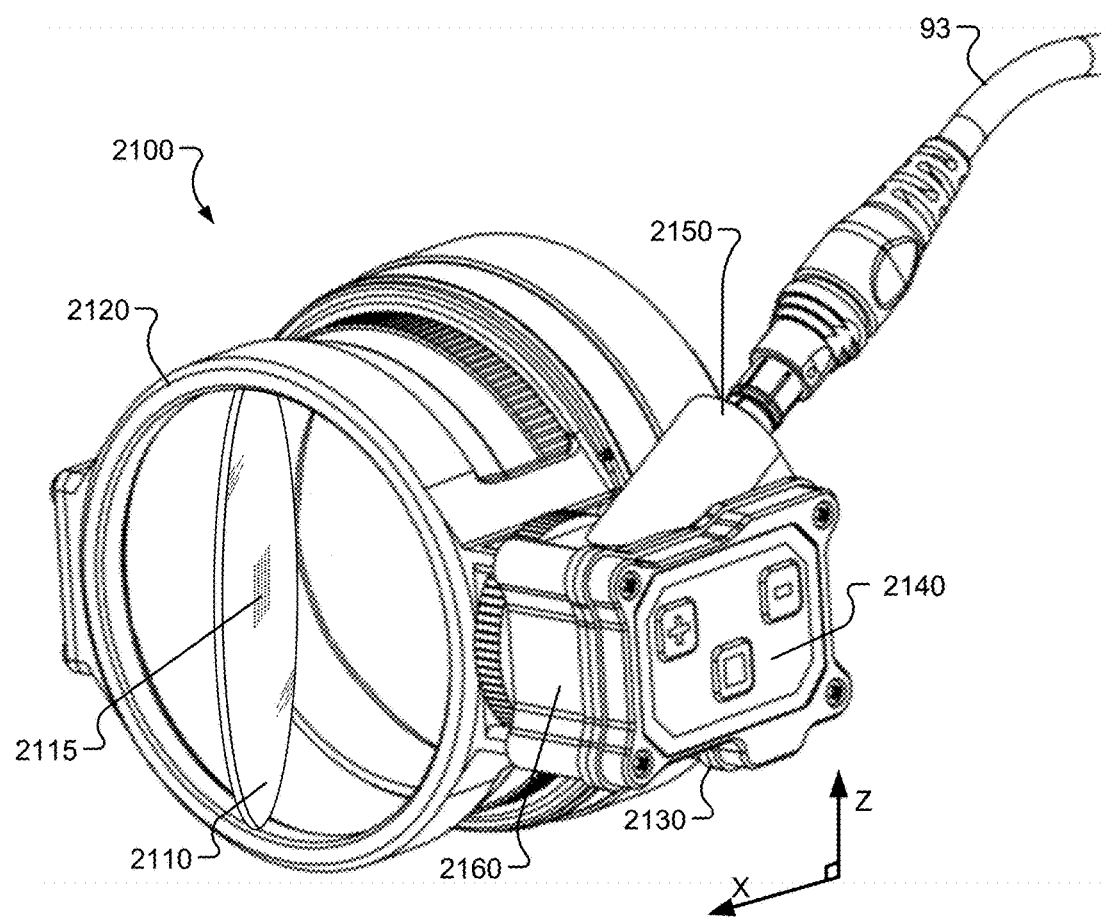
FIG. 21 is a perspective view of an RDA having a polarized window, according to an embodiment.

FIG. 21 is a perspective view of an RDA 2100 having a polarized window 2110, according to an embodiment. It should be noted, however, that this is a simplified diagram provided for illustrative purposes. The polarized window 2110, as noted below, can include various types of mounting fixtures, protective covering, and other features not illustrated. To be clear, although item 2110 of FIG. 21 is described as a "polarized window" only a portion of the polarized window 2110 may actually include a polarized coating, as described below. In embodiments, such as these, the remaining portion of the polarized window 2110 might not be polarized.

Similar to the RDA 40 illustrated in FIG. 1B, the RDA 2100 of FIG. 21, can include an annulus 2120, as well as a casing 2160 on which a parallax adjustment knob 2130, button interface 2140, and connection port 2150 may be disposed. Here, however, the RDA 2100 further includes a polarized window 2110 that replaces the transmissive light bar 55 and polarized beam splitter 56 of the RDA 40 of FIG. 1B. Other features of the RDA 2100 of FIG. 21 may be the same or similar to features of the RDA 40 of FIG. 1B.

Similar to the light bar 55 it replaces, the polarized window 2110 is a polarized transmissive-reflective optical element that can both reflect polarized light emitted from optics in the casing 2160 into the objective lens of the rifle scope onto which the RDA 2100 is mounted, and transmit other light (e.g., light of a scene viewable from an eyepiece of the rifle scope), incident on the polarized window 2110, that is traveling toward the objective lens. To do so, the polarized window 2110 may comprise a transmissive material, such as glass, which may be chosen based on transmissive properties, structural integrity, manufacturing concerns, and/or other factors. For example, in some embodiments, the polarized window may comprise BK7 glass or another glass, having similar properties. The polarized window 2110 may have anti-reflective and/or coatings, as desired, which may depend on the application of the RDA 2100. Additionally, the polarized window 2110 may be substantially flat to help minimize refractive optical distortions. The thickness of the polarized window 2110 may vary, depending on the type of material and desired optical properties. That said, the thickness of the polarized window 2110 may have a minimal effect on its optical properties. Thus, the primary concern for determining the thickness in some embodiments may be whether the polarized window 2110 is sufficiently thick to handle gun shock.

To reflect polarized light emitted from optics within the casing 2160 (which may be generated and transmitted within the casing 2160 using the components (e.g., display unit and/or optical subassembly) such as those described in the embodiments above), the polarized window 2110 may include a polarized coating 2115. As illustrated, in some embodiments the polarized coating 2115 may be disposed on only a portion of a surface (e.g., inner surface closest to the casing 2160) of the polarized window 2110 to help minimize loss of light transmitted by the polarized window 2110. In some embodiments, for example, the portion of the surface of the polarized window 2110 on which the polarized coating 2115 is disposed may comprise only a small percentage (e.g., 20%, 10%, or less) of the total area of the surface. In one example, the area of the polarized coating 2115 may be limited to only a 15×15 mm area on the polarized window 2110. For a 60 mm objective, and given the transmissivity of the polarized coating 2115, this would result in less than a 2% light loss overall. It will be understood, however, that embodiments may vary in the size of area of the polarized coating 2115, as well as types of polarized coating.

As previously indicated, optical components within the casing 2160 may be similar to embodiments described above (e.g., as illustrated in FIG. 1A). However, because the polarized window 210 transmissive light bar of previous embodiments had a "folded" design, in which, as illustrated in FIG. 3, light traveled through the transmissive light bar and reflected off of a spherical mirror 58 before being directed into the objective lens of the rifle scope by the polarized beam splitter 56, the optical components within the casing 2160 may need to be adjusted to maintain the original focal length. (In some embodiments, this focal length was 108 mm, although alternative embodiments may have longer or shorter focal lengths.)

As illustrated in FIG. 21, the polarized window 2110 is angled in order to direct light from the optical components within the casing 2160 into the objective lens of the rifle scope onto which the RDA 2100 is mounted, at (according to some embodiments) an angle substantially normal to the surface of the objective lens. This is showing more detail in FIG. 22.

Figure 22:
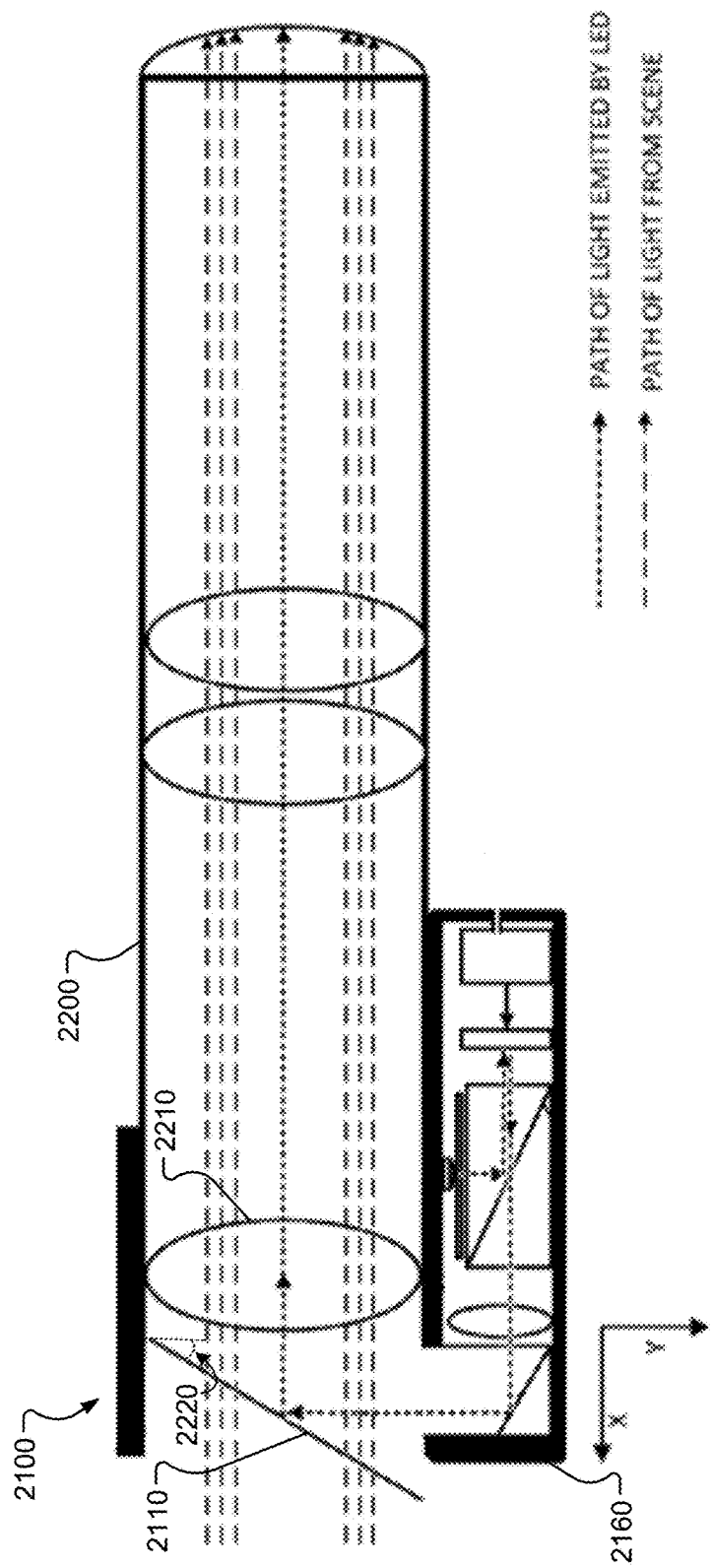
FIG. 22 is a diagram of the embodiment of an RDA of FIG. 21, attached to a rifle scope, and showing light paths in a manner similar to FIGS. 2C, and 2D.

FIG. 22 is a diagram of the RDA 2100 attached to a rifle scope 2200 showing light paths similar to those in FIGS. 2C and 2D. As can be seen, the polarized window 2110 transmits light from a scene and reflects LED light from the LED housed in the casing 2160. As noted above, the polarized window 2110 can direct the LED light into the objective lens 2210 added on an angle substantially normal to the objective lens 2210.

It can be noted that, although the angle of LED light incident on the polarized window 2110 is approximately a 45° angle, the angle can be changed, depending on desired functionality. That is, in some embodiments, the angles at which the LED light leaves the casing 2160 and reflects off of the polarized window 2110 can be modified to, for instance, allow the angle 2220 between the polarized window 2110 and the objective lens 2210 to be reduced. This can, in turn, allow the polarized window 2110 (and overall RDA 2100) to have a lower profile from the front of the rifle scope 2200.

Turning again to FIG. 21, the illustration does not show any means of protection for the polarized window 2110, but alternative embodiments may include such protection. Depending on desired functionality, the polarized window 2110 may be mounted or otherwise fastened to the annulus 2120 in a permanent manner (e.g., at manufacture) to ensure the proper angles between the polarized window 2110 and the casing 2160 are maintained. In some embodiments, however, components, such as the casing 2160, polarized window 2110, and/or components within the casing 2160 may be movable to allow calibration in the field. In any case, embodiments may additionally or alternatively include any of a variety of forms of protection for the polarized window 2110 to protect it from impact, weather, and/or other things that could damage the polarized window 2110 and/or degrade its performance. In some embodiments, for example, in additional glass and/or plastic cover (not shown) may extend out from the annulus 2120, encasing the polarized window and protective cover. The features of such an encasing (thickness, material, shape, etc.) may be adjusted to reduce light loss, increase strength, minimize optical distortions, etc. Additionally or alternatively, the encasing may be removable, thereby eliminating any negative effects that a permanent encasing would have, while enabling the polarized window 2110 to be protected when the RDA 2100 is not in use.

It can be noted that the size and shape of the polarized window 2110 can be adjusted to reduce the amount of optical distortions. Unlike the transmissive light bar in previous embodiments, for example, the size and the shape of the polarized window 2110 may be such that it occupies substantially all of the field of view of the rifle scope, to minimize any refractive optical distortions that may occur near the edges of the polarized window 2110.

Figure 23:
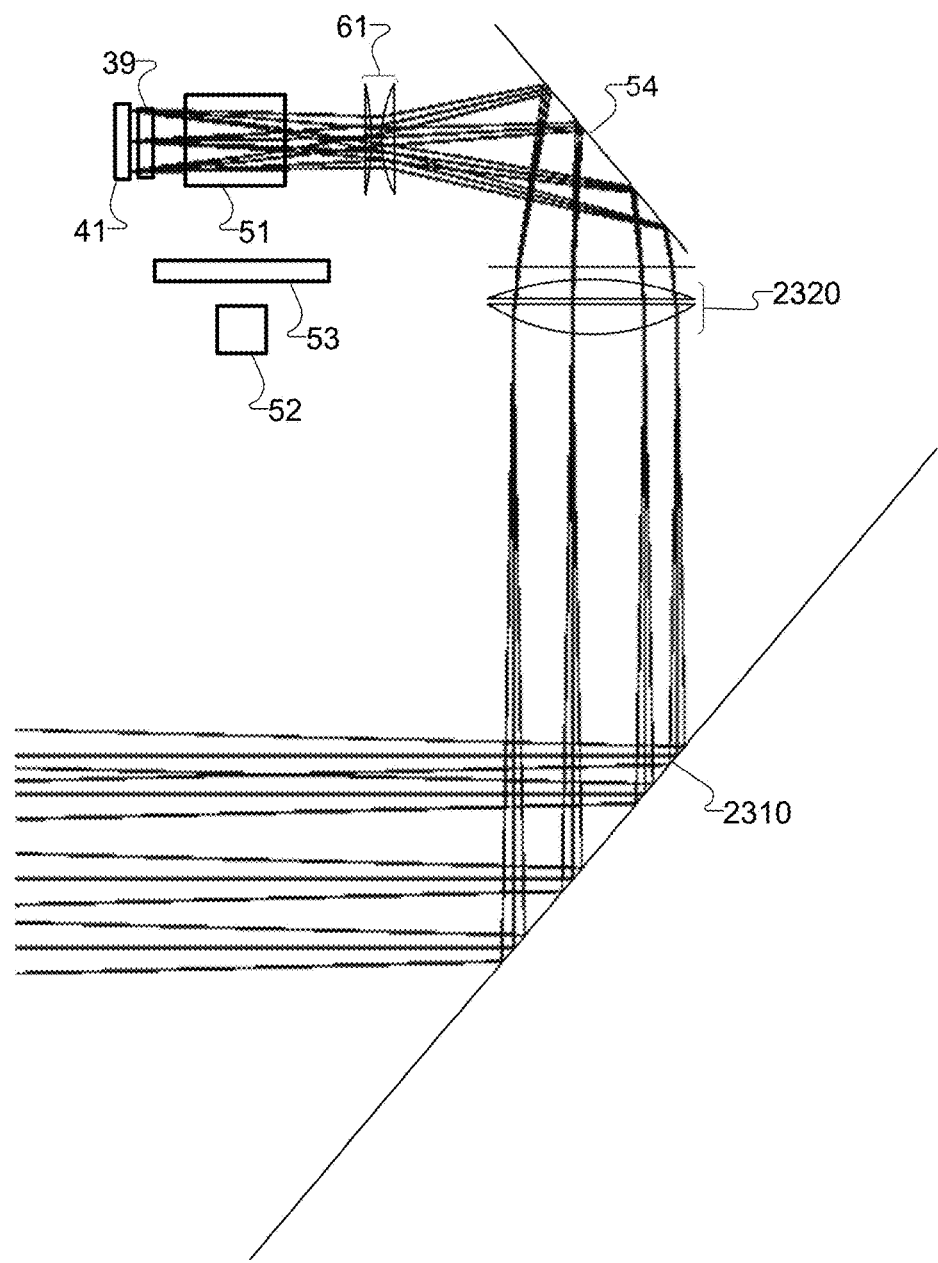
FIG. 23 is a ray tracing diagram showing example paths of light rays within an example embodiment of an RDA having a polarized window.

FIG. 23 is a ray tracing diagram showing example paths of light rays within an embodiment of an RDA having a polarized window, such as the embodiment illustrated in FIGS. 21 and 22. Components similar to those in FIG. 3 are labeled similarly. As with FIG. 3, FIG. 23 omits illustrating rays of light emitted by the LED 41 and the reflection of this light towards the LCOS 39, for clarity of the illustration. Rather, the rays shown in the drawing are intended to illustrate the path of light only after its reflection at the LCOS 39. Additionally, the light path through the rifle scope is omitted in FIG. 23.

Although not shown, the LED 52 emits light towards a polarized beam splitter 51 that is angled 45 degrees relative to the path of the light. Prior to reaching the polarized beam splitter 51, the light can be polarized by the polarizer 53. Optionally, the light may be diffused by a diffuser prior to reaching the polarized beam splitter 51 (e.g., the diffuser is disposed between the LED 52 and the polarized beam splitter 51), before or after the polarizer 53. In some embodiments the polarizer 53 may also act as a diffuser.

Also, a wire grid polarizer (not shown) can be used to polarize the light in such a way that it will be reflected at the polarized beam splitter 51. Because of the polarity of the light incident on the polarized beam splitter 51, the beam splitter reflects the light towards the LCOS 39.

The processing circuitry 41 generates electrical control signals that cause a combination of LCOS reflective pixel elements to reflect the incident light. The LCOS 39 also reverses the polarity of the light that it reflects. The light reflected by the LCOS 39 is reflected back towards the polarized beam splitter 51, where it is transmitted as a result of the polarity reversal imparted by the LCOS 39.

After being transmitted by the polarized beam splitter 51, the light propagates towards a moving telephoto lens assembly 61 that provides parallax adjustment. The light is divergently refracted by the telephoto lens assembly 61 in a manner that provides compensation sufficient to prevent parallax from affecting the rifle scope view.

Subsequent to being transmitted by the telephoto lens assembly 61, the light is incident on a reflective element 54 that is disposed at an angle that is approximately 45 degrees from parallel to the path of the light (however, as noted above, alternative embodiments may have the reflective element 54 at a different angle, enabling the angle of the polarized window 2310 to be changed. The reflection of the light by the reflective element 54 causes an approximately 90 degree change in direction of the light. Following reflection, the light travels through a collimating lens assembly 2320 toward the polarized window 2310. As previously noted, the light may travel toward and reflect off of a portion of the polarized window 2310 having a polarized coating.

The polarized window 2310 is approximately centered with respect to the circular aperture (not shown in FIG. 23) of the annulus. By being centered with respect to the circular aperture, the polarized window 2310 can be disposed so that it will coincide with an extended optical axis (not explicitly labeled) of the rifle scope to which the RDA is coupled. That is, the polarized window 2310 can be disposed directly in front of the center of the rifle scope objective lens (not shown in FIG. 23).

As a result of the polarity of the light when reflected at reflective element 54, the light is reflected by the polarized window 2310, causing a 90 degree change in direction (again, this may be a different angle in alternative embodiments). As can be seen in FIG. 23, the light rays are effectively collimated by the collimating lens assembly 2320. These collimated light rays are then incident at the objective lens of the rifle scope (not shown), which transmits and refracts the rays towards the optical eyepiece in the manner depicted in FIG. 2D. It can be noted that, depending on desired functionality, the configuration of the telephoto lens assembly 61 and/or collimating lens assembly 2320 relative to the reflective element 54, may vary, depending on desired functionality. In some embodiments, the collimating lens assembly 2320 may be situated by the telephoto lens assembly 61, such that the light travels through the collimating lens assembly 2320 prior to reflecting off of the reflective element 54. In other embodiments, collimation may occur using additional or alternative optical elements (which may include the reflective element 54, for example).

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A rifle scope display adapter comprising:
a body coupleable with a rifle scope and having:
a display unit disposed in a casing;
an optical subassembly disposed in the casing and including a lens and a reflective element, the optical subassembly configured to direct light from the display unit toward a polarized transmissive-reflective optical element; and
the polarized transmissive-reflective optical element coupled with the casing such that, when the body of the rifle scope display adapter is coupled with the rifle scope, the polarized transmissive-reflective optical element is disposed in front of an objective lens of the rifle scope in a manner to:
reflect the light from the display unit toward the objective lens of the rifle scope, and
transmit other light incident to the polarized transmissive-reflective optical element and traveling toward the objective lens of the rifle scope.

2. The rifle scope display adapter of claim 1, wherein the polarized transmissive-reflective optical element comprises a polarized window.

3. The rifle scope display adapter of claim 1, wherein the polarized transmissive-reflective optical element is configured to, when the body of the rifle scope display adapter is coupled with the rifle scope, occupy substantially all of the field of view of the rifle scope.

4. The rifle scope display adapter of claim 1, wherein the display unit comprises a liquid crystal on silicon (LCOS).

5. The rifle scope display adapter of claim 4, wherein the optical subassembly further comprises:
a light-emitting element;
a polarizing element configured to polarize light emitted by the light-emitting element; and
a polarized beam splitter configured to:
reflect the polarized light towards the LCOS, and
transmit light reflected by the LCOS toward the reflective element, the light reflected by the LCOS comprising the light from the display unit.

6. The rifle scope display adapter of claim 5, further comprising a diffuser disposed between a light-emitting element and the polarized beam splitter, the diffuser operable to diffuse light emitted by the light-emitting element.

7. The rifle scope display adapter of claim 1, wherein the lens of the optical subassembly comprises a movable telephoto lens.

8. The rifle scope display adapter of claim 1, further comprising a polarized coating on only a portion of a surface of the polarized transmissive-reflective optical element.

9. The rifle scope display adapter of claim 8, wherein an area of the portion of the surface comprises less than 20% of the total area of the surface.

10. A method of directing light from a display unit toward an objective lens of a rifle scope, the method comprising:
causing the display unit to display an image;
using an optical subassembly to direct light from the display unit toward a polarized transmissive-reflective optical element, wherein the optical subassembly including a lens and a reflective element; and
positioning the polarized transmissive-reflective optical element such that the polarized transmissive-reflective optical element is disposed in front of the objective lens of the rifle scope in a manner to:
reflect the light from the display toward the objective lens of the rifle scope, and
transmit other light incident on the polarized transmissive-reflective optical element traveling toward the objective lens of the rifle scope.

11. The method of directing light from a display unit toward an objective lens of a rifle scope of claim 10, wherein the polarized transmissive-reflective optical element comprises a polarized window.

12. The method of directing light from a display unit toward an objective lens of a rifle scope of claim 10, wherein the polarized transmissive-reflective optical element is configured to, when a rifle scope display adapter comprising the polarized transmissive-reflective optical element is coupled with the rifle scope, occupy substantially all of the field of view of the rifle scope.

13. The method of directing light from a display unit toward an objective lens of a rifle scope of claim 10, wherein the display unit comprises a liquid crystal on silicon (LCOS).

14. The method of directing light from a display unit toward an objective lens of a rifle scope of claim 13, further comprising:
causing a light-emitting element to emit light;
polarizing the light emitted by the light-emitting element; and
using a polarized beam splitter configured to:
reflect the polarized light towards the LCOS, and
transmit light reflected by the LCOS toward the reflective element, the light reflected by the LCOS comprising the light from the display unit.

15. The method of directing light from a display unit toward an objective lens of a rifle scope of claim 14, further comprising diffusing light emitted by the light-emitting element.

16. The method of directing light from a display unit toward an objective lens of a rifle scope of claim 10, wherein the lens of the optical subassembly comprises a movable telephoto lens.

17. The method of directing light from a display unit toward an objective lens of a rifle scope of claim 10, wherein the polarized transmissive-reflective optical element is configured to reflect the light from the display unit using a polarized coating on only a portion of a surface of the polarized transmissive-reflective optical element.

18. The method of directing light from a display unit toward an objective lens of a rifle scope of claim 17, wherein an area of the portion of the surface comprises less than 20% of the total area of the surface.

19. A rifle scope display adapter comprising:
a display unit disposed in a casing;
an optical subassembly disposed in the casing and including an adjustable lens and a reflective element, the optical subassembly configured to direct light from the display unit toward a polarized transmissive-reflective optical element; and
the polarized transmissive-reflective optical element coupled with the casing such that, when the rifle scope display adapter is positioned for use, the polarized transmissive-reflective optical element is disposed in front of an objective lens of the rifle scope in a manner to:
reflect the light from the display unit toward the objective lens of the rifle scope, and
transmit other light incident to the polarized transmissive-reflective optical element traveling toward the objective lens of the rifle scope.

20. The rifle scope display adapter of claim 19, wherein the polarized transmissive-reflective optical element comprises a polarized window.

\* \* \* \* \*